US012200306B1

(12) United States Patent
Ohliger et al.

(10) Patent No.: US 12,200,306 B1
(45) Date of Patent: *Jan. 14, 2025

(54) COMPUTER PROGRAM PRODUCT FOR ALLOWING A USER TO CREATE AN INTERACTIVE OBJECT IN A CONTENT OWNER'S DIGITAL MEDIA FILE

(71) Applicant: Veepio Holdings, LLC, New York, NY (US)

(72) Inventors: Jonathan Ohliger, Wilmington, DE (US); Alexander Shapiro, Narrowsburg, NY (US); Richard A. Garcia, West Hollywood, CA (US); Jonathan W. Moberly, London (GB)

(73) Assignee: VEEPIO HOLDINGS, LLC, Morgantown, WV (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/896,392

(22) Filed: Aug. 26, 2022

Related U.S. Application Data

(63) Continuation of application No. 15/180,949, filed on Jun. 13, 2016, now Pat. No. 11,432,046.
(Continued)

(51) Int. Cl.
| | |
|---|---|
| *G06F 3/04842* | (2022.01) |
| *G06Q 30/0601* | (2023.01) |
| *G06V 20/40* | (2022.01) |
| *H04N 21/478* | (2011.01) |
| *H04N 21/81* | (2011.01) |
| *H04N 21/858* | (2011.01) |

(52) U.S. Cl.
CPC ..... *H04N 21/47815* (2013.01); *G06F 3/04842* (2013.01); *G06Q 30/0601* (2013.01); *G06V 20/49* (2022.01); *H04N 21/812* (2013.01); *H04N 21/8586* (2013.01)

(58) Field of Classification Search
CPC .......... H04N 21/47815; H04N 21/812; H04N 21/8586; G06F 3/04842; G06K 9/00765; G06Q 30/0601
See application file for complete search history.

(56) References Cited

U.S. PATENT DOCUMENTS

| | | | |
|---|---|---|---|
| 5,774,666 | A | 6/1998 | Portuesi |
| 5,918,012 | A | 6/1999 | Astiz et al. |

(Continued)

OTHER PUBLICATIONS

"MIT Media Lab's HyperSoap uses hyperlinks to mix shopping, entertainment," MIT News, press release, 3 pages (1998).
(Continued)

*Primary Examiner* — Jennifer N Welch
*Assistant Examiner* — Reji Kartholy
(74) *Attorney, Agent, or Firm* — Panitch Schwarze Belisario & Nadel LLP

(57) ABSTRACT

A computer program product is provided for allowing a user to create an interactive object in a digital media file using an application that executes on an electronic device to create the interactive object. After creation, the interactive object becomes interactive for subsequent viewers who display the digital media file using the application. The interactivity allows the viewer to navigate to a Uniform Resource Locator (URL) associated with the object after pointing to the location of the object within the digital media file.

6 Claims, 77 Drawing Sheets

Related U.S. Application Data

(60) Provisional application No. 62/174,851, filed on Jun. 12, 2015.

(56) References Cited

U.S. PATENT DOCUMENTS

| | | | |
|---|---|---|---|
| 6,006,265 | A | 12/1999 | Rangan et al. |
| 6,076,104 | A | 6/2000 | McCue |
| 6,154,771 | A | 11/2000 | Rangan et al. |
| 6,173,317 | B1 | 1/2001 | Chaddha et al. |
| 6,230,172 | B1 | 5/2001 | Purnaveja et al. |
| 6,281,903 | B1 | 8/2001 | Martin et al. |
| 6,281,904 | B1 | 8/2001 | Reinhardt et al. |
| 6,333,749 | B1 | 12/2001 | Reinhardt et al. |
| 6,393,134 | B1 | 5/2002 | Tostevin et al. |
| 6,434,265 | B1 | 8/2002 | Xiong et al. |
| 6,462,754 | B1 | 10/2002 | Chakraborty et al. |
| 6,504,546 | B1 | 1/2003 | Cosatto et al. |
| 6,529,206 | B1 | 3/2003 | Ohki et al. |
| 6,570,587 | B1* | 5/2003 | Efrat .................. G06F 16/40 715/726 |
| 6,625,310 | B2 | 9/2003 | Lipton et al. |
| 6,628,298 | B1 | 9/2003 | Debevec |
| 6,685,326 | B2 | 2/2004 | Debevec et al. |
| 6,718,551 | B1 | 4/2004 | Swix et al. |
| 6,757,707 | B1 | 6/2004 | Houghton et al. |
| 6,858,826 | B2 | 2/2005 | Mueller et al. |
| 6,919,962 | B2 | 7/2005 | Debevec et al. |
| 6,954,202 | B2 | 10/2005 | Han et al. |
| 6,983,082 | B2 | 1/2006 | Duiker |
| 7,325,245 | B1 | 1/2008 | Clapper |
| 7,602,404 | B1 | 10/2009 | Reinhardt et al. |
| 8,271,487 | B1 | 9/2012 | Hermush et al. |
| 8,341,152 | B1 | 12/2012 | Bates |
| 2002/0002598 | A1 | 1/2002 | Van Allen et al. |
| 2002/0161909 | A1 | 10/2002 | White |
| 2003/0093564 | A1 | 5/2003 | Portuesi |
| 2004/0227768 | A1 | 11/2004 | Bates et al. |
| 2008/0201734 | A1 | 8/2008 | Lyon et al. |
| 2008/0294694 | A1 | 11/2008 | Maghfourian et al. |
| 2009/0007023 | A1 | 1/2009 | Sundstrom |
| 2009/0067806 | A1 | 3/2009 | Sengamedu |
| 2009/0070324 | A1 | 3/2009 | Yoshino |
| 2009/0077459 | A1 | 3/2009 | Morris et al. |
| 2009/0077503 | A1 | 3/2009 | Sundstrom |
| 2009/0193475 | A1 | 7/2009 | Halverson et al. |
| 2009/0276805 | A1 | 11/2009 | Andrews, II et al. |
| 2010/0158099 | A1 | 6/2010 | Kalva et al. |
| 2011/0035660 | A1 | 2/2011 | Lussier et al. |
| 2011/0137753 | A1 | 6/2011 | Moehrle |
| 2012/0246184 | A1 | 9/2012 | Rothschild |
| 2013/0100296 | A1 | 4/2013 | Tang et al. |
| 2013/0174037 | A1 | 7/2013 | Gao |
| 2013/0212477 | A1 | 8/2013 | Averbuch |
| 2013/0314438 | A1* | 11/2013 | Borcherdt .......... H04N 21/8583 345/629 |
| 2014/0029921 | A1* | 1/2014 | Warren ................ G11B 27/031 386/282 |
| 2015/0254212 | A1* | 9/2015 | Lanahan ............ G06F 3/04842 715/202 |
| 2016/0012859 | A1 | 1/2016 | Harader et al. |
| 2016/0062961 | A1 | 3/2016 | Zhu et al. |
| 2016/0173942 | A1 | 6/2016 | Ransom et al. |
| 2016/0203586 | A1 | 7/2016 | Chang et al. |
| 2016/0267068 | A1 | 9/2016 | Nagarajan |
| 2016/0275068 | A1 | 9/2016 | Wenzel et al. |
| 2019/0028780 | A1 | 1/2019 | Prabhu et al. |

OTHER PUBLICATIONS

"MOCA Project: Object Recognition," Copyright © 2009 Praktische Informatik IV, University of Mannheim, downloaded from: http://pi4.informatik.uni-mannheim.de/pi4.data/content/projects/moca/Project-ObjectRecognition.html, 7 pages.

Bove et al., "Adding Hyperlinks to Digital Television," SMPTE Journal, pp. 797-801 (1999).

Dakss et al., "Hyperlinked Video," Proceedings of SPIE, Multimedia Systems and Applications, vol. 3528, pp. 1-10 (1999).

Hirata et al., "Content-oriented Integration in Hypermedia Systems," Proceedings of the Seventh ACM Conference on Hypertext, pp. 11-21 (1996).

Kopf et al., "Bringing videos to social media," 2012 IEEE International Conference on Multimedia and Expo, pp. 681-686 (2012).

Nixon et al., "Connected Media Experiences: Interactive Video Using Linked Data on the Web,"(2013).

Nixon et al., "Connected Media Experiences: Web Based Interactive Video Using Linked Data," WWW 2013 Companion, pp. 309-312 (2013).

RealSystem™ Production Guide, Release 8, RealNetworks, Inc., 2000.

Sample Instagram URL: https://www.instagram.com/p/_p-rOnN5ok/?taken-by=marika.collins, download date: Jun. 10, 2016; original posting date: unknown, 2 pages.

Sawhney et al., "Authoring and navigating video in space and time," IEEE MultiMedia, vol. 4, No. 4, pp. 30-30 (1997).

\* cited by examiner

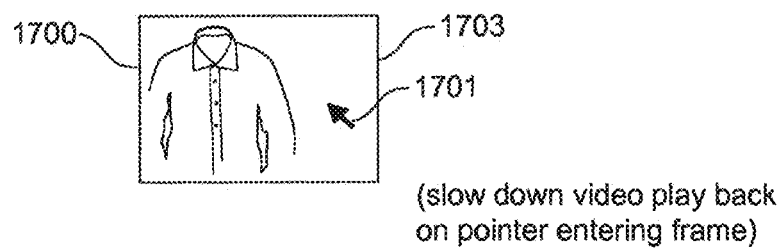
(slow down video play back on pointer entering frame)
FIG. 6A
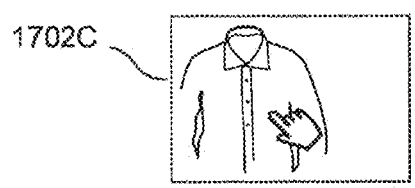
FIG. 6B
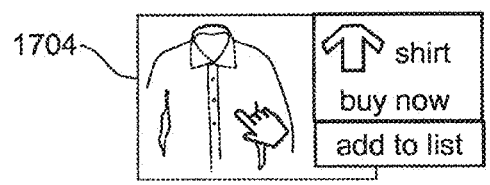
FIG. 6C
FIG. 6D

| unique object ID | semantic description of object | unique object occurence ID and reference data | film data | context and verbatim of occurence | metadata viewer profile | bid per viewer profile channel 1 | bid per viewer profile channel n | winning bid, owner data, run time |
|---|---|---|---|---|---|---|---|---|
| 1.1.1.1.1 | silver necklace | 1.1.1.1.1.A, x,y,z,t | HBO, comedy-drama, sex and the city, cable television series, picture format 480i SDTV etc | Charlotte York (Kristin Davis) having lunch with Miranda Hobbes (Cynthia Nixon) at Sushi Samba discussing birthday present. "...bla, bla, bla...." | target: female, 30y, income 80k, etc, transaction history, viewer profile etc | MMXV: $1 MMXZ: $3 | MMXV: $1.5 MMXZ: $2 | Tiffany, December 1, 2008- december 31, 2008 |
| 1.1.1.11.1.1 | silver necklace | 1.1.1.1.1.B, x,y,z,t | | | | | | |
| 1.1.1.1.1 | silver necklace | 1.1.1.1.1.C, x,y,z,t | | | | | | |
| 1.1.1.1.1 | silver necklace | 1.1.1.1.1.D, x,y,z,t | | | | | | |
| 1.1.1.1.1 | silver necklace | 1.1.1.1.1.E, x,y,z,t | | | | | | |
| 1.1.1.1.2 | | | | | | | | |
| | | | | | | | | |
| | | | | | | | | |

FIG. 7

App Store

Login & SignUp

Contact Finder & Tutorial

The Feed

Comment & Share

Shop VeePiO

Shop VeePiO Continued

How to Veep

Veep Editing Room

Object Details

"V"isibility

I Want it!

I Want it! Continued

Share & Comment

Veep Inventory

Buy Via Split Screen

VeePiO Account

VEEPIO database of personalized objects (Veep'd objects) - object is purchased from existing e-commerce site

| Media source | URL (all are http://www.amazon.com/...) | Frames of media source that contain the object (for video media sources) | Object identifier SKU/UPC/EAN/ASIN/Model #/Mfr # (if available) (Entry in VEEPIO database of described objects) | Content owner's description of object (details other than object identifier) | Social media feed regarding the object |
|---|---|---|---|---|---|
| Instagram URL | Crest-White-Whitestrips-Professional-Effects/dp/B00336EUTK | | Crest 3D White Whitestrips Professional Effects - Teeth Whitening Kit 20 Treatments ASIN: B00336EUTK | | |
| YouTube URL | Crest-White-Whitestrips-Professional-Effects/dp/B00336EUTK | | Crest 3D White Whitestrips Professional Effects - Teeth Whitening Kit 20 Treatments ASIN: B00336EUTK | | |

Fig. 31A

VEEPIO database of personalized objects (Veep'd objects)

| Media source | Product description web page (maintained by VEEPIO or manufacturer) | KEY FRAMES Frames of media source that contain the object (for video media sources) | Object identifier SKU/UPC/EAN/ASIN/Model #/Mfr # (if available) (Entry in VEEPIO database of described objects) | Content owner's description of object (details other than object identifier) | Social media feed regarding the object |
|---|---|---|---|---|---|
| Instagram URL | http://veepio/... OR http://crest.com/... | | Crest 3D White Whitestrips Professional Effects - Teeth Whitening Kit 20 Treatments ASIN: B00336EUTK | | |
| YouTube URL | http://veepio/... OR http://crest.com/... | | Crest 3D White Whitestrips Professional Effects - Teeth Whitening Kit 20 Treatments ASIN: B00336EUTK | | |

Fig. 31B

VEEPIO database of personalized objects (Veep'd objects) - URL is auctioned for each purchase

| Media source | URL (all are http://veepio/...) | Frames of media source that contain the object (for video media sources) | Object identifier SKU/UPC/EAN/ASIN/Model #/Mfr # (if available) (Entry in VEEPIO database of described objects) | Content owner's description of object (details other than object identifier) | Social media feed regarding the object |
|---|---|---|---|---|---|
| Instagram URL | johndoe/00001 | | Canon EOS Rebel T5 Mfr #: 9126B069 | | |
| Instagram URL | johndoe/00002 | | Ray-Ban Aviator Classic RB3025 | | |
| Instagram URL | johndoe/00003 | | Red men's t-shirt (large) | | |
| YouTube URL | johndoe/10001 | | Canon EOS Rebel T5 Mfr #: 9126B069 | | |
| YouTube URL | johndoe/10002 | | Ray-Ban Aviator Classic RB3025 | | |
| Instagram URL | janedoe/00001 | | Canon EOS Rebel T5 Mfr #: 9126B069 | | |
| Instagram URL | janedoe/00002 | | Ray-Ban Aviator Classic RB3025 | | |
| YouTube URL | janedoe/10001 | | Canon EOS Rebel T5 Mfr #: 9126B069 | | |
| YouTube URL | janedoe/10002 | | Ray-Ban Aviator Classic RB3025 | | |

Fig. 31C

"Track" Feature

Fig. 34

Veep Type Choices (Veep)

| # | Field | Attribute |
|---|---|---|
| 1 | veepID | IntegerField |
| 2 | created | DateTimeField |
| 3 | creatorEmail | CharField (200) |
| 4 | title | CharField (200) |
| 5 | description | TextField |
| 6 | veepScore | FloatField |
| 7 | heroImageURL | CharField (200) |
| 8 | contentURL | CharField (200) |
| 9 | veepFileURL | CharField (200) |
| 10 | private | BooleanField |
| 11 | hidden | BooleanField |
| 12 | veepType | CharField (200) |
| 13 | geoTag | CharField (200) |
| 14 | owner | IntegerField |

Media Type Choices (VeepTrack)

| # | Field | Attribute |
|---|---|---|
| 1 | veepTrackID | IntegerField |
| 2 | created | DateTimeField |
| 3 | title | CharField (200) |
| 4 | description | TextField |
| 5 | url | CharField (1024) |
| 6 | mediatype | CharField (200) |
| 7 | veep | IntegerField (veepID) |

Media Type Choices (VeepTrackCoordinate)

| # | Field | Attribute |
|---|---|---|
| 1 | created | DateTimeField |
| 2 | frame | CharField (200) |
| 3 | x | FloatField |
| 4 | y | FloatField |
| 5 | veepTrack | IntegerField (veepTrackID) |

Process flowchart

ProFlowers: Flowers | Online Flower Delivery | Send Flowers
www.proflowers.com/ ▼ ProFlowers ▼
Send the freshest flowers sourced directly from farms. Wide section of floral arrangements. 99% on-time flower delivery. 7-day freshness guaranteed.

Flowers Online | Online Flowers | FromYouFlowers ®
www.fromyouflowers.com/flower/type ▼
Shop flowers to find the perfect floral gift to send to celebrate today's special occasion. From You Flowers online shop offers the freshest online flowers to make ...

Old City Flowers: Philadelphia Florist - FREE Flower Delivery in ...
www.phillysbestflorist.com/ ▼
Old City Flowers, a florist in Philadelphia, has FREE, same-day hand delivery for fresh, elegant & affordable arrangements. Get hand-selected, quality flowers ...

Philadelphia Florist - Robertson's Flowers Philadelphia Flower Delivery
https://www.robertsonsflowers.com/ ▼ Robertson's Flowers ▼
Robertson's Flowers & Events is Philadelphia's Premier Florist offering same day flower delivery to Philadelphia, Chestnut Hill, Bryn Mawr, Haverford, ...

Teleflora: Flowers | Flower Delivery | Send Fresh Flowers Online
www.teleflora.com/ ▼ Teleflora ▼
Flower delivery by local florists, order flowers online to send a thoughtful gift. Teleflora bouquets are hand arranged and available for same day delivery.

Philadelphia Flower Co.: Philadelphia Florists - Flowers in ...
www.philadelphiaflowerco.com/ ▼
Order flowers online with Same Day Delivery from Philadelphia Flower Co.. Fresh flowers and hand delivered right to your door. Experience the Teleflora ...

First Flower Grown in Space Station's Veggie Facility | NASA
www.nasa.gov/image-feature/first-flower-grown-in-space-stations-veggie-facility/
16, 2016, Expedition 46 Commander Scott Kelly shared photographs of a blooming zinnia flower in the Veggie plant growth system aboard the ...

The Secrets Behind Your Flowers | People & Places | Smithsonian
www.smithsonianmag.com/people-places/the-secrets-behind-your-flowers-53128/
In 1967 David Cheever, a graduate student in horticulture at Colorado State University, wrote a term paper titled "Bogotá, Colombia as a Cut-Flower Exporter for ...

Top 20 Perennials for Your Garden - Better Homes and Gardens
www.bhg.com/gardening/flowers/perennials/top-perennials-for-your-garden/
Here's an easy-grow collection of the best, most beautiful perennial flowers that are perfect for any garden -- especially if you're a beginner!

Fig. 42

Monetization

Exchange/Real-Time Auction

Fig. 55A

Fig. 55B – "Auction"

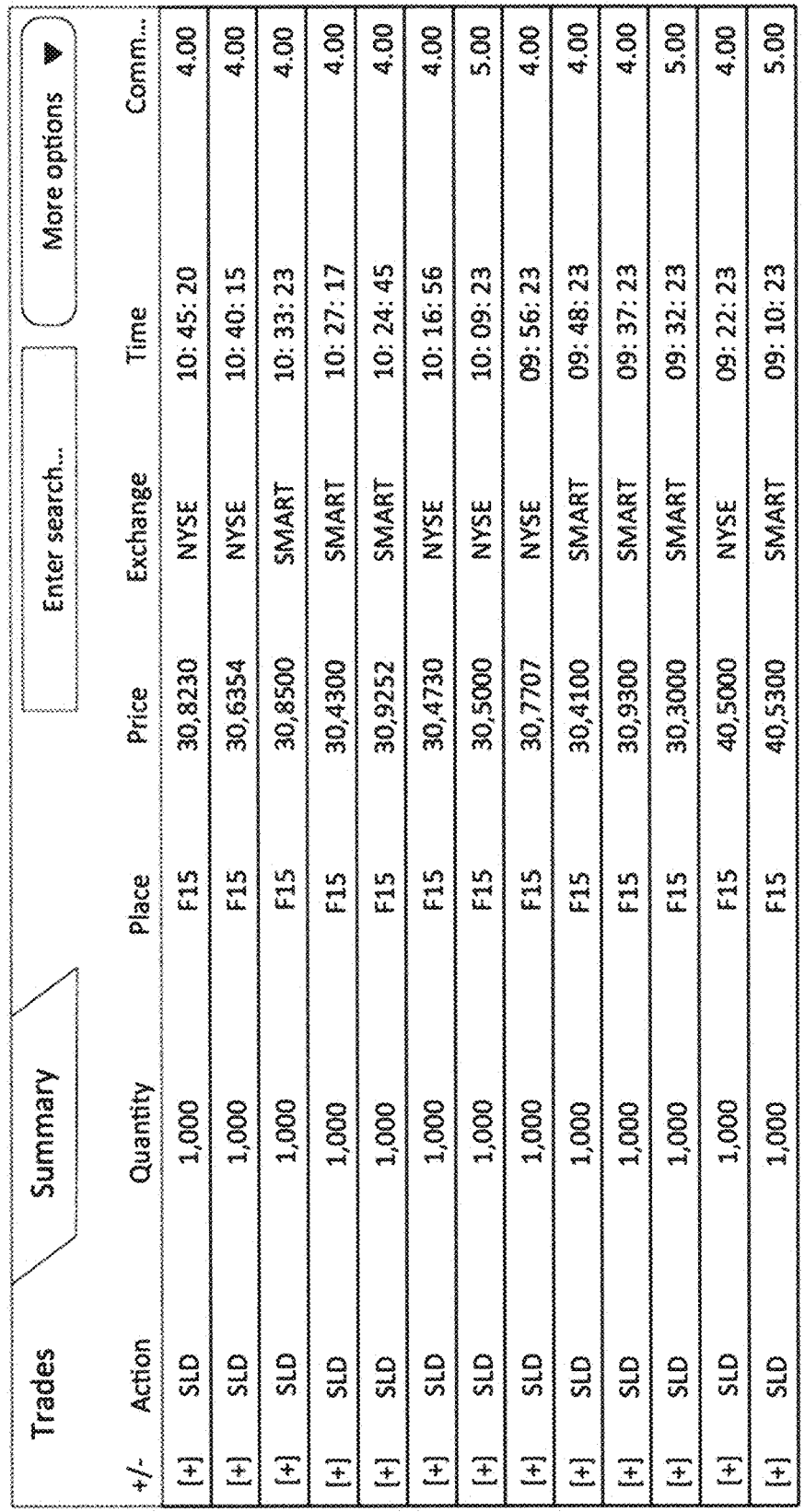
Fig. 55C – "Price History"

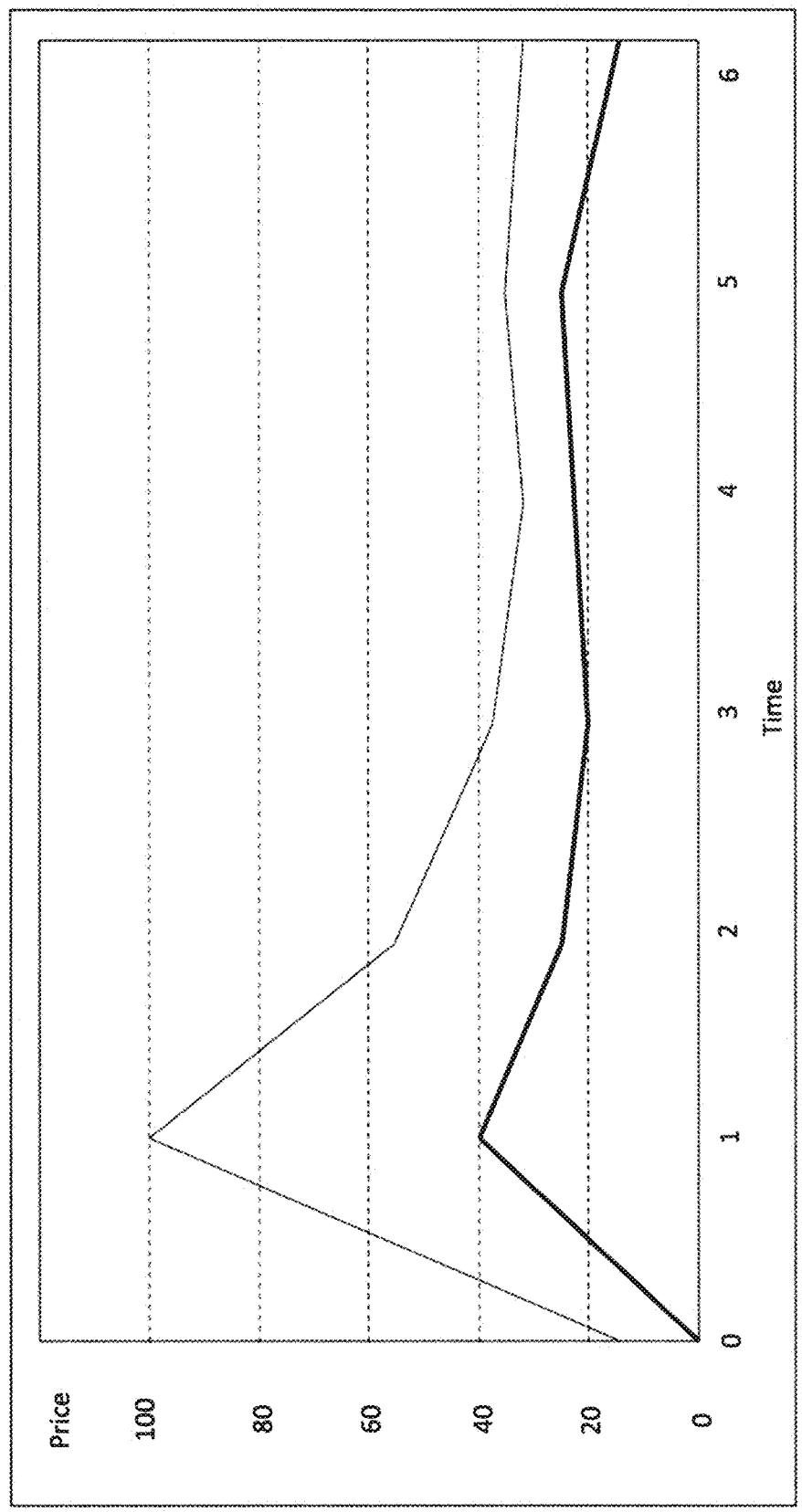
Fig. 55D – "History Chart"

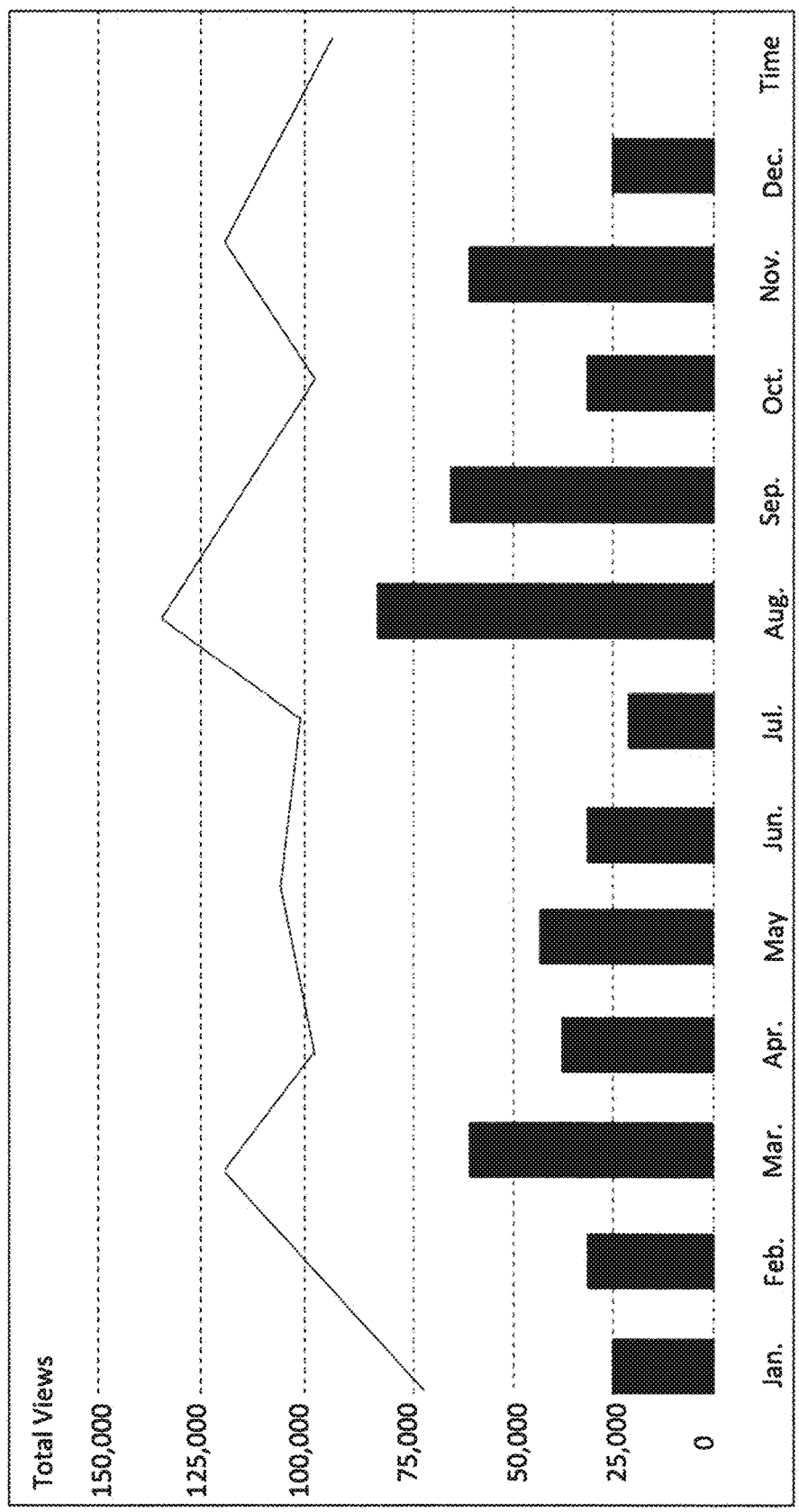
Fig. 55E – "Total Views"

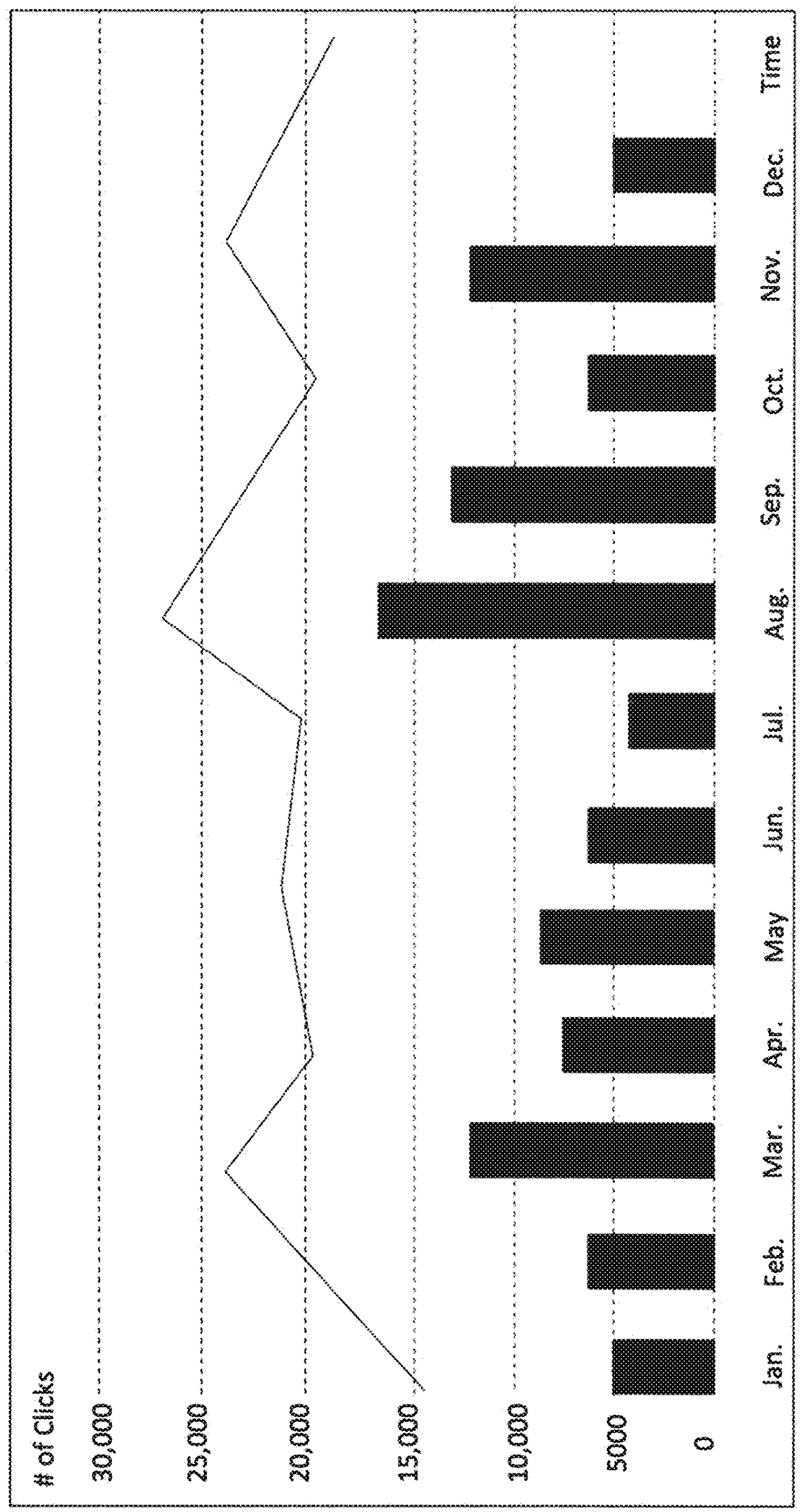
Fig. 55F – "Total Clicks"

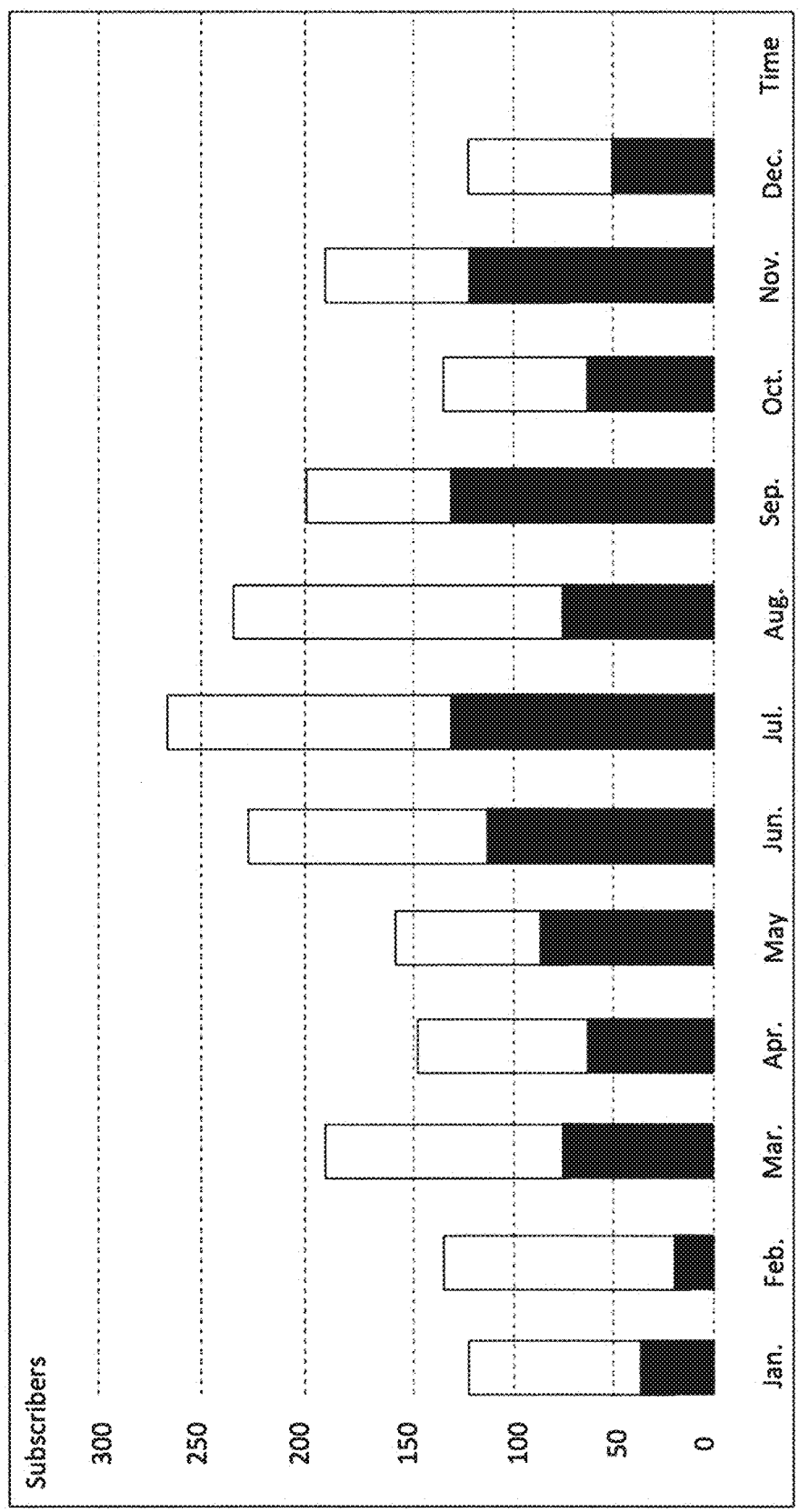
Fig. 55G – "Subscribers"

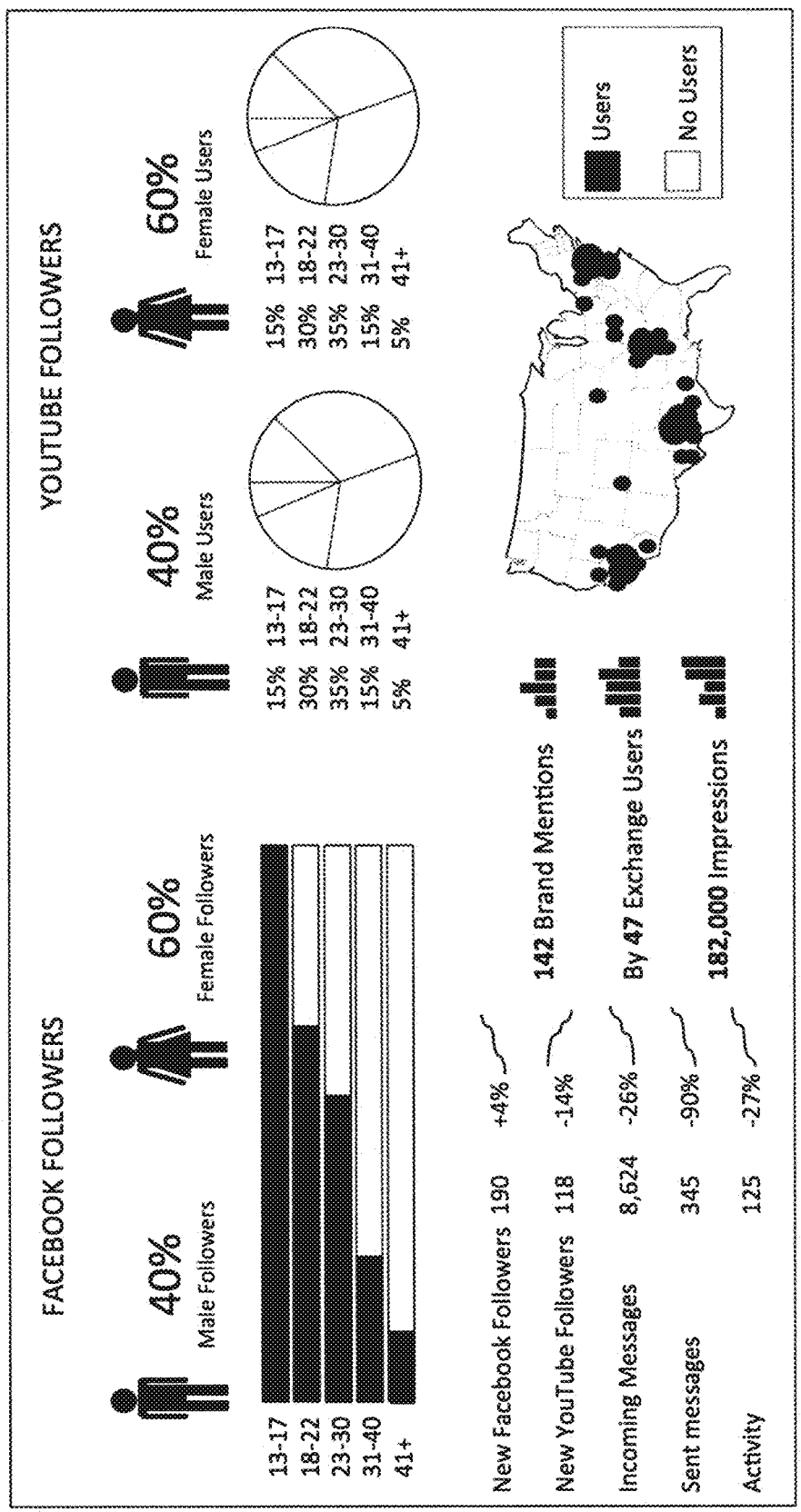
Fig. 55H – "Social Penetration"

COMPUTER PROGRAM PRODUCT FOR ALLOWING A USER TO CREATE AN INTERACTIVE OBJECT IN A CONTENT OWNER'S DIGITAL MEDIA FILE

CROSS-REFERENCE TO RELATED APPLICATIONS

This application is continuation of copending U.S. Non-Provisional patent application Ser. No. 15/180,949 filed Jun. 13, 2016, which is incorporated by reference herein.

The present application claims priority to U.S. Provisional Application No. 62/174,851, filed on Jun. 12, 2015, which is hereby incorporated by reference.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The present invention relates to a system for automatically segmenting and classifying video content objects within a video, auctioning rights to hyperlinks that associate relevant content with the video objects, and creating an overlay with select video objects which enables a video viewer to interact with video object in the video and interact with the relevant content.

2. Background

Video is the technology of electronically capturing, recording, processing, storing, transmitting, and reconstructing a sequence of still images representing scenes in motion. Video technology was first developed for television systems, but has been further developed in many formats to allow for viewer video recording. Motion pictures on film can be converted into video formats. Video can also be viewed through the Internet (World Wide Web) as downloaded video files or streaming files on computer monitors or mobile phones. Video can also be viewed on social media applications.

Animation is the rapid display of a sequence of images of artwork or model positions to create an illusion of movement. It is an optical illusion of motion due to the phenomenon of persistence of vision, and can be created and demonstrated in a number of ways. The most common method of presenting animation is as a motion picture or video, although several other forms of presenting animation also exist.

Video content segmentation is the systematic decomposition of a motion picture into its individual frames in chronological order, and then deconstructing the frame into its objects (components) such as a person, a shirt, a tree, a leave etc. Segmenting video content results in a large number of objects with little value if not classified.

Classification is the process of assigning an object of one frame to the same class of the same object of another frame. It enables the automated recognition that a specific red shirt in one frame is the same as the red shirt in another frame. There are several approaches to assigning video objects to the class they belong to such as by the contours of its appearances in successive video frames. For example, this may be done by matching curvature features of the video object contour to a database containing preprocessed views of prototypical objects. See, "MOCA Project: Object Recognition," Copyright © 2009 Praktische Informatik IV, University of Mannheim.

For each two-dimensional appearance of an object in a video frame curvature features of its contour are calculated. These features are matched to those of views of prototypical video objects stored in a database. By applying context rules such as "a house may have a car in the frame or may have a tree in the frame but does not have a TV in the frame" the accuracy can be increased. The final classification of the object is achieved by integrating the matching results for successive frames.

There are several paradigms and algorithms for video segmentation and classification. Most are based on segmenting video into layers such as a static background layer and a dynamic foreground layer and using multiple cues, such as spatial location, color, motion, contours and depth discontinuities, etc.

Rotoscoping is an animation technique in which animators trace over live action film movement, frame by frame, for use in animated films. Digital Rotoscoping as disclosed in U.S. Pat. No. 6,393,134 (Tostevin et al.) uses algorithms to create vector outlines of video objects.

By shooting video from several perspectives with synchronized cameras, video segmentation algorithms can be used to automatically reconstruct 3D wireframes of moving objects. If video segments show multiple perspective of one video object, 3D wire frames can be constructed even if only one camera was used as long as the camera captured many perspectives of the object.

In one embodiment of the invention automatic rotoscoping techniques are applied to videos which have been shot by multiple camera angles to reconstruct the 3D objects and save their wireframes in form of vector data into the video object database. In another embodiment rotoscoping techniques are applied to videos which have been shot by one camera but many perspectives of the video objects are available. When a viewer selects an object for which there is 3D information available, the viewer is presented with a means to control the animation of the 3D object such as rotate, move, scale etc. In yet another embodiment of the invention animated 3D objects are positioned into videos to replace or superimpose video objects. These animated 3D video objects may have been derived from digital rotoscoping or may be animated objects from scratch.

An object of the invention is to provide an automated system for segmenting raw video to create an inventory of video objects which may be used to make the video interactive, and to auction these video objects to retailers, brands or affiliates. The term video object is defined as data and visualizations of data which relate to content objects of videos such as a shirt. This data may include image data, or vector graphic data which has been linked to the content object of a video or has been generated from video data.

The invention is not tied to any specific method of segmenting or classifying video content objects.

In one embodiment of the invention an object information library which contains descriptive information and/or metadata regarding objects which may appear in the video is used to associate meta data such as product information, unique product identification information or stock keeping units with the segmented video objects.

A further object of the invention is to create an electronic market exchange whereby rights to one or an inventory of hyperlinks that are embedded within the interactive layer of video objects and control where a viewer is redirected to if they interact with the video object or objects, are automatically auctioned to a third party such as an retailer, brand, affiliate and/or advertiser.

SUMMARY OF THE INVENTION

A system is provided for identifying objects in video either automatically by using an object database or manually by using information provided by the creator of the video, making the objects interactive in every frame of the video that they appear, allowing the creator to embed information behind the video objects that appears when a viewer hovers over, clicks or touches the object, allowing the creator to describe at least one object that appears in a video, associating a hyperlink with a clickable space around the object in every frame that the object appears in, and electronically auctioning the rights to the hyperlink and what data the hyperlink connects to. The system includes a video server communicating with a consumer server over a distributed network. The video server includes at least one video file, an object inventory database, and relevant content including associated hyperlinks in a database stored on or accessible to the video server. The object inventory database contains information describing a location of at least one video object within at least one video file and the hyperlink that is associated with the object. A video overlay links the relevant content with a given video object and creating a selectable hyperlink whose position tracks a dynamic location of the video object in the video. The consumer server includes a software application for accessing and displaying at least one video file stored in the video database, the software application including means for interacting with the video overlay to select an object displayed in the video file.

More specifically, a system is disclosed for viewing video having segmented video objects. The system includes a video server including a computer or mobile device connectable to a distributed network and having a processor, random access memory, read-only memory, and mass storage memory. At least one video file is stored in a video database on or accessible to the video server. An object inventory database is stored on or accessible to the video server, the object inventory database containing information describing a location of at least one video object within the at least one video file. Object description content is stored in a database stored on or accessible to the video server. A video overlay links the object description content with a given video object and creating a selectable hyperlink whose position tracks a dynamic location of the video object in the video, wherein the video overlay is adapted to allow a consumer to interact with the video overlay to select an object displayed in the video file and be displayed content related to the object that has been added by the creator of the video, and/or content that has been added automatically by the system, or content that has been added a viewer or viewers of the video. The system also allows a viewer to click a button that has a hyperlink associated with it that takes the viewer to an online store where a product or products associated with the object in the video can be purchased. The viewer also has the ability to add the selected object to a collection of objects. The viewer also has the ability to share a hyperlink directly associated with the video and the object with other people over a social network, email, the internet, mobile messaging and any other commonly used electronic forms of communication.

In some embodiments, the video server of the aforementioned system may include a software application for displaying content associated with the object.

In some embodiments, the video server of the aforementioned system may include a software application for storing one of the object or a data associated with the object in a collection of objects. The video server may include software for sharing the collection of objects or sharing a data associated with the collection of objects. The video server may share the collection of objects or data associated with the collection of objects with a social networking service (or social networking server) via the distributed network. The video server may post the collection of objects or data associated with the collection of objects to a social networking server accessible service via the distributed network. The social networking server may issue an alert to at least one user-specified person that data is posted to the server.

According to one aspect of the aforementioned system, the video server includes a software application for searching at least one of the object inventory database and the at least one video file for occurrences of the selected object, and selectively displaying segments of the at least one video file containing the selected object.

According to one aspect of the aforementioned system, the video server includes a software application for searching at least one of the object inventory database and video files in the video database for occurrences of the selected object, and selectively displaying segments of the at least one video file containing the selected object.

According to one aspect of the aforementioned system, the video server includes a software application for purchasing an item associated with the selected object.

According to one aspect of the aforementioned system, the video server includes video consumer software application including a content display application that interacts with the video overlay and displays relevant content when a given video object is selected hovered-over or pointed at with a pointing device.

According to one aspect of the aforementioned system, the video server includes a software application for storing one of the object or a hyperlink associated with the object in at least one user-defined collection of objects.

Also disclosed is a method for trading and/or purchasing rights to hyperlinks that are associated with video objects on an electronic market exchange, comprising providing at least one video file stored in a video database on or accessible to a video server via a distributed network; providing an object inventory database stored on or accessible to the video server via the distributed network, the object inventory database containing information describing a location of at least one video object within the at least one video file; providing a video overlay linking with a given video object and creating a selectable hyperlink whose position tracks a dynamic location of the video object in the video; accessing and displaying the at least one video file; and interacting with the video overlay to select an object displayed in the video file.

The aforementioned method may comprise a step of displaying content associated with the selected object.

The aforementioned method may comprise a step of storing one of the selected object or a hyperlink associated with the selected object in a collection of objects. Moreover, the method may include a step of sharing the collection of objects or sharing a hyperlink associated with the collection of objects via the distributed network. The video server may post the collection of objects or data associated with the collection of objects to a social networking server accessible service via the distributed network.

The aforementioned method may comprise a step of a step of searching at least one of the object information library and the at least one video file for occurrences of the selected object, and selectively displaying segments of the at least one video file containing the selected object.

The aforementioned method may comprise a step of a step of searching at least one of the object information library and video files in the video database for occurrences of the selected object, and selectively displaying segments of the at least one video file containing the selected object.

The aforementioned method may comprise a step of purchasing an item associated with the selected object. The purchasing step may be performed by a software application executed on the video server.

Also disclosed is a method for ranking the duration of object appearances in video files according to a duration of time, frequency and context a given object appears in the video. The method comprises providing a database of video files; searching each video file for the appearances of at least one object; determining a duration of time, frequency and context that the at least one object was displayed in each video file; and for each video file outputting information specifying the title of the video file and duration of time, frequency and context.

The method further includes outputting information specifying a ranking of the duration of time, frequency and context in a given video file relative to each of the other video files in the database.

The method may further include searching each video file for the appearance of first and second objects; determining a duration of time that each of the first object and the second object were displayed in each video file; and for each video file outputting information specifying the title of the video file and each duration of time.

The method includes automatic rotoscoping to reconstruct the 3D objects and save their wireframes in form of vector data into the video object database and allowing users to interact with the 3D objects.

The method includes method of positioning animated 3D objects into videos to replace or superimposed existing video objects.

The method includes documenting user interaction with video objects, searches for video objects and sharing of objects and collections with a social network and providing analytics of such documentation to retailers, brands, affiliates, and/or advertisers. Disclosed is a system for creating an interactive overlay for a video, including a server including a computer having a processor, random access memory, read-only memory, and mass storage memory. The server includes one or more video files stored in a video database; an object inventory database stored on the server and containing information describing a location of at least one video object within one of the video files; and an overlay generation application (software or firmware) executed on the server. The overlay generation application creating a video overlay including at least one selectable hyperlink whose shape and position (coordinates) track a dynamic location of the video object in the video, and storing the overlay on the server.

The method also includes a way to search the video database and the object database by analytics related to the content, such as number of views, number of clicks, number of objects clicked, number of clicks on an object, number of shared videos, number of shared objects, total views for other videos created by the same creator, conversion rates, purchases associated with the content, click through rates, and other analytical data commonly used in online vide and social video.

The method also includes a way to display the analytical information associated with the video including charts and other graphical ways of displaying data.

The system of claim may further include a wireframe database stored on the server, the wire frame database storing a three-dimensional wireframe representation of at least one video object. The aforementioned overlay generation application matches occurrences of video objects in the object inventory library with three-dimensional wireframe representations of at least one video object and creates a video overlay including matched wire frame representations of the at least one video object wherein the shape and position of the wire frame representation tracks a dynamic location of the video object in the video.

Also disclosed is a system for making an interactive overlay for a video, including: a server including a computer having a processor, random access memory, read-only memory, and mass storage memory, the server including one or more video files stored in a video database. The system further includes an object inventory database stored on the server and containing information describing a location of at least one video object within one of the video files; a wire frame database stored on the server, the wireframe database storing a three-dimensional wireframe representations of at least one video object; and an overlay generation application (software or firmware) executed on the server, the overlay generation application matching occurrences of video objects in the object inventory library with three-dimensional wireframe representations of at least one video object and creating a video overlay including matched wire frame representations of the at least one video object wherein the shape and position of the wireframe representation tracks a dynamic location of the video object in the video, and storing the overlay on the server. The video overlay may optionally include at least one selectable hyperlink whose shape and position tracks a dynamic location of the video object in the video.

Also disclosed is a system for making an interactive overlay for a video, including a server including a computer having a processor, random access memory, read-only memory, and mass storage memory, the server including one or more video files stored in a video database. The system further includes an object inventory database stored on the server and containing information describing coordinates of at least one video object within one of the video files; a wireframe database stored on the server, the wireframe database storing three-dimensional wireframe representations of at least one video object; and a wireframe generation application executed on the server, the wireframe generation application selecting a video object from the video object inventory database and generating a three-dimensional wireframe of the selected video object from multiple perspective occurrences of the video object in the video file and storing the three-dimensional wireframe in the wire frame database. The wireframe generation application may optionally generate a lighting model for each occurrence of a video object in a video frame from light distribution on the video object.

The aforementioned system may further include an overlay generation application executed on the server, the overlay generation application matching occurrences of video objects in the object inventory library with three-dimensional wireframe representations of at least one video object and creating a video overlay including matched wire frame representations of the at least one video object wherein the shape and position of the wire frame representation tracks a dynamic location of the video object in the video, and storing the overlay on the server. The video overlay may optionally include at least one selectable hyperlink whose shape and position tracks a dynamic location of the video object in the video.

Also disclosed is a system for automatically segmenting and classifying video content into objects including: a server including a computer connectable to a distributed network and having a processor, random access memory, read-only memory, and mass storage memory, the video segmenting and classification server including one or more video files stored in a video database. The system further includes a wire frame database stored on the server, the wire frame database storing a three-dimensional wireframe representations of at least one video object and at least one of descriptive information and semantic information used to describe the object; an object inventory database containing information describing a location of at least one video object within one of the video files; and a video content analysis application executed on the processor, the video content analysis application segmenting the video files to identify locations of video objects, for each video object searching for a matching occurrence in the wireframe database, retrieving information describing the video object from the wireframe database, and storing in the object inventory database information describing the dynamic location of the video object within the video and information describing the video object.

BRIEF DESCRIPTION OF THE DRAWINGS

FIGS. 5 and 6A-6D are flowcharts showing the interactions of a viewer with the video object hyperlink exchange system according to the present invention;

FIG. 7 is an exemplary object inventory database;

FIGS. 31A-31C are sample VEEPIO databases for implementing e-commerce processes shown in FIGS. 30A-30E.

FIG. 34 is a sample table structure for tracked (Veep'd) objects.

FIGS. 37-50 are display screens showing app version examples of track feature and subsequent viewer interaction with tracked (Veep'd) objects.

FIGS. 53A-53H are display screens showing app version examples of the steps in the flowchart of FIG. 52.

FIGS. 55A-55H, taken together, show a dashboard display screen for use by auction participants in the Exchange/Real-Time Auction process.

DETAILED DESCRIPTION OF THE INVENTION

Figure 1:
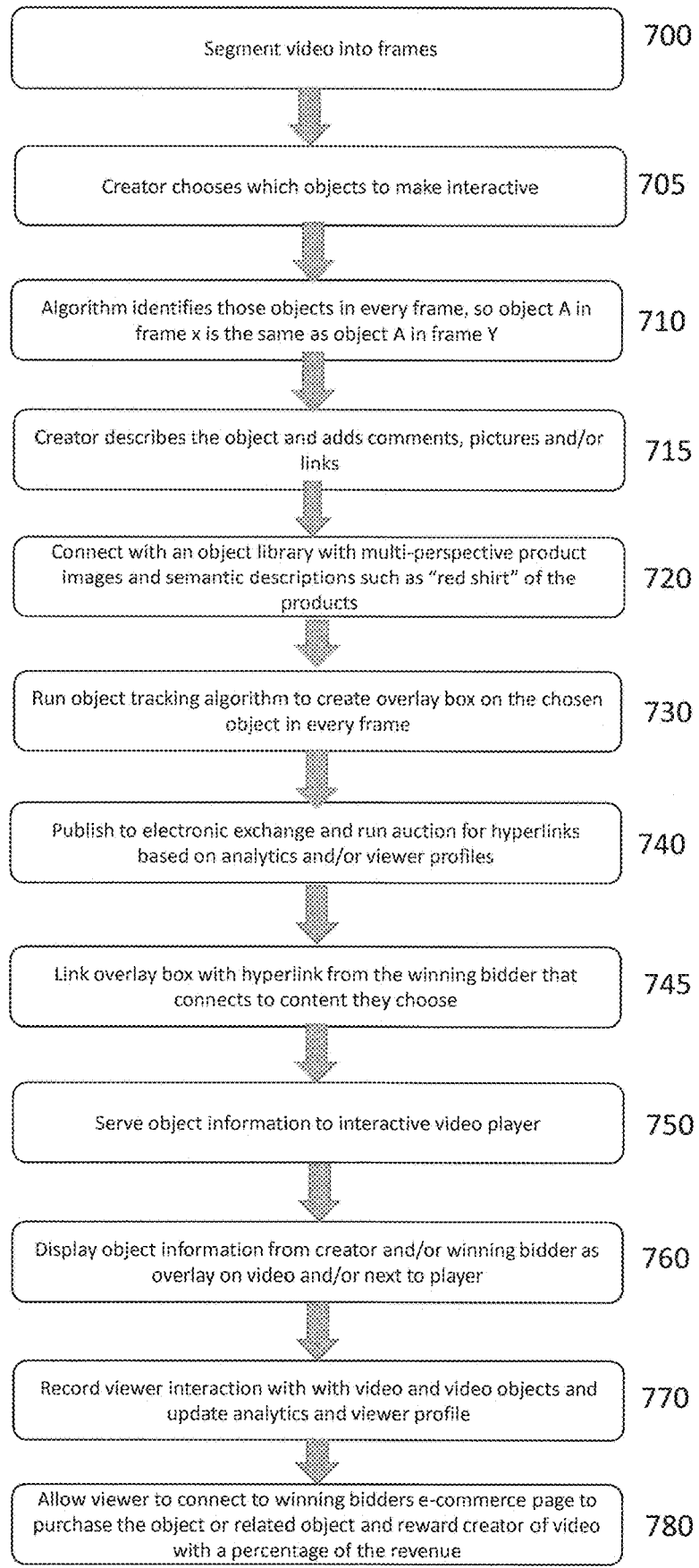
FIG. 1 is a flowchart of a video object hyperlink exchange (VOHE) process according to the present invention.

Certain terminology is used herein for convenience only and is not to be taken as a limitation on the present invention.

The present invention is described in the context of a commercial service referred to as VeePiO (also, referred to herein as "Veepio," "VEEPIO," "V.P.O." "VPO" and "Video Public Offering") which is provided by Veepio Holdings, LLC, New York, NY. The following narrative and figures describe a web-based process and a mobile app for using Veepio. However, the present invention is not limited to the Veepio embodiment and the features of Veepio may be used in other contexts.

This patent application includes an Appendix having a file named Appendix688954-1U2.txt, created on Aug. 25, 2022, and having a size of 13,610 bytes. The Appendix is incorporated by reference into the present patent application. One preferred embodiment of the present invention is implemented via the source code in the Appendix. The Appendix is subject to the "Copyright Notice and Authorization" stated above.

I. Embodiment 1

One preferred embodiment of the present invention is described in the context of a software program for lead management and customer prospecting for use by an insurance brokerage, and specifically to solicit, quote and bind insurance coverage for businesses. However, the present invention may be used in any field where lead generation and sales prospecting occurs. One preferred embodiment uses a customized version of Microsoft Dynamics® CRM. However, other software programs having similar capabilities may be used instead.

The present invention is a system 100 for automatically segmenting video into video objects, classifying the video objects either automatically or by the creator of the video, assembling a database of the classified video objects, defining region definition data representing each video object on an interactive layer, auctioning the rights to a hyperlink that is either displayed or associated with a button that appears when an object is interacted with by a viewer of the video, or that is connected directly to the object so that when a viewer clicks or touches the object while watching the video they are directed to a website or other content that the hyperlink is pointing to. Allowing the creator of the video to associate comments, pictures, audio, hyperlinks, and other content with interactive areas around objects in their videos. Allowing viewers of the video to interact with objects in the video by clicking or touching areas around objects in the video, and further allowing viewers to comment about those objects, share those objects by way of the internet or social media, and purchase those objects, or other objects associated with the objects by way of the previously mentioned hyperlinks. These hyperlinks associated with video objects are auctioned on a video object hyperlink exchange (hereinafter "VOHE") 300, and creating a video overlay with region definition data linking relevant content with the video content objects and thereby creating an interactive video. The creator of the video is reimbursed for the content by receiving a mutually agreed to percentage of the profits generated by the auction of the hyperlinks within the creators content. The region is a portion of the video frame which is congruent with the underlying video object. The region definition data defines such portion of the video frame. The system 100 of the present invention consists of several distinct yet related components.

One aspect of the invention relates to the creation of an inventory of video objects and corresponding region definition data. The video object inventory 114 is a database containing region definition data in form of pointers or references to video objects within video or animation files. Importantly, the region definition data is used to make the video interactive by providing the ability to link supplemental information with a specific video object within a video. For example, the video viewer can select a shirt displayed within the video and learn the brand and model of the shirt and other relevant information. Further, the viewer can also see comments, pictures, audio, and other content associated with the object by the creator of the video. The invention associates the relevant information with the video object thereby making the object a selectable hyperlink, meaning that the viewer can click or touch the object in any frame of the video in which the object appears and the related content will be revealed.

Figure 8A:
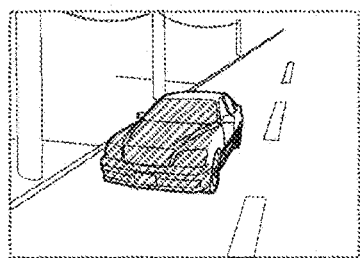
FIGS. 8A-8E are perspective views of a video object and a wire frame model created therefrom.
Figure 8B:
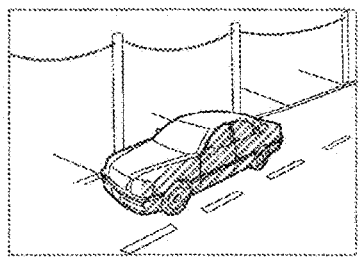
Figure 8C:
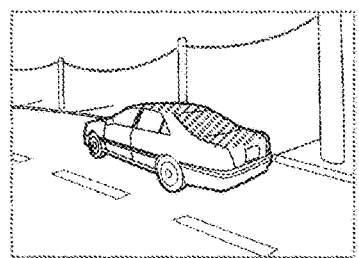
Figure 8D:
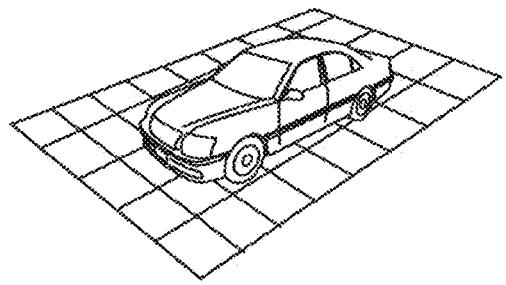

In one embodiment of the invention, recognized video objects are represented by 3D vector graphics data such as wire frame models FIG. 8D. The representation is created by computing the difference between perspective views FIG. 8A-8C on the object and then specifying each edge of the physical object where two mathematically continuous smooth surfaces meet, or by connecting an object's constituent vertices using straight lines or curves.

If not all views are available, then only a partial 3D model is created but completed once the missing views become available in additional videos.

Figure 8E:
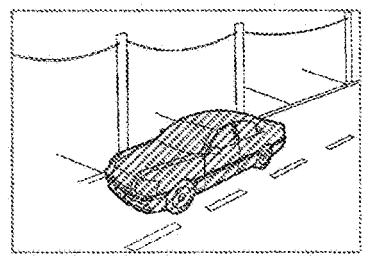

These 3D wireframe models may be used to improve the recognition of video objects but also may be used to represent the video objects as outlines of perspective views of the three-dimensional wireframe FIG. 8E. Such an embodiment allows users to rotate the view of the video object once selected. Furthermore, this embodiment allows additional animated 3D objects to be placed in videos complementing or superimposing original video objects.

According one embodiment, video objects are associated with meta-data and/or an object description which enables participants of the exchange (e.g., retailers, brands, affiliates and advertisers) to search for all instances of "pants" and the search results will include "khakis" as well. The object description may be part of a semantic network which allows auction bidders to specify the object and the video context on which they want to bid. This may be useful for preventing exposure of a retailers/brands/affiliates/advertisers content in contexts which are not appropriate for them. The term video object as used in this specification refers to a video frame component, e.g., a shirt, pants, a hat, shoes, a handbag or a purse which appears in the video or animation. In one embodiment of the invention, motion attributes such as fast, slow, up, down etc of video objects in the database will be indexed, which will allow auction bidders to specify their bids with motion attributes. In another embodiment, the states of objects will be indexed such as by means of facial expression algorithms already known in the art which extract the state of a person in a video such as happy or sad. According one embodiment a bidder can search for objects in videos by submitting a video object of an image of an object as the search input. In another instance exchange participants can cross reference or sort the results of their search by analytical data related to the videos or the objects such as the number of video views, the number of times an object is clicked on, historical information about the creator of the video, the number of purchases generated by the video objects, the length of the video, the amount of time an object appears in the video, or the pixel quality of the video.

Hereinafter reference to video should be understood to encompass 2D video, 3D video and animation unless an explicit distinction is made. The video object database includes detailed information for identifying the location, shape and movement of the video object within the video file. The video object inventory may include detailed descriptions of the specific object in the video content such as manufacturer, make, model, and color. As will be explained in further detail below, this detailed information may be used to link information such as relevant content with the video objects.

As will be explained below, according to various embodiments of the invention the video objects may be manually, semi-automatically or automatically identified and associated with relevant information.

A further aspect of the invention relates to the creation of an electronic auction or exchange for the right to own the hyperlink associated with interactive objects, this exchange will be referred to as a video object hyperlink exchange (VOHE) in this document. The VOHE is an electronic auction in which participants or "bidders" (retailers, brands, affiliates, advertisers) bid for the right to associate their relevant content with a given video object by acquiring the right to populate a hyperlink that is connected to a video object. It should be noted that the invention also enables a video content owner to only auction a certain portion of the video object inventory and sell the rest directly to an inventory buyer without the public bidding process.

Activation of Video Content

A further aspect of the invention relates to the creation of a video overlay which transforms "passive" video, e.g., video which you "passively" watch but with which you do not interact into interactive video where the viewer interacts with regions of the video by selecting, rolling over, pointing or touching at a region within the video (with a pointing device such as a mouse or with a finger) thereby triggering the display of relevant content associated with the object.

The use of hyperlinks within static media such as a website is well known. In video games and animations it is very common to click on objects. That is what makes it "interactive". Rich or interactive media refers to communication media that facilitates active participation by the recipient, hence interactivity. Traditional information theory would describe interactive media as those media that establish two-way communication. The present invention takes advantage of the two-way communication capabilities for documenting and analyzing user interaction with video objects including sharing of video objects or collections of objects with their social network via social network services. The present invention includes the creation of user profiles, which entail the history of interaction and sharing of video objects, and targeting relevant content to users of specific profiles. These profiles furthermore act as criteria for VOHE participants when they place their bids.

The invention also includes giving video viewers the ability to comment and communicate with each other and with the creator of the video in regards to a specific interactive object in the video. This is referred to as "sub-comments" and it differs from current comments on the internet and on social media in that sub-comments are accessed by viewers within the content related to the interaction of the viewer with a specific object within a video as opposed to comments that relate to the video as a whole.

Identification and Compilation of Video Content

The present invention segments video and animation content into its objects and stores, region definition data such as shape, x, y, and temporal coordinates, or in the case of volumetric video or volumetric animation, the invention stores shape, x, y, z, and temporal coordinates. The term "temporal coordinate" refers to time, video frame or the like. Further, the term "video frame" is intended to convey an instantaneous (still) image frame of the video or animation at a particular time (location within the video stream). All of these coordinates are necessary to specify the video objects within a frame at a given moment in time.

An object of the present invention is to take conventional video content analysis technology (computer vision algorithms, object tracking algorithms) such as currently used to identify a person within a crowd, or identify/inspect a widget on a conveyor belt and apply it to the field of marketing communication, advertising and commerce transaction. More particularly, it is an object of the invention to identify video objects of interest within video and animations. The identified video objects or content objects may be used to populate a video content inventory 114 used in a hyperlink exchange. Moreover, video may be activated or made interactive using region definition data linking video objects with relevant content.

The method of the present invention should be understood to include both motion picture and object based animation. Hereinafter reference to video should therefore be understood to include both motion picture and object based animation.

FIG. 1 is a high-level flow diagram of the method of a first embodiment of the present invention.

In steps 700 and 710 a video is segmented and classified using an automated or manual segmentation and classification application to create a list or table of objects. The segmentation process 700 yields a list of video objects throughout the video (including the temporal coordinates and region definition date for each object) and the classification process 710 matches occurrences of the same object in different frames of the video thereby eliminating duplication/redundancy. It should be noted that the location, size and shape of a video object can and usually will vary throughout a video. The size of an object varies depending on its proximity which will vary as the object moves throughout the video. Similarly, the shape of an object may vary depending on the perspective or vantage point from which it is seen, e.g. frontal view versus side view. Moreover, the system of the invention is able to segment, track and classify a moving object. Thus the location of the video object dynamically changes as the underlying object moves, which is represented in the region definition data.

In step 720, the video objects are compared with objects in an object library, which may be 2D (two-dimensional) or 3D (three-dimensional) wire frame data representing objects within the video. Perspective views from such 2D/3D wire frame models may be advantageous to the automatic object recognition process. This step is optional. If a match is detected then the object is associated with the product description and/or meta-data from the object library. The unmatched video object may be discarded or subjected to a secondary processing application and/or an analyst may manually identify/configure the object boundaries (step 730), and then the object may be subject to another classification step (710) and/or another comparison with objects in the object library (720). The creator of the video can also choose which objects they want to make interactive (705) and they can identify those objects with a dynamic bounding area that will change size proportionate to the change in size of the object from frame to frame as it is tracked by an object tracking algorithm. The creator can also describe, comment and add additional content to an object in the video that they have chosen to make interactive (715). This content will appear to a viewer when they interact with the bounding area around the object in any frame that the object appears by clicking, hovering over, or touching any point within the bounding area.

In step 740, the video objects are published to the market exchange and subject to an automated auction process. The auction allows retailers, brands, and affiliates/advertisers to bid for the right to assign a hyperlink to a video object that takes a viewer of the video who has interacted with that object to a website where that object or any object the winning bidder chooses can be purchased, or to any other content the winning bidder would like to associate with that object.

In step 745 a video overlay is created which links the video object with the winning bidders provided content, and in step 750 the video overlay with region definition data is transmitted to the video broadcaster 120.

In step 760, a video viewer interacts with the video overlay by rolling-over or selecting a video region thereby triggering the display of relevant content associated with the video object. It should be appreciated that rolling over may illicit the display of different relevant content than that displayed when the object is selected. For example, selecting an object may trigger more detailed information than that displayed when the object is simply rolled-over with the pointing device.

In step 770 (optional), the VOHE 300 records the viewer interaction with the video objects and updates the viewer's behavioral profile. It should be noted that the video viewer's interactions with the video overlay (and the video objects) generally triggers the display of relevant content from the VOHE 300. This enables the content associated with a video object to be updated on-the-fly without the need to alter the video overlay. The video overlay makes the video interactive by making video regions selectable, the content comes from the object database that stores information submitted from the creator of the video as well as comments by viewers, in addition, content also comes from the VOHE 300 in the form of hyperlinks supplied by the winning bidders.

In step 780 (optional), the VOHE 100 completes a sales transaction initiated by the viewer's interactions with the video region representing the video object. As will be explained below in further detail, the VOHE 300 may enable the viewer to complete a sales transaction by following the hyperlink provided by the winning bidder to an online retailer.

Each of these steps will be described in additional detail below.

It should be appreciated that the relative order of steps can frequently be changed without impacting the system, for example steps 770 and 780 may be reversed without impacting the results. The listing of steps in a particular order should not be read as a limitation to a specific order unless it is clear from the context that a particular order is required.

In motion picture media, video content analysis technologies are used to identify objects based on size, shape, color, color density etc. The present invention is not limited to any particular method for identifying content objects within video and several different methods are discussed in detail below. Analysts or video creators may manually train the segmentation application 106 to recognize an object by, for example, tracing the outline of a video object or the system may present patterns of content objects it found by statistical pattern recognition.

A video content analysis or video analytics application 106 which is explained below in further detail automatically detects additional occurrences of the identified object in the video. If desired, the video content analysis application 106 may search the internet for occurrences of identified object. The video content analysis application 106 may be provided with an object information library 112 containing 2D/3D wire frame models or characteristics for identifying one or more pre-defined objects from one or more differing perspectives, or the video content analysis application 106 may be provided with heuristics for identifying objects. For each identified occurrence of an object, the VOHE 300 stores information for identifying the frame (temporal coordinate) and region definition data (location within the frame, e.g. x, y, and z coordinates) in which the object appears. Using the region definition data, the VOHE 300 is able to dynamically track an object. It should be noted that the size, shape and location of the selectable region (hyperlink) corresponds to the size, shape, and location of the underlying object.

According to one refinement of the invention, the auction is automatically triggered when a viewer accesses or requests access to video content.

According to another refinement of the invention, the auction may be triggered by expiration of a retailers/brands/affiliates/advertisers right to associate advertising with a given video object with a hyperlink. The auction may further be triggered each time video objects are added to the inventory of video objects or on a periodic basis, e.g., every hour, day, or week.

In one embodiment retailers/brands/affiliates/advertisers can upload a database of images, video objects or 2D/3D wire frames to find matches in movies across multiple databases. The retailer/brand/affiliate/advertiser then can select objects, target groups and viewing context to bid on.

In another embodiment VOHE 300 can present to the retailers/brands/affiliates/advertisers what objects are available in the video object database. The retailer/brand/affiliate/advertiser then can select objects, target group and viewing context to bid on.

According to yet another embodiment, the retailers/brands/affiliates/advertisers may search the database 114 of video objects (object inventory database) and purchase the rights to associate content with an object thereby bypassing the auction process, or may signal interest in participating in an auction by submitting an opening bid. Moreover, the retailers/brands/affiliates/advertisers may advise the VOHE 300 of particular market segments, demographics, user behavioral profiles or the like which it is interested in bidding on.

The retailers/brands/affiliates/advertisers 122 may be provided with viewer profile information pertaining to the video viewer 124 who triggered the auction such as taught in U.S. Pat. No. 6,718,551 entitled Method and system for providing targeted advertisements" which is hereby incorporated by reference. It should be noted that the viewer profile information is available because the video viewer 124 triggers the auction by requesting access to the video.

The viewer profile may be a multifaceted viewer profile identifying, among other things, the viewer's click history, purchasing habits, social network, history of geographic locations, browsing and search habits, and/or additional demographic data. The multifaceted viewer profile may be compiled, inter alia, from cookies stored on the viewer's computer, or from third party information of the viewer. The multifaceted viewer profile information may be used in determining the relative value of a given viewer for a given bidder (retailer/brand/affiliate/advertiser).

In addition to providing the bidders with viewer profile information, the VOHE 300 provides a list of the objects contained in a video or set of videos.

According to one embodiment, the VOHE 300 solicits bids on an individual basis for rights to use their hyperlink to associate relevant content with one or more of the video objects contained in the video accessed by the viewer. Thus, different retailers/brands/affiliates/advertisers may own temporary rights to different video objects in a given video.

It should be noted that the rights being auctioned are different from the traditional banner ads which are "pushed" to the video viewer. Push-advertising is advertising which is displayed on the top (banner) or the side of the viewer's display screen. Push-advertising is pushed to the viewer, i.e., the viewer does not specifically request the advertising. As will be explained below in further detail, according to one embodiment the video viewer pulls the relevant content by interacting with specific regions representing video objects within a video. For example the viewer may point to a video frame, which causes the video to slow down, select or roll-over a video object within the video thereby triggering the VOHE 300 to display contextual information linked or associated with the object as a pop up, overlay or in a field next to the video player. However, the VOHE 300 may combine the pull advertising with conventional push-advertising. For example, the VOHE 300 may push relevant content which relates to the objects as they appear in the video, or the VOHE 300 may push advertising relating to the type of objects with which the viewer has interacted e.g., object which the viewer has rolled-over or selected. The VOHE 300 may also simply provide a hyperlink that is associated with a clickable button that may say "I want this" or "buy this" or "more info" that appears in the content that is displayed post interaction with the video object that has been provided by the creator of the video and that may include comments from other viewers, and the ability to share, write additional comments etc. This is commonly referred to original or organic content.

As noted above, the VOHE 300 may provide 3rd parties such as retailers/brands/affiliates/advertisers 122 with the profile of an actual video viewer in real-time before making the bid. Alternatively, the VOHE 100 may simply auction rights to the video content objects for each of a plurality of market segments. For example, the VOHE 100 may segment the market by a combination of age, gender, income, region or spending habits etc. or by similarity of behavioral profile. If the auction occurs prior to access by the video viewer 124 it will not be possible to provide the retailers/brands/affiliates/advertisers (bidder) with actual viewer profile information and the VOHE 100 will auction the rights by market segment.

It should be understood that the term automatic as used herein refers to actions which take place without human intervention. In other words, the auction is initiated by the VOHE 300 simply by the addition of new content to the inventory 114 or the expiration of previously auctioned rights etc. The VOHE 300 can automatically segments video files and automatically classifies the video objects. The retailers/brands/affiliates/advertisers server may include an automated bidding application (software) which automatically submits bids to the VOHE 300, also known as an algorithm. Also, as will be explained below, the processing of video to create activated video objects, and the addition of such video objects to the inventory may itself occur without human intervention. Thus, the VOHE 300 may according to some embodiments be a fully automated system. The only requirement for the system to run fully automatically is a preprocessed database 112 with images of objects from different viewing angles or 3D wire frame models of the objects with object descriptions and/or access to the internet to search for additional images of objects.

Figure 2:
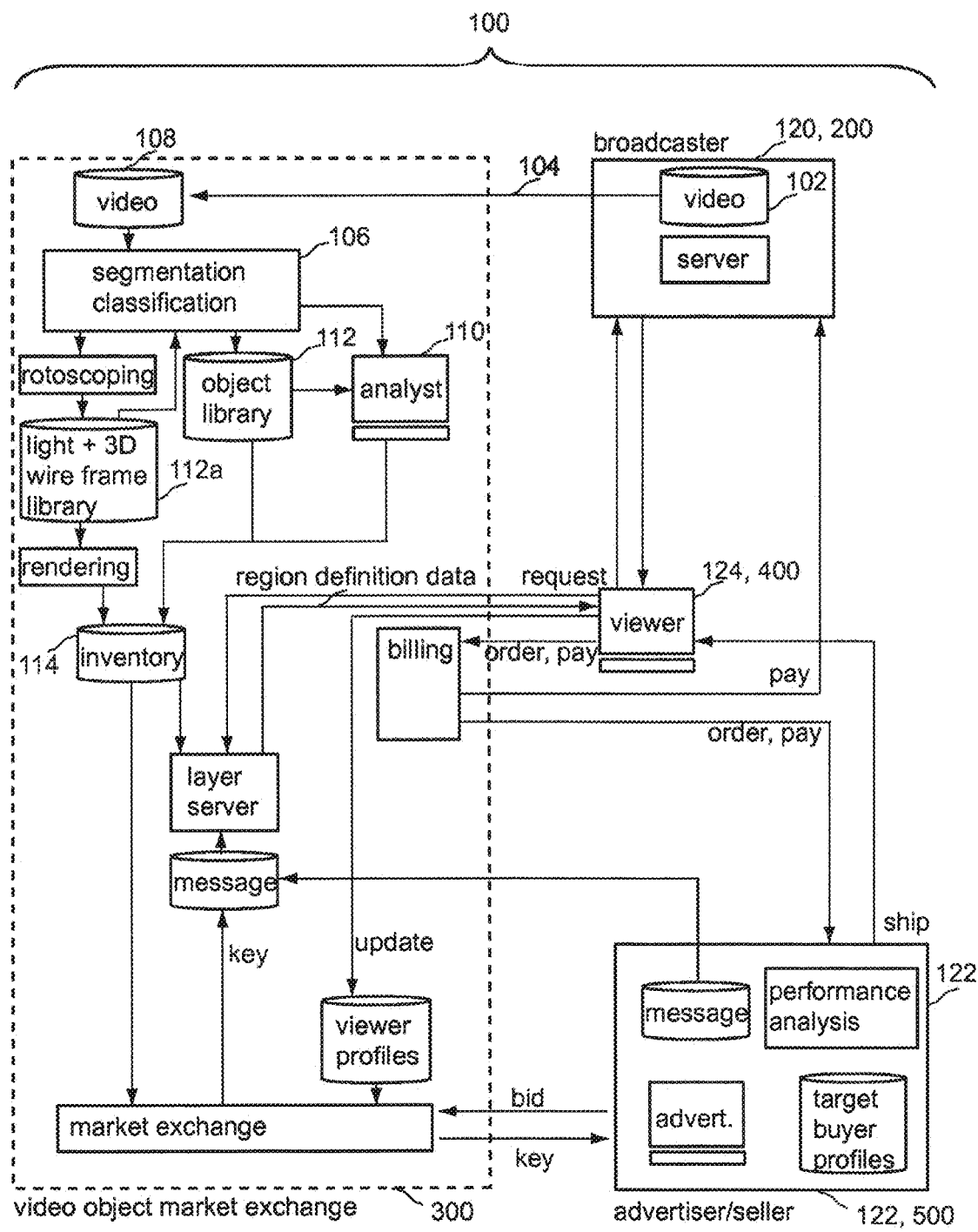
FIG. 2 is a block diagram of a video object hyperlink exchange (VOHE) system according to the present invention.

FIG. 2 is a block diagram of a first embodiment of the system 100 of the invention. Databases are described herein as being stored on a particular server; however, it should be understood that this concept includes a database stored on another server but which is accessible to the particular server. Moreover, reference to storing something (e.g., database or the like) on the server should be understood to encompass storing something on a mass storage device such as a hard drive, solid state memory or the like.

System 100 includes a database 102 of video content whose rights are owned by a video creator, a broadcaster 120 or the like. The database 102 may be video content stored on or accessible via the internet (world wide web) using a desktop computer, or a mobile phone. The content may also be accessible through a social network. The term "broadcaster" simply refers to the party who owns the rights to the video content and makes it available to viewers 124 via interactive TV or streaming websites.

The database 102 resides on a broadcaster server 200 or on a device which is accessible to server 200 (FIG. 2) which may be accessible over a distributed network 104 such as the Internet. Again, database 102 may be stored on a different server which is accessible to server 200. Server 200 includes a processor 202 which is connected via BUS 204 to a mass storage device 206, Read-Only-Memory (ROM) 208 and Random Access Memory (RAM) 210 (which may by volatile or nonvolatile). The database 102 may be stored in RAM 210, ROM 208, or mass storage device 206. Accessory devices such as keyboard 212, touch screen 214 which serves both as a keyboard and a display, display device 216, and pointing device (mouse) 218 may optionally be connected to the server 200.

The database 102 contains unprocessed or raw video content which is accessed by a video content segmentation and classification engine 106 hereinafter referred to as a content analysis application. The content analysis application can also be used by a video creator to manually identify and describe objects. The phrase "raw video content" refers to video which has not been processed to identify objects.

In FIG. 2, the database 102 is shown as copied to database 108; however, copying of the database 102 is optional.

Database 108 resides on a video segmentation and classification server 300 (FIG. 2) which may be accessible over a distributed network such as the internet 104. Hereinafter reference to accessing the database 102 should be understood to be synonymous with accessing database 108 and vice versa. Again, database 108 is described as residing on the server 300 but it can reside on any server which is accessible to the server 300, for example, over a distributed network such as the internet.

Server 300 includes a processor 202 which is connected via BUS 204 to a mass storage device 206, Read-Only-Memory (ROM) 208 and Random Access Memory 210 (which may by volatile or nonvolatile). The video file database 108 may be stored in RAM 210, ROM 208, or mass storage device 206. Accessory devices such as keyboard 212, touch screen 214 which serves both as a keyboard and a display, display device 216, and pointing device (mouse) 218 may optionally be connected to the server 300.

An inventory 114 of video objects is assembled by segmenting and classifying the raw video content from database 108 (or 102) to identify video objects therein. More particularly, the video content analysis application 106 segments the raw video content to yield a list of all the video objects in a given video. Then the video content analysis application 106 (which may be embodied in software or in a circuit, i.e. hardware or firmware) classifies the list of video objects to resolve occurrences of the same video object throughout the video. VOHE 300 may be provided with separate software applications for performing segmentation and classification, or a single software application may perform both segmentation and classification.

Also disclosed is a method for providing active regions for an interactive layer for a video application. The method includes accessing video data that defines a plurality of frames showing a plurality of video objects, each video object being shown in a sequence of frames, generating region definition data through using video object recognition algorithms including video object segmentation and classification. Such region definition data defines a plurality of regions, each region corresponding to one of the plurality of video objects, wherein the outline of each region defined by the region definition data matches the outline of the corresponding video object as it is shown in the sequence of video frames.

According to one refinement of the invention the outline of each region dynamically changes in the sequence of frames to match changes in at least one of the perspective and the size and the angle of view in which the corresponding video object is shown in the sequence of frames.

According to one refinement of the invention the outline around the interactive video objects can be a box, a circle, a halo effect, any other shape or effect or no affect at all. This can be chosen by the creator of the video, or it can be chosen by the viewer, or it can be an automatic default setting.

According to one refinement of the invention, region definition data is used to define a plurality of active regions for interactive video viewing.

According to one refinement of the invention, the frames are shown to a user on a display as a video, and the region definition data is used to determine whether a user action directed to a location of at least one of these frame addresses one of the active regions.

According to one refinement of the invention, in response to a determination that the user action addresses a certain active region, additional information is presented to the user, the additional information pertaining to the video object that corresponds to the certain active region.

According to one refinement of the invention, the region definition data for at least one region includes a three-dimensional wireframe representation of the video object that corresponds to the region.

According to one refinement of the invention, the region definition data for the region further contains, for at least one frame of the sequence of frames in which the corresponding video object is shown, data defining a perspective view of the three-dimensional wireframe representation, the outline of the perspective view of the three dimensional wireframe representation defines the outline of the region for the frame.

According to one refinement of the invention, the region definition data for the region further contains, for at least one pair of frames of the sequence of frames in which the corresponding video object is shown, data defining a change of the three dimensional wireframe representation between the frames of the pair of frames.

According to one refinement of the invention, the three-dimensional wireframe representation includes a plurality of nodes, and the data defining the change includes data that defines a displacement of a position of at least one node with respect to at least another node.

According to one refinement of the invention, the data defining the change includes data that defines a change in at least one of the size and spatial orientation of the 3D wireframe representation.

The video content analysis application 106 may access an object information library 112 which is a database stored on or accessible to server 300. For example, the object information library 112 may be stored on a memory device such as memory device 206 and/or RAM 210 used to store the program instructions for the video content analysis application 106. The library 112 stores images of objects from different viewing angles or 3D models of the objects. The image information may be used as the index or key to link descriptive information with the video object. The library 112 further contains one or more of an object identifier, label, and or meta-data description of the video object which may be used to describe the video content object to prospective bidders.

Alternatively, the content analysis application 106 may utilize logic to identify video content objects without recourse to object information library 112.

Applicant hereby incorporates by reference to U.S. Pat. No. 6,625,310 entitled "Video segmentation using statistical pixel modeling" which discloses one of many methods for segmenting video data into foreground and background portions which utilizes statistical modeling of the pixels. A statistical model of the background is built for each pixel, and each pixel in an incoming video frame is compared with the background statistical model for that pixel. Pixels are determined to be foreground or background based on the comparisons.

Applicant hereby incorporates by reference to U.S. Pat. No. 6,462,754 entitled "Method and apparatus for authoring and linking video documents" which discloses an authoring method for video documents, involves creating anchorable information unit file based on boundaries of objects of interest such that objects interest are used to identify portions of video data.

Applicant hereby incorporates by reference to U.S. Pat. No. 7,325,245 entitled "Linking to video information" which discloses a system which enables dynamic linking between a variety of video formats including television broadcasts, web pages, and video displays which are stored on magnetic or optical media. Each frame of the video information is identified together with a plurality of locations within that frame. The locations selected by the user, for example using a pointing device, are then used to access associated information either within the system itself or on an external system.

U.S. Patent Publication 2008/0294694 (Maghfourian) entitled "Method, apparatus, system, medium, and signals for producing interactive video content," which is incorporated herein by reference, discloses a method for producing interactive video content on a content publisher computer. The method involves associating indicia with at least one image portion in the video content, the indicia being operably configured to follow the at least one image portion as a display position of the image portion changes in the video content. The method also involves associating an image portion identifier with the indicia, and associating link properties with the indicia, the link properties being operable to cause transmission of a content location request to a registration server in response to selection of the indicia by a viewer of the interactive video content. The content location request includes the image portion identifier.

In case of a manual or semi-automated process, the inventory 114 may be created by the content analysis application 106 with the assistance and/or review of a human analyst 110 who may be the creator of the video. The analyst 110 may manually identify a given instance of a video object by, for example, viewing a still image of the video and tracing the video object (manual process), and then utilize the content analysis application 106 (semi-automated process) to identify other occurrences of the video object in the video. Additionally or alternatively, an analyst 110 may review and refine the boundaries of an unmatched video object, and then subject the object to a second round of classification and/or second round of matching the object with objects in the object library.

Alternatively, the analyst 110 may review and edit objects which were automatically identified by the content analysis application 106.

Thus far we have described the process by which an inventory 114 of video objects is created from raw video. The video object inventory 114 is stored on a storage device which is either accessible over the distributed network 104 (internet) or a copy of the database 114 is made accessible over the network 104.

It is important to note that the video objects are used to create selectable regions (hyperlinks) which dynamically track the movement, size and position of the object throughout the video.

3D Rotoscoping

Figure 12:
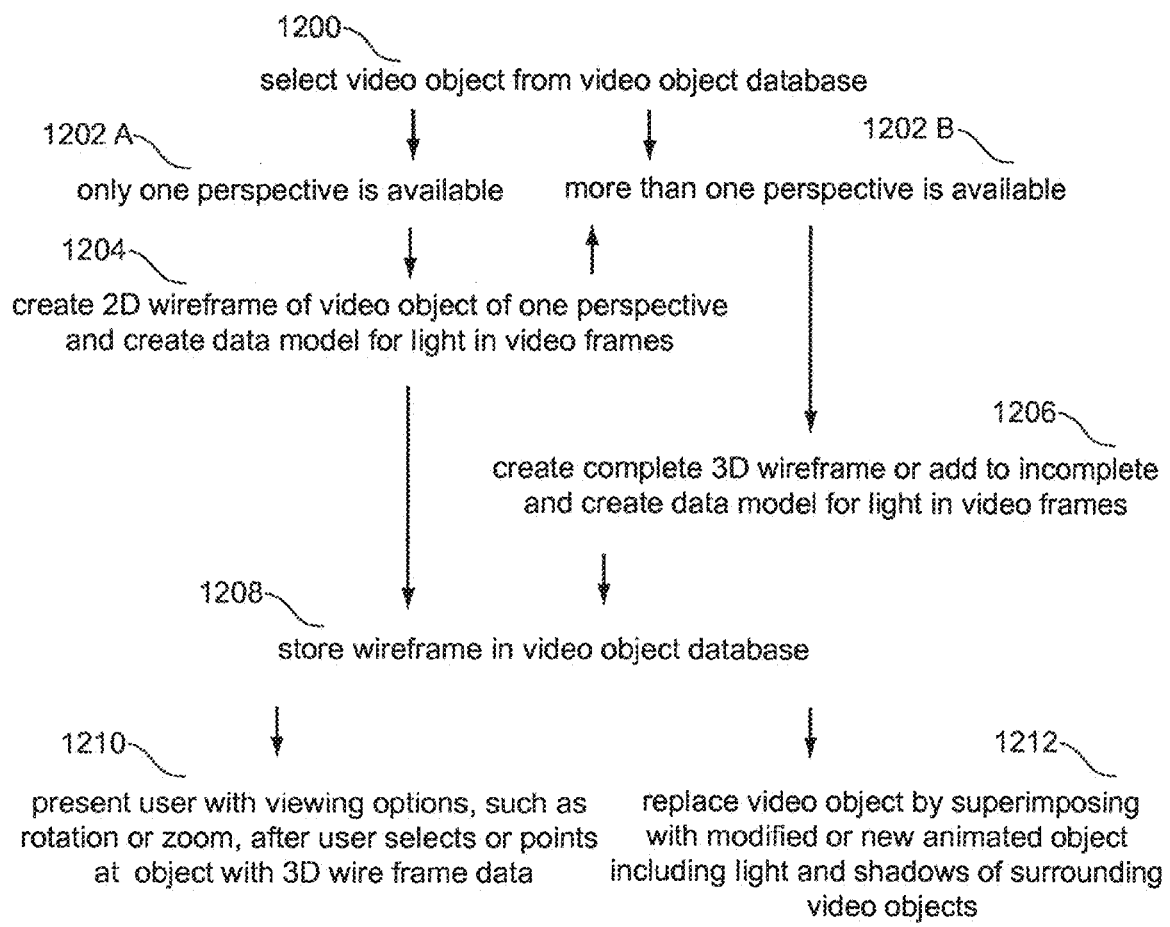
FIG. 12 is a flow diagram of three-dimensional rotoscoping.

FIG. 12 is a high level flow diagram for 3-dimensional rotoscoping. The process begins in step 1200 with selecting a given video object.

If only one perspective of the video object is available (step 1202A) in the video then a two-dimensional wire frame of the video object is created. Additionally, a data model is created for light and shadows in the video frames in which the video object appears. The wireframe is then stored in a video object database (such as object information library 112 (step 1208).

If additional perspectives for the video object subsequently become available (step 1202B) then a three-dimensional (3D) wire frame is created (step 1206) or the new perspectives are used to update the existing three-dimensional wireframe. Additionally, a data model is created for light and shadows in the video frames in which the video object appears. The wireframe is then stored in the video object database (step 1208).

In step 1210 the user (video consumer) is presented with viewing options such as rotating of the object or zoom. It is also possible to "replace" video objects (step 1212) in the video by superimposing a modified or new animated object including light and shadows of surrounding video objects over the existing video object. For example, an obscured appearance of a video object such as a can of Pepsi® can be replaced (superimposed) with an animated object (3-dimensional wireframe of the object) without the need to re-shoot the video. It is even possible to superimpose an animated object (3-dimensional wireframe of the object) of a can of Coca-Cola® over the can of Pepsi.

The present invention further includes a system for making an interactive overlay for a video. The system includes a server such as server 300 including a computer having a processor, random access memory, read-only memory, and mass storage memory, the server includes one or more video files stored in a video database. The system further includes object inventory database 112 stored on the server 300 and containing information describing a location (size, shape, orientation) of at least one video object within one of the video files. The object inventory database 112 may be compiled using any of the systems or methods disclosed in this specification or equivalents thereof. An overlay generation application (software or firmware) is stored and executed on the server 300. The overlay generation application creates a video overlay including at least one selectable hyperlink whose shape and position (coordinates) track a dynamic location of the video object in the video. The system stores the overlay on the server. As explained elsewhere in this specification the overlay is supplied to the video consumer server and is overlayed or superimposed over the video presentation. In some cases the overlay is transparent; however, as will be explained below in some cases the overlay may include animated representations of video objects which are superimposed over and replace/obscure the underlying video object.

The system may optionally include a wireframe database 112A stored on the server 300 or the wireframe database may be included within the object inventory database 112 or any other database stored on the server. The wire frame database 112A stores three-dimensional wireframe representations of at least one video object.

The overlay generation application may optionally match occurrences of video objects in the object inventory library with three-dimensional wireframe representations of the video object (stored in the wireframe library database or the object inventory database) and create a video overlay including matched wire frame representations wherein the shape and position of the wireframe representation tracks a dynamic location of the video object in the video. In other words, the wireframe representation of the object is superimposed over the corresponding video object. The superimposed wireframe representation obscures (replaces) the video object.

The wire frame library database 112A may optionally include a lighting model which defines/specifies the light distribution on the video object. For each occurrence of a video object in a video frame the lighting model would define/specify the light distribution on the video object.

According to another embodiment the system for making an interactive overlay for a video includes a server such as server 300 including a computer having a processor, random access memory, read-only memory, and mass storage memory, the server including one or more video files stored in a video database. The system includes an object inventory database 112 stored on (or accessible by) the server and containing information describing a location of at least one video object within one of the video files. The system includes a wireframe database stored on (or accessible by) the server, the wireframe database storing three-dimensional wireframe representations of at least one video object; and an overlay generation application (software or firmware) executed on the server. The overlay generation application matches occurrences of video objects in the object inventory library with corresponding three-dimensional wireframe representations of the video object and creates a video overlay including matched wireframe representations of the video object wherein the shape and position (coordinates) of the wireframe representation track a dynamic location of the video object in the video. The system stores the overlay on the server. As explained elsewhere in this specification the overlay is supplied to the video consumer server and is overlayed or superimposed over the video presentation. The video overlay may optionally include at least one selectable hyperlink whose shape and position tracks a dynamic location of the video object in the video.

According to another embodiment the system for making an interactive overlay for a video includes a server including a computer having a processor, random access memory, read-only memory, and mass storage memory, the server including one or more video files stored in a video database. The system includes an object inventory database stored on the server and containing information describing coordinates of at least one video object within one of the video files. The system further includes a wireframe database stored on the server, the wireframe database stores three-dimensional wireframe representations of at least one video object. A wireframe generation application (software or firmware) executed on the server selects video objects from the video object inventory database and generates a three-dimensional wire frame of the selected video object from multiple perspective occurrences of the video object in the video file and stores the three-dimensional wireframe in the wireframe database. The wireframe generation application may optionally generate a lighting model for each occurrence of a video object in a video frame from light distribution on the video object.

The system may further include an overlay generation application (software or firmware) executed on the server which matches occurrences of video objects in the object inventory library 112 with corresponding three-dimensional wire frame representations stored in the wire frame library 112A. The overlay generation application creates a video overlay including matched wireframe representations of the video objects wherein the shape and position of the wireframe representation tracks the dynamic location of the video object in the video. The overlay generation application stores the overlay on the server. The video overlay may optionally include at least one selectable hyperlink whose shape and position tracks a dynamic location of the video object in the video.

The creation of three-dimensional wire frames and lighting models is well known in the art and is disclosed in the following U.S. patents whose disclosure are hereby incorporated by reference: U.S. Pat. No. 7,602,404 entitled Method and apparatus for image assisted modeling of three-dimensional scenes; U.S. Pat. No. 6,983,082 entitled Reality-based light environment for digital imaging in motion pictures; U.S. Pat. No. 6,954,202 entitled Image-based methods of representation and rendering of three dimensional object and animated three-dimensional object; U.S. Pat. No. 6,919,962 entitled Reflectometry apparatus and method; U.S. Pat. No. 6,858,826 entitled Method and apparatus for scanning three-dimensional objects; U.S. Pat. No. 6,685,326 entitled Realistic scene lighting simulation; U.S. Pat. No. 6,628,298 entitled Apparatus and method for rendering synthetic objects into real scenes using measurements of scene illumination; U.S. Pat. No. 6,529,206 entitled Image processing apparatus and method, and medium therefore; U.S. Pat. No. 6,504,546 entitled Method of modeling objects to synthesize three-dimensional, photo-realistic animations; U.S. Pat. No. 6,434,265 entitled Aligning rectilinear images in 3D through projective registration and calibration; U.S. Pat. No. 6,333,749 entitled Method and apparatus for image assisted modeling of three-dimensional scenes; U.S. Pat. No. 6,281,904 entitled Multi-source texture reconstruction and fusion; and U.S. Pat. No. 6,281,903 entitled Methods and apparatus for embedding 2D image content into 3D models.

According to another embodiment, the system for automatically segmenting and classifying video content into objects includes a server such as server 300 including a computer connectable to a distributed network and having a processor, random access memory, read-only memory, and mass storage memory, the video segmenting and classification server including one or more video files stored in a video database. The system includes a wireframe database stored on or accessible to the server. The wire frame database stores three-dimensional wireframe representations of at least one video object and at least one of descriptive information and semantic information used to describe the object. The descriptive information and semantic information is the same information described elsewhere in this disclosure in the context of segmenting and classifying video objects. The system further includes an object inventory database containing information describing a location of at least one video object within one of the video files. A video content analysis application executed on the processor, segments the video files to identify locations of video objects. The application searches for a matching (corresponding) occurrence of the video object in the wireframe database. For each match, the application retrieves information describing the video object from the wireframe database, and stores in the object inventory database 112 information describing the dynamic location of the video object within the video and information describing the video object.

According to one embodiment, a VOHE 300 auctions rights to hyperlinks associated with video content objects stored in the inventory database 114 to retailers/brands/affiliates/advertisers 122. The auction is performed by automated auction application 126 on VOHE server 300 which communicates with an automated bidding application on the retailer/brand/affiliate/advertiser server 500. More particularly, auction application 126 is a software application executed on processor 202 and stored on one of mass storage device 206, ROM 208 and RAM 210. The auction application 126 auctions rights to associate content with a video object using a hyperlink. The auctioned rights may be time limited, i.e., rights which expired after a pre-defined amount of time has expired. Auction application 126 may include logic for automatic billing and/or settlement of bids as well as updates to video creator account balances that reflect earnings from a percent of the revenue generated by the VOHE for videos created by that creator.

The auction application 126 stores auction information identifying the owner of rights to associate content with an auction, the duration of such rights, hyperlinks to be associated with the object, and billing information. See, FIG. 7. The auction information is stored in an auction information database on server 300. More particularly, auction information database is stored on one of mass storage device 206, ROM 208 and RAM 210.

The VOHE server 300 includes an object association application which creates a video overlay used to associating relevant hyperlinks received from the retailers/brands/affiliates/advertisers 500 with the video objects. The overlay is supplied by the VOHE server 300 to the broadcaster 120 and in turn from the broadcaster 120 to the viewer 124 along with the underlying video. Alternatively, the overlay may be supplied by the VOHE server 300 to the viewer 124.

Figure 3:
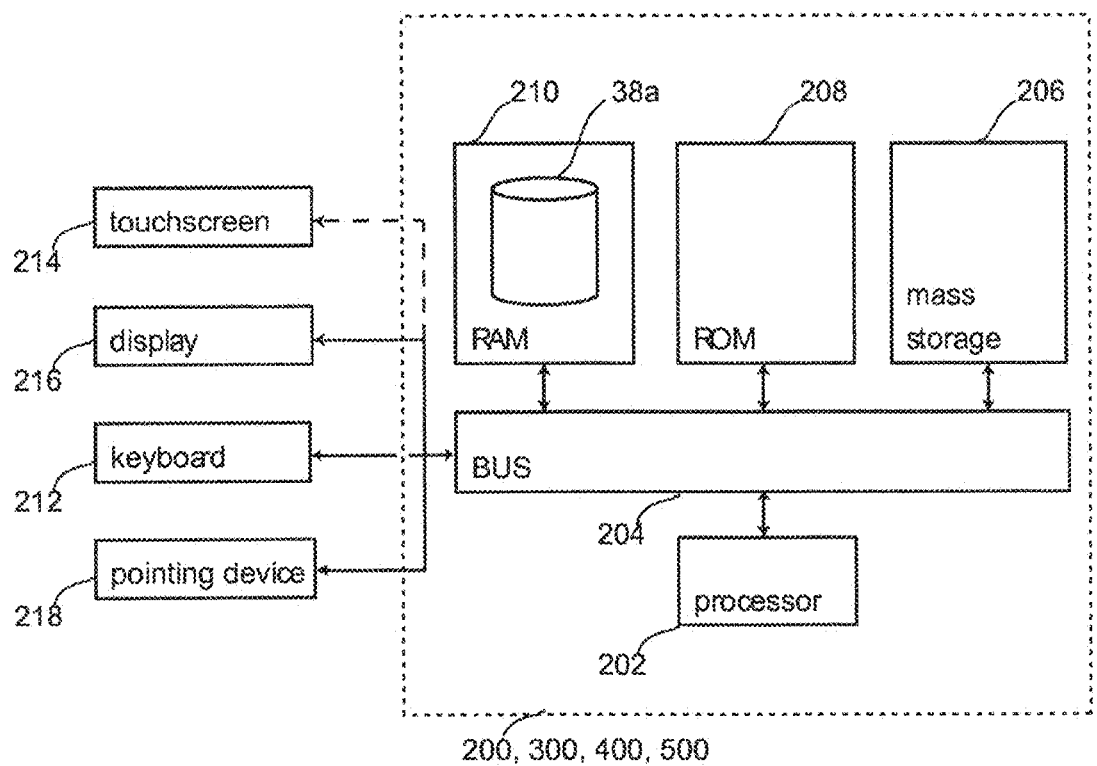
FIG. 3 is a block diagram of a computer on which the video content analysis application executes.

The retailers/brands/affiliates/advertisers 122 uses a computer, server, mobile device, or other electronic device with access to the internet or a direct connection to the VOHE 500 (FIGS. 2, 3) to bid on the right to associate hyperlinks with a video object. Computer 500 includes a processor 202 which is connected via BUS 204 to a mass storage device 206, ROM 208 and RAM 210 (which may by volatile or nonvolatile). An automated bidding application executes on processor 202 and may be stored on one or more of the ROM 208, RAM 210, and mass storage 206. The automated bidding application communicates auction bids to the automated auction application on the VOHE 300. The automated bidding application is responsive to information from VOHE 300 describing the video object(s) being auctioned. The use of video content objects transforms raw video into interactive video content.

The viewer 124 uses a computer, mobile phone or another electronic device that connects to the internet or to a social network 400 (FIG. 3) to access the video content made available by broadcaster 120 on a website or social network or application or the like accessible over a distributed network such as the Internet. Computer 400 includes a processor 202 which is connected via BUS 204 to a mass storage device 206, Read-Only-Memory (ROM) 208 and Random Access Memory (RAM) 210 (which may by volatile or nonvolatile). A web browser executes on the processor and is used to access web sites on the Internet. The viewer 124 interacts with the video overlay by selecting or rolling over a region representing a video object using a conventional pointing device 218, and/or using a touch sensitive screen 214 such as is known in the art. Interaction by the video viewer 124 triggers display of supplemental content such as information provided by the creator of the video, comments by other viewers, or any other associated content including original, organic, advertising, links to other content, and/or paid content by retailers/brands/affiliates/advertisers that purchased rights on the VOHE. The retailers/brands/affiliates/advertisers 122 are bidding on the right to supply the relevant content using an embedded hyperlink.

The auction of hyperlink rights may be automated. For example, the VOHE 300 may request a minimum starting bid and specify bidding increments, and each retailer/brand/affiliate/advertiser 122 may provide automated bids for viewer matching specified criteria up to a pre-determined maximum bid.

According to a variation of the previous embodiment, the auction of advertising rights to a video (including all of the video objects therein) or to individual video content objects is triggered when a video viewer 124 accesses the broadcaster's website and/or requests access to video content accessible therethrough. According to this embodiment, the broadcaster 120 is able to provide viewer profile information for the video viewer (consumer) 124 to the retailer/brand/affiliate/advertiser 122. The viewer profile information may, for example, contain information regarding web sites previously accessed by the viewer 124, the video viewer's interactions with this or other video and/or video objects, and/or information regarding the purchasing habits of the viewer 124. As will be explained in further detail below, any of the embodiments described herein may include a viewer (behavioral) profile stored in an analytics database on a memory device accessible to the server.

Regardless of the starting point (manual or automated identification of objects, the end product is a database (video content inventory) 114 listing object id, frame id, coordinates of object and may include a semantic model for each identified object within a given media presentation (movie clip). This inventory 114 may be offered on a video object hyperlink exchange (VOHE) for retailers/brands/affiliates/advertisers to bid on. Retailers/brands/affiliates/advertisers will bid on inventory based on contextual information and multifaceted viewer profile of the viewer viewing the video content and the inventory description of the video.

The retailer/brand/affiliate/advertiser may decide to push an overlay message content on the video object while a user with a certain multifaceted user profile views it. The interaction of a viewer with video objects may be used to refine the messages pushed to the viewer in the same way as search terms are currently used to refine messages to users while searching for something.

Figure 4:
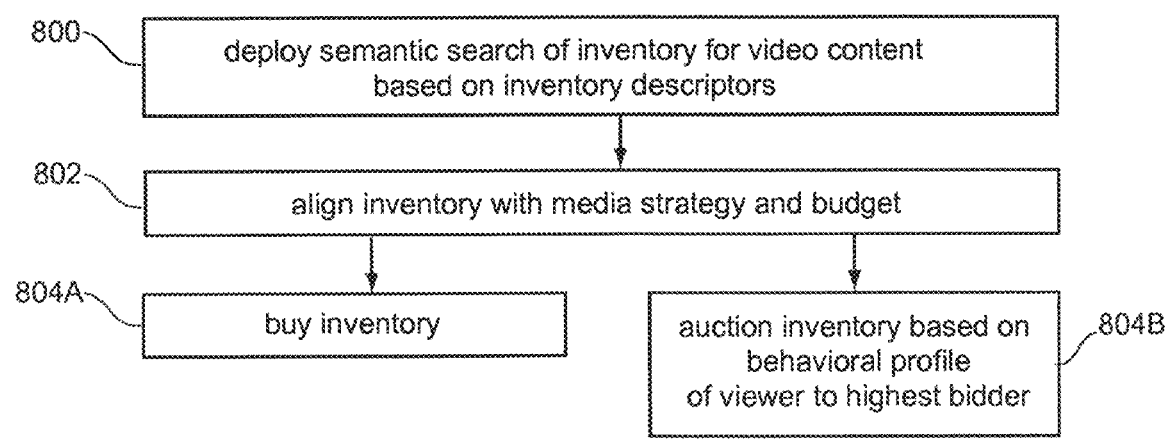
FIG. 4 is a flowchart of how an retailer/brand/affiliate/advertiser interacts with the video object hyperlink exchange (VOHE) system according to the present invention.
Figure 5:
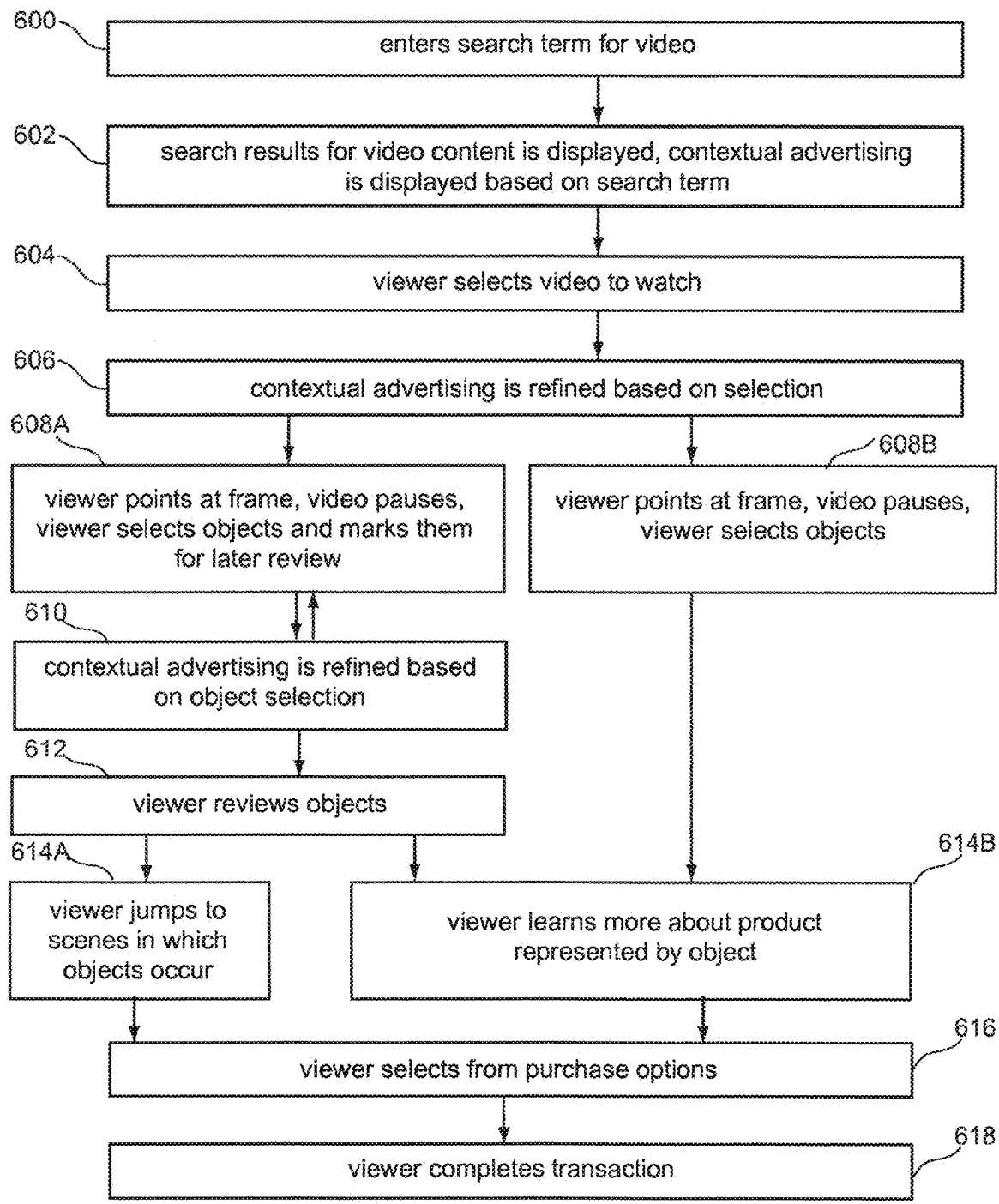

FIG. 4 is a flowchart of how a retailer/brand/affiliate/advertiser interacts with the VOHE 300. In step 800, the retailer/brand/affiliate/advertiser deploys a search of the video content inventory 114 based on inventory descriptors or may submit images of products that he would like to purchase inventory rights to. The use of a semantic search as opposed to a more rudimentary keyword search is preferred because the semantic search is able to cope with the variations in descriptor information.

In step 802 the VOHE 300 returns a list of objects and object classes matching the retailer/brand/affiliate/advertiser's search, and the retailer/brand/affiliate/advertiser aligns the search results with the retailer/brand/affiliate/advertiser's media strategy and budget. In step 804A, the retailer/brand/affiliate/advertiser simply chooses to purchase the inventory identified in step 802. Alternatively, in step 804B the retailer/brand/affiliate/advertiser specifies to the VOHE 100 items which the retailer/brand/affiliate/advertiser is interested in bidding upon during the real-time auction. Moreover, the retailer/brand/affiliate/advertiser may specify a starting bid and/or a maximum bid. Alternatively, the VOHE 100 may specify the starting bid and incremental increases in the bid, and the retailer/brand/affiliate/advertiser merely specifies a maximum bid.

FIGS. 5 and 6A-D are flowcharts showing the interactions of a viewer with the VOHE 300. In step 600, a viewer searches or browses for video content. The video content may also be presented to the viewer by the system either randomly, by popularity, by looking at the viewer's past viewing history, recommendations by friend's, what's trending and other commonly used methods of providing content to users of social networks. In step 602, relevant content (contextual advertising) relating to the key words used in step 600 is displayed along with a list of video content search results. In step 604 the viewer selects a video to view, and in step 606 the contextual advertising is refined in relation to the selected video.

In steps 608A and 608B the viewer is viewing the selected content (1700 in FIGS. 6A-6D) and encounters video objects of interest. According to one embodiment pointing at the frame by, e.g., bringing pointer 1701 of pointing device 218 into video frame 1703 (FIG. 6A) will cause the video to slow the video down, which allows the viewer to select an object. In the case of interactive TV or three-dimensional (3D) videos, the viewer can use a variety of pointing means including, but not limited to, a virtual pointer of the type popularized by the Nintendo Wii® which utilizes a glove or the like with sensors capable to determine X, Y, and Z coordinates. In step 608A the viewer merely tags the objects of interest for later review (1702 and 1704 in FIGS. 6B and 6C), whereupon in step 610 the contextual advertising is once again refined (this time in relation to the objects of interest) and the behavioral profile (analytics database) of the viewer is updated. Steps 608A and 610 may be repeated any number of times during the viewing of the video. In step 612, the viewer reviews the list of tagged items from step 608A and either jumps back to the scenes in which the items appear (step 614A and 1704 in FIG. 6C) or learns more about the items selected, e.g., price, features etc (step 614B). In step 616 the viewer selects one or more objects (products) to purchase (from the tagged or identified objects), and in step 618 the viewer completes the transaction (1708 in FIG. 6D).

Step 608B is an alternative to step 608A and presents the viewer with the option to immediately jump to 614 and learn more about the object. The information associated with the video object may be displayed as an overlay pop-up or in a field next the video player. Each time the viewer interacts with video objects his/her profile gets updated in the database.

Social Networking

Figure 9:
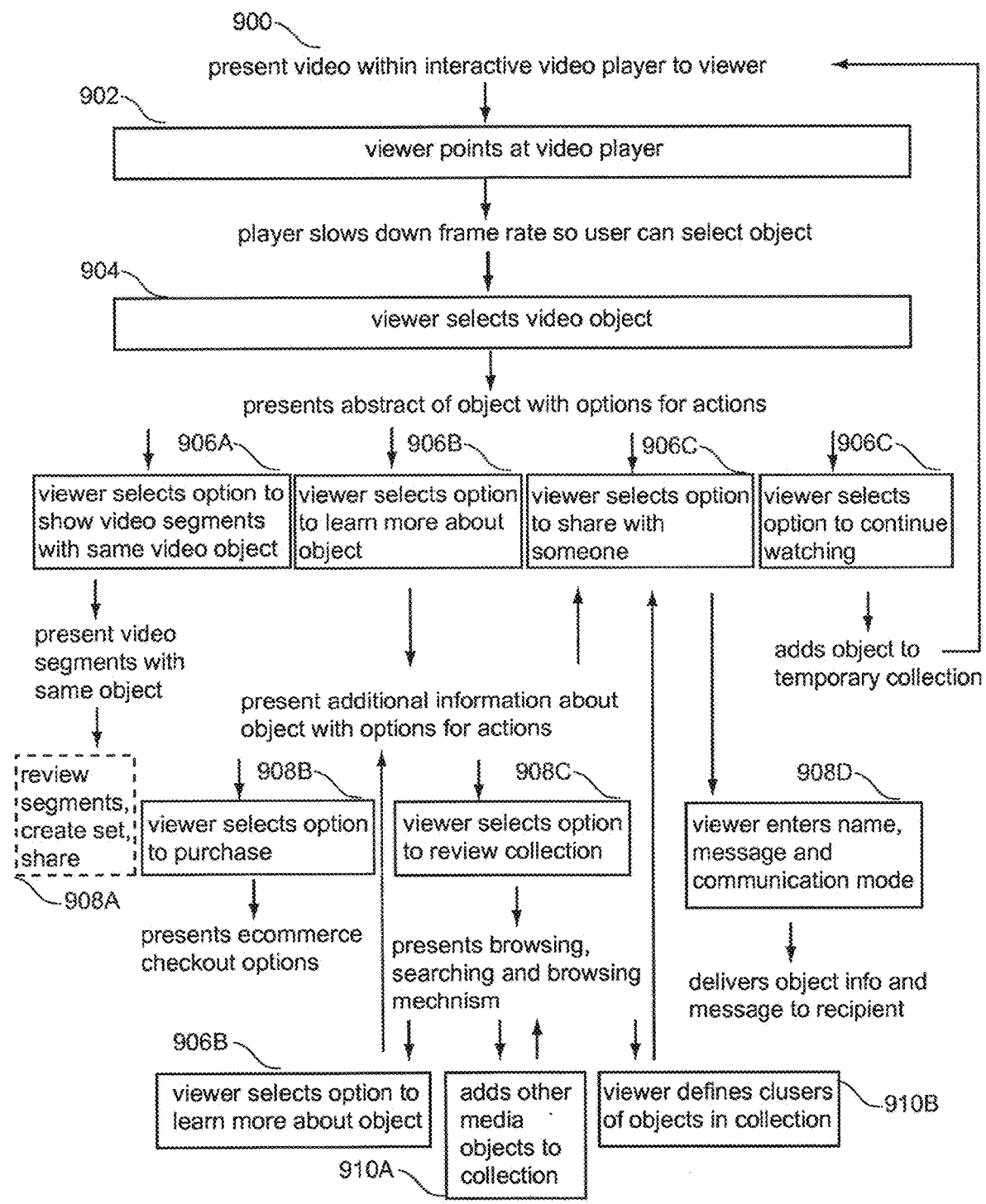
FIG. 9 is a flow chart demonstrating the sharing of video objects using social networking.
Figure 10A:
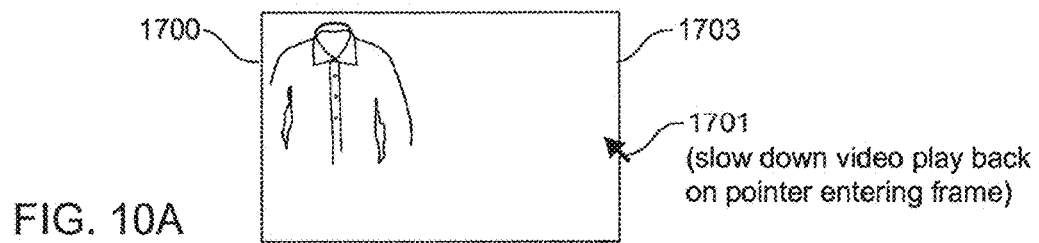
FIGS. 10A-10D are graphical depictions of steps in the flowchart of FIG. 9.
Figure 10B:
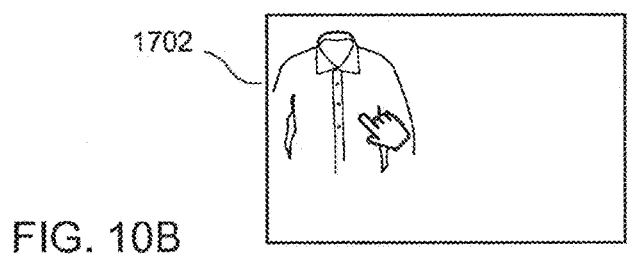

A further aspect of the invention will be described with reference to FIGS. 9-11. FIG. 9 is a high level flowchart showing the interactions of a viewer with the VOHE 300. FIGS. 10A-10D and 11A-11B are a graphical depiction of various steps in the flowchart of FIG. 9. In step 900 the viewer 124 views video content having video objects. As described above, the video presentation slows or stops as the user points at or rolls-over (step 902) the presentation screen, and selects a video object using a pointing device such as a mouse or a finger (or the like) on a display screen which may be touch sensitive (FIG. 9 step 904 and FIG. 10A). Selecting refers to both rolling-over the object with the pointing device (without a mouse click or a keyboard command) and to positioning the pointing device over the object and actuating one of the buttons on the mouse or keyboard. In a traditional TV setting the user may use the 5-star control of a remote controller to select a video object.

Once the object has been selected (FIG. 9 step 904 and FIG. 10B), the viewer displays an abstract of the video object in the form of an overlay on top of the current viewing window or on a new window adjacent the current viewing panel. The Abstract may include descriptive information (relevant content) about the object (name, brand name, make, model, vendor, price, etc) and classification information about the object or it may be information provided by the creator of the video like a comment about the object, a picture, comments by other viewers, and/or the ability to share the video, video object, or associated content over the internet or through social networks.

Figure 10C:
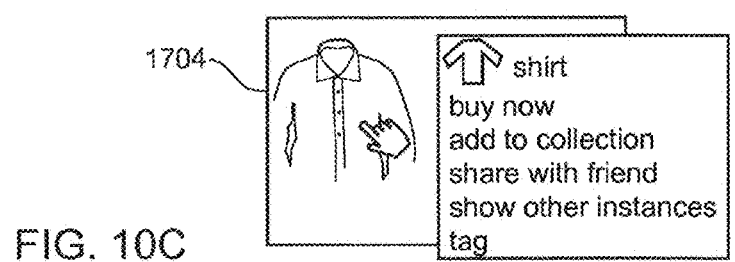

The user (viewer of video) 124 is presented with a menu of options (FIG. 10C). For example, the viewer 124 may search for other occurrences of the object in both the current video or in other videos (FIG. 9 step 906A, and FIG. 11B).

Moreover, the viewer may expand the search to encompass other objects which have similar classification such as the same make but different models (other Ferragamo shoes), or other red high heeled shoes, etc.

In step 908A, the user is presented with a list of viewable video segments containing the selected video object. At this point the user can choose to view any of the segments and/or proceed to steps 906B, 906C or 906D.

The viewer 124 may be presented with an option to retrieve more detailed information about the object (step 906B). Such information may include details about the materials or specifications of the object. The user may also be presented with the option to view a three-dimensional wire frame rendering of the object. The 3D wire frame is created by the VOHE 300 when the object is initially identified and classified. Depending on how many perspective facets of an object are available, a complete or partial 3D wire frame may exist for a given object. The viewer 124 presents the user with various options to manipulate and interact with the 3D wire frame. For example, the viewer 124 may rotate and zoom the 3D wire frame to display the rendering from different perspectives.

As described above, the user may be presented with the option to add the video object to a shopping cart (FIG. 9 step 908B and FIG. 10C). Although not specifically illustrated in FIG. 9, the option to purchase may be nested under each of the menu items such that the user may always elect to purchase without having to retrace his/her steps. In fact, each of the menu options described herein may be organized in any number of ways and the inventive concept is not limited to the specific way they are presented. Thus, steps 906A-906D may be nested.

The shopping cart may be a conventional electronic shopping cart which enables the user to purchase the object or flag it to the user's wish list for future purchase. The viewer 124, VOHE 300, or system 100 tracks objects purchased by the user and items added to the user's wish list, and such information may be used to analyze the user's buying trends etc. More particularly, an analytics database records the interactions of the consumer. The analytics database stores information regarding the video files or types of video files (genre or the like) accessed by the consumer, the objects selected by the consumer, items purchased by the consumer. The analytics database may be stored on or accessible to (via the distributed network, e.g., internet) the VOHE 300 or system 100. The viewer 124 also enables the user to manually indicate that the user owns a given object even if it was not purchased through the VOHE 300.

The VOHE 300 allows the user to share individual video objects or create and share a collection of video objects with one or more friends by selecting the video objects or the collection of objects and selecting individual friends or sets of friends (FIG. 9 steps 906C and 910B, and FIG. 10C). The viewer 124 may include a software plug-in application for a social networking site (Facebook® application, Twitter® application, Instagram® application, Vine® application, Snapchat® application) or the like which enables the user to add the video object to the user's social network account without leaving the portal (VOHE 300) through which the user was viewing the video. As used herein the term social networking site is equivalent in all respects to social networking server and encompasses Facebook application, Twitter application, etc. which enable a user to share information to a wide audience with or without specifying individual recipients.

The plug-in application also enables the user to share the image/video segment etc with one or more social networking contacts ("Facebook friends, Instagram followers, etc."). The plug-in application is software. The plug-in may share data linking or pointing to the video object or library of such objects. The video object or library of video objects may be stored on the YOM 300 or on the user's computer 400. Data transferred to Facebook or other social networking sites may also be stored on a 3d party server such as or the like, or the social networking site may simply store a link to data stored on the VOHE 300.

Finally, the user may simply elect to unpause the video and continue watching (step 906D). Unpausing may also be accomplished by pointing at the content of the video frame.

Figure 10D:
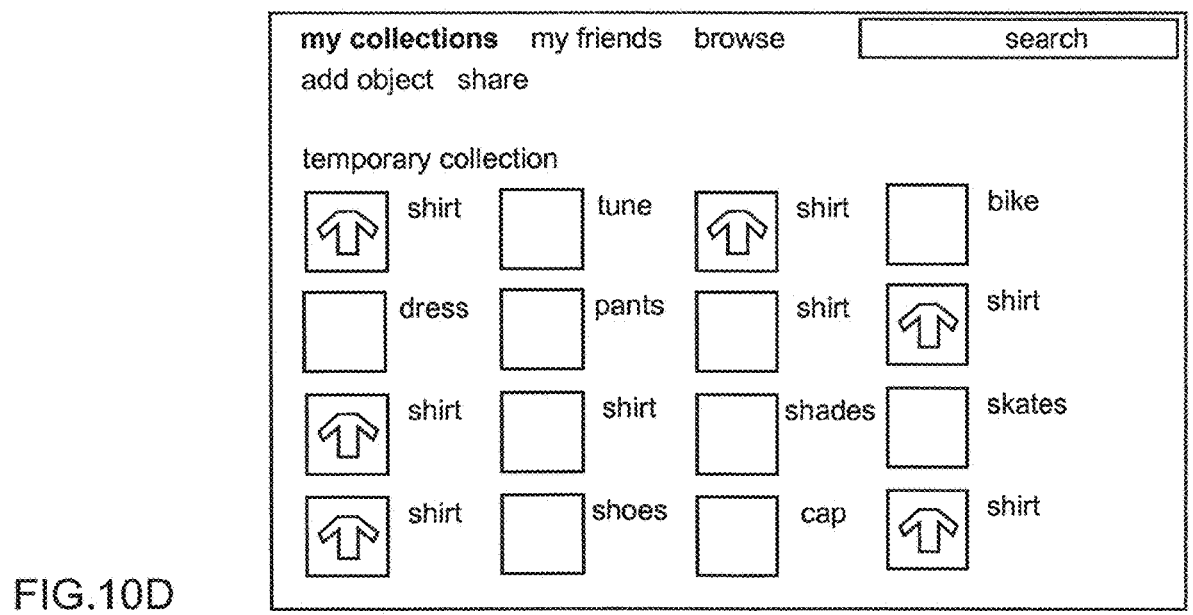
Figure 11A:
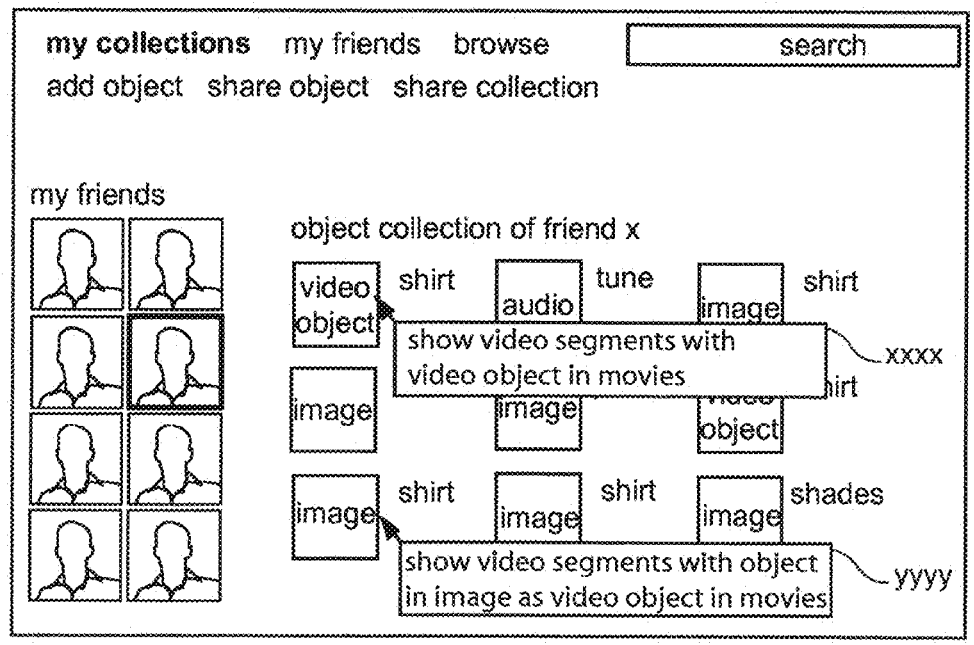
FIGS. 11A-11B are graphical depictions of steps in the flowchart of FIG. 9.
Figure 11B:
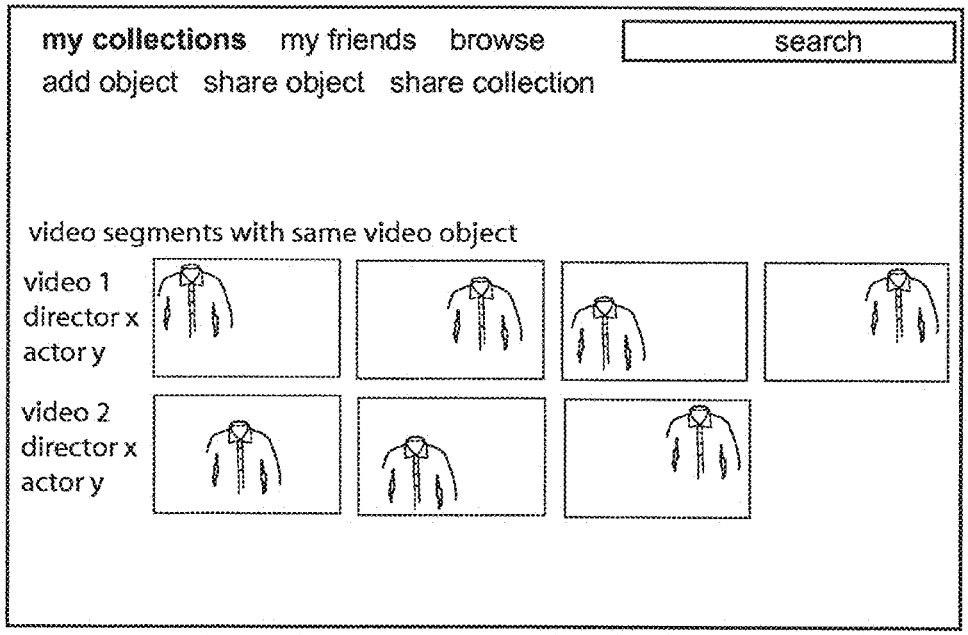

According to another aspect of the invention, the user may organize objects added to the collection of video objects (FIG. 9, step 910B, FIG. 10D, FIG. 11A). For example, the user may define clusters of objects in a collection and share the entire collection instead of sharing individual objects. VOHE 300 allows users to create a "wardrobe collection" with sub-collections. VOHE 300 allows users to tag objects with tags like "I own this", "I would like to have this". VOHE 300 keeps track of the purchase history of user and automatically tags objects that have been purchased through VOHE 300 as "I own this". See FIG. 10D.

The user may add other media types to these collections such as an image of an object (FIG. 9, step 910A, and FIG. 11A). By adding a file or a link to a file which contains image information to a collection, VOHE 300 matches the image object with all known video objects and provides the user with the option to search across multimedia data bases for other instances of the object. The user may also add data types that do not contain image information such as an audio file. By sharing a collection with a friend, the user also shares a link to files that do not contain images. The friend receiving the link to the collection may have access to the files that do not contain image information.

One embodiment of the invention is a system for viewing video having segmented video objects. The system includes a video server 200,300 which communicates with a viewer server 400 over; for example, a distributed network such as the internet (a.k.a. World Wide Web). At least one video file stored in a video database 108 on or accessible to video server 200. Similarly, an object inventory database 114 stored on or accessible to the video server 200. The object inventory database 114 stores information describing a location of at least one video object within the at least one video file. Relevant content in a database stored on or accessible to the video server 200. A video overlay links the relevant content with a given video object and creating a selectable hyperlink whose position tracks a dynamic location of the video object in the video.

The system includes (and executes) a software application for accessing and displaying the at least one video file stored in the video database, the software application including means for interacting with the video overlay to select an object displayed in the video file.

The video server 200, 300 may include (and execute) an application (software application) for displaying relevant content associated with the object selected by the consumer server.

The video server 200, 300 may include (and execute) a software application for storing one of the object or a data associated with the object selected by the consumer server in a collection of objects. The video server may include software for sharing the collection of objects or sharing a data associated with the collection of objects. For example, the video server may share the collection of objects or data associated with the collection of objects with a social networking service (Facebook, Twitter or the like) via the distributed network (internet). The video server may post the collection of objects or data associated with the collection of objects to a social networking server accessible service via the distributed network. Finally, the social networking server may issues an alert to at least one user-specified person that data is posted to the server.

The video server may include (and execute) a software application for searching at least one of the object inventory database and the at least one video file for occurrences of the selected object, and selectively displaying segments of the at least one video file containing the selected object.

The video server may include (and execute) a software application for searching at least one of the object inventory database and video files in the video database for occurrences of the selected object, and selectively displaying segments of the at least one video file containing the selected object.

The video server may include (and execute) a software application for purchasing an item associated with the selected object.

The video consumer software application may include a content display application which interacts with the video overlay (software) and displays relevant content when a given video object is selected or rolled-over with a pointing device.

The video server may include (and execute) a software application for storing one of the object or a hyperlink associated with the object selected by the consumer server in at least one user-defined collection of objects.

Another aspect of the invention relates to a method for interacting with a video object hyperlink exchange. The method includes a step of providing at least one video file stored in a video database on or accessible to a video server via a distributed network; providing an object inventory database stored on or accessible to the video server via the distributed network, the object inventory database containing information describing a location of at least one video object within the at least one video file; and providing a video overlay linking the relevant content with a given the video object by way of a hyperlink and creating a selectable hyperlink whose position tracks a dynamic location of the video object in the video. According to the method, the at least one video file is accessed and displayed; and a user interacts with the video overlay to select an object displayed in the video file.

The method further comprises a step of displaying relevant content associated with the object selected by the consumer server.

According to one aspect of the aforementioned method, the selected object or data associated with the selected object is stored in a collection of objects. The collection of objects or data associated with the collection may be shared. For example, the collection may be shared over a distributed network (internet) with a social networking service or social networking server. The social networking server may issue an alert or message (e.g. email, SMS message or the like) to at least one user-specified person that data is posted to the server.

The method may include a step of searching at least one of the object information library and the at least one video file for occurrences of the selected object, and selectively displaying segments of the at least one video file containing the selected object.

The method may include a step of searching at least one of the object information library and video files in the video database for occurrences of the selected object, and selectively displaying segments of the at least one video file containing the selected object.

The method may include a step of purchasing an item associated with the selected object. The purchasing step is performed by a software application executed on the video server. But, the purchase may also happen outside the system on a site or application that a winning bidder has linked the video object to with a hyperlink.

Also disclosed is a method for ranking videos according to the duration of time a given object appears in the video. The method encompasses providing a database of video files and searching each video file for the occurrence of at least one object. Next, the method entails using software to determine a duration of time that the at least one object was displayed in each the video file; and for each the video file outputting information specifying the title of the video file and the duration of time.

The method may further include outputting information specifying a ranking of the duration of time in a given the video file relative to each of the other video files in the database. In other words, the video file in which the at least one object was displayed for the longest duration will have a higher ranking than a video file in which the object did not appear for as long a duration.

The aforementioned method may be used to search each video file for the occurrence of first and second objects and determine a duration of time that each of the first object and the second object were displayed in each the video file. For each video file the software will output information specifying the title of the video file and each the durations of time.

FIGS. 13-29 are self-explanatory display screens showing an app version of one preferred embodiment of the present invention, referred to as VeePIO™. These figures are further explained below.

Figure 13:
FIGS. 13-29 are display screens showing an app version of one preferred embodiment of the present invention, referred to as VeePIO™.

FIG. 13: Shows app store.

Figure 14:

FIG. 14: Built in accordance with industry best practices, VeePiO brings powerful new functionality to a familiar and intuitive framework.

Figure 15:

FIG. 15: Veep'ers can easily sync up contacts through their address book, Facebook and Twitter to grow their VeePiO network and share interactive video with friends.

Figure 16:
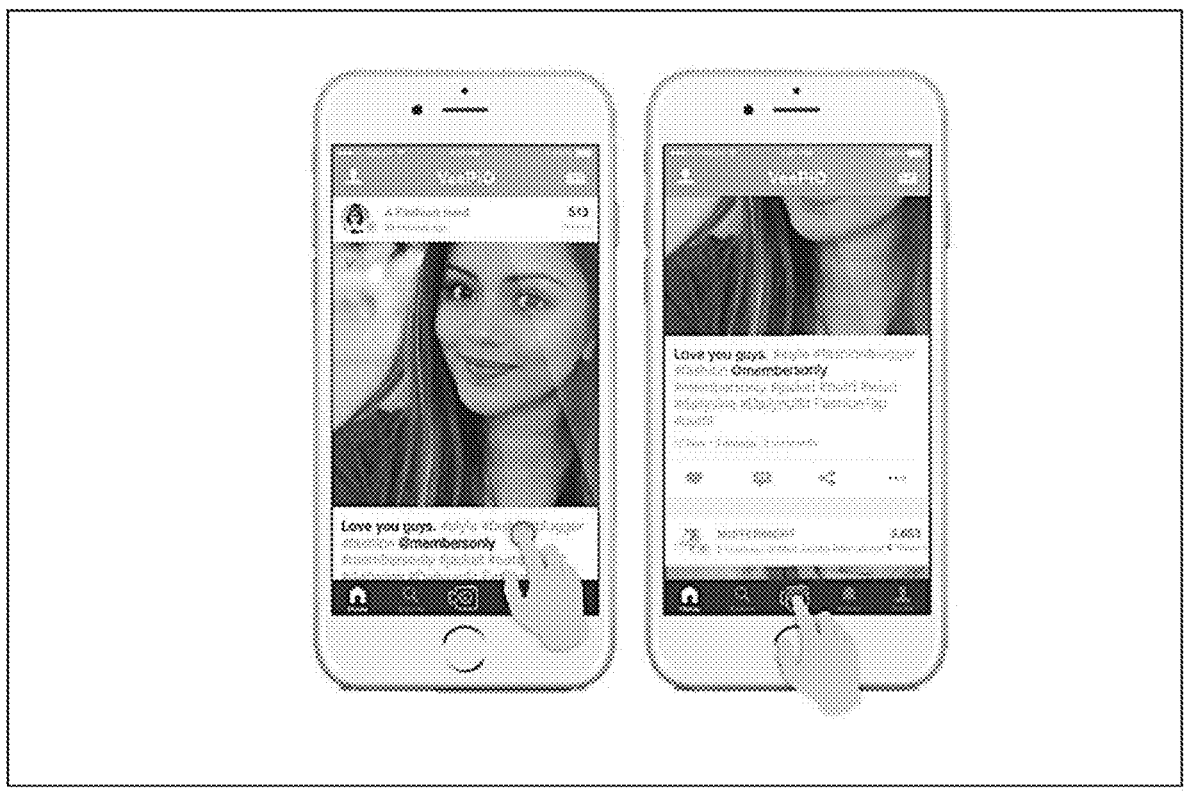

FIG. 16: The feed is a dynamic stream of user-created content. Each video plays on a constant loop. Hashtags help VeePiO users brand and sort their Veep'd videos. Viewers can like, comment on, and re-Veep any video.

Figure 17:
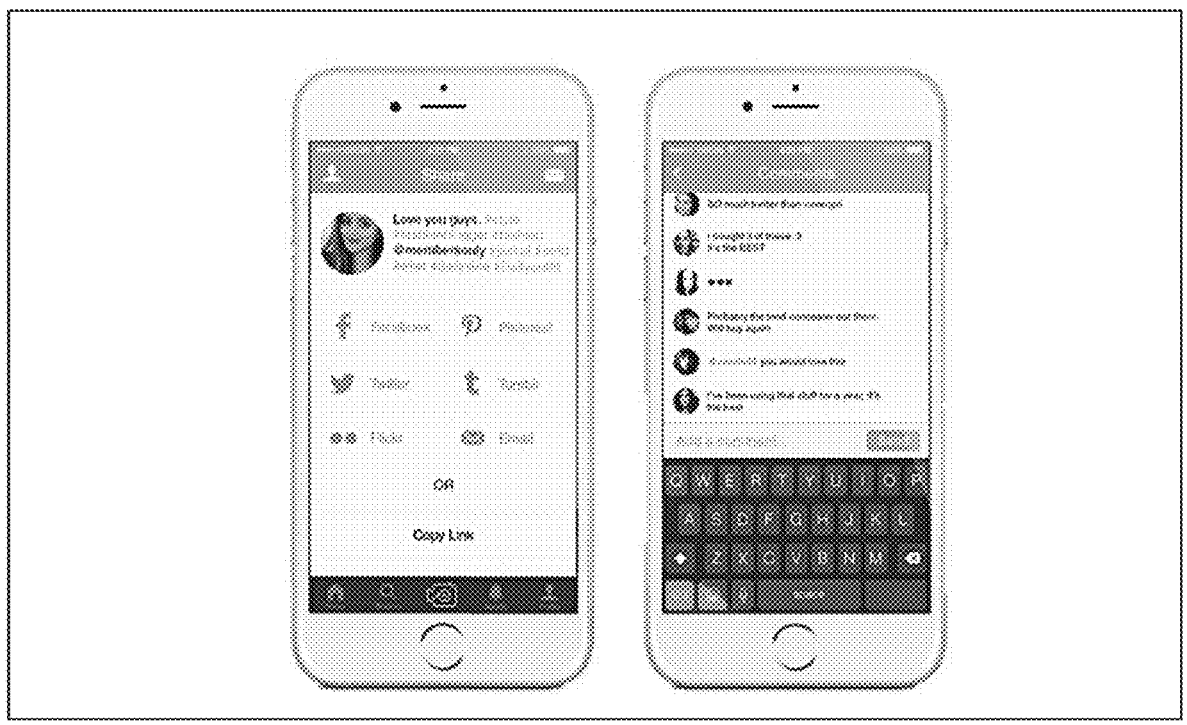

FIG. 17: VeePiO thrives on community. Commenting is easy and encouraged via standard pathways like the feed, and through product sub-comments. Beyond that VeePiO media can be shared anywhere online.

Figure 18:

FIG. 18: VeePiO is simple to use. Tap any Veep'd object and instantly gain the ability to make it your own. (1st screen) Veepio users can also share and view comments for individual objects. (2nd screen) Tapping "I want it!" walks users through an easy in-app purchase flow. (2nd and 3rd screen)

Figure 19:
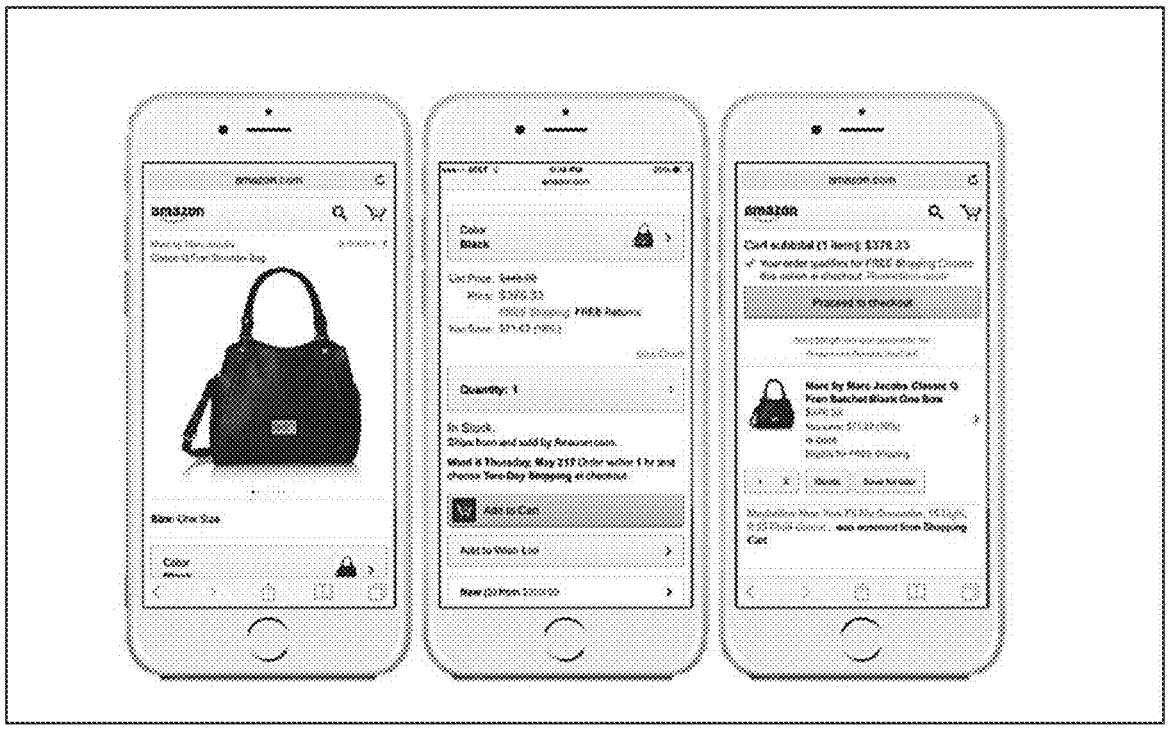

FIG. 19: VeePiO's in-app purchase flow takes users through Amazon checkout with no site redirection. Amazon pays between 4%-8% commission on every sale generated by an affiliate. VeePiO makes money on every sale generated by content on our platform. VeePiO passes along 80% of the revenue to the video creator.

Figure 20:
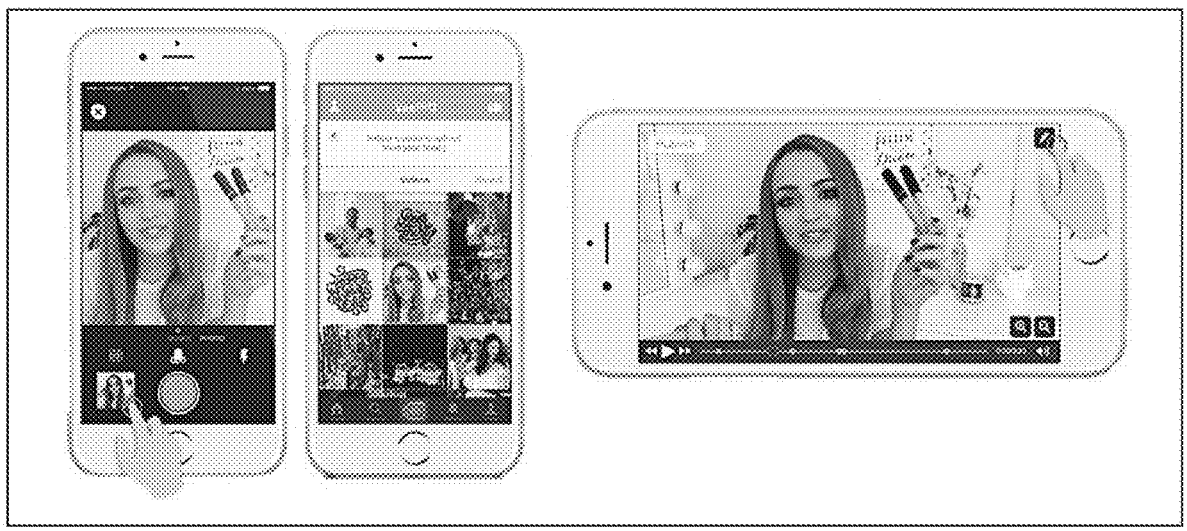

FIG. 20: Users have the option to select from their iPhone® library, or create a video in-app when using VeePiO. (1st and 2nd screen) Once an image or video is chosen, users get access to the Veep edit room. (3rd screen)

Figure 21:
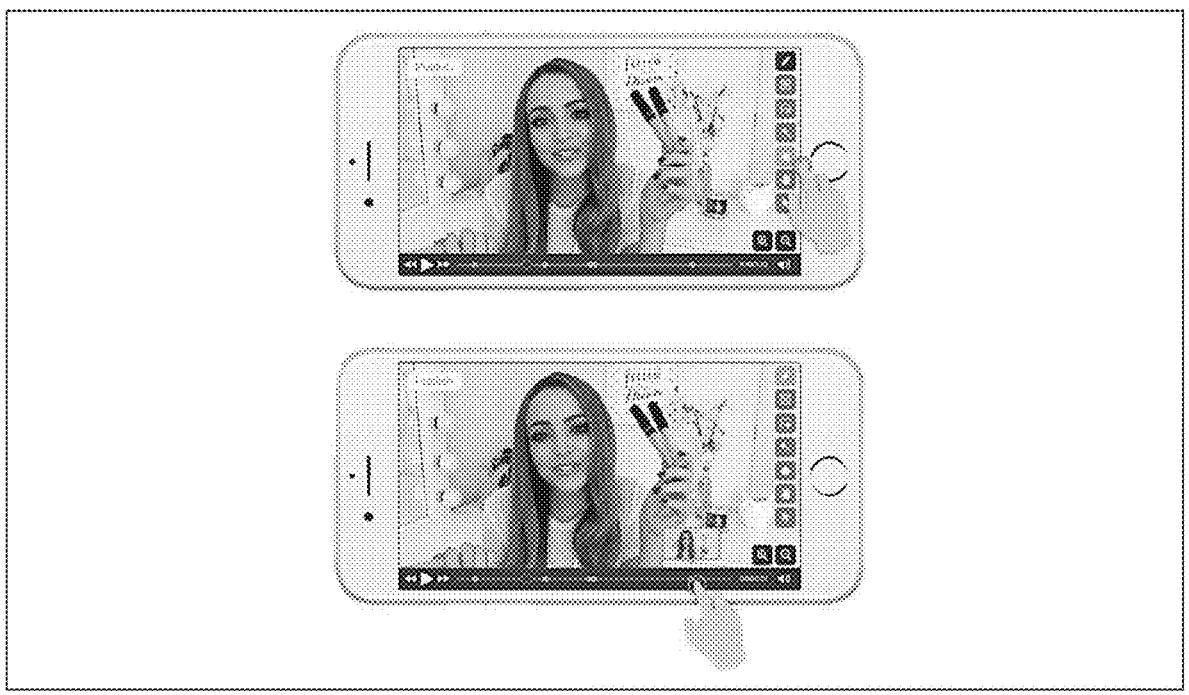

FIG. 21: VeePiO's editing room makes adding interactivity easy, with familiar tools like the Lasso and Magic Wand tools of Adobe® Photoshop®. (1st screen) Users can create a simple shape around an object to make it clickable. (1st screen) Zooming in and out provides more detailed access to each frame. (2nd screen) Tapping on a marker in the player reveals each frame containing a Veep'd object. (2nd screen)

Figure 22:
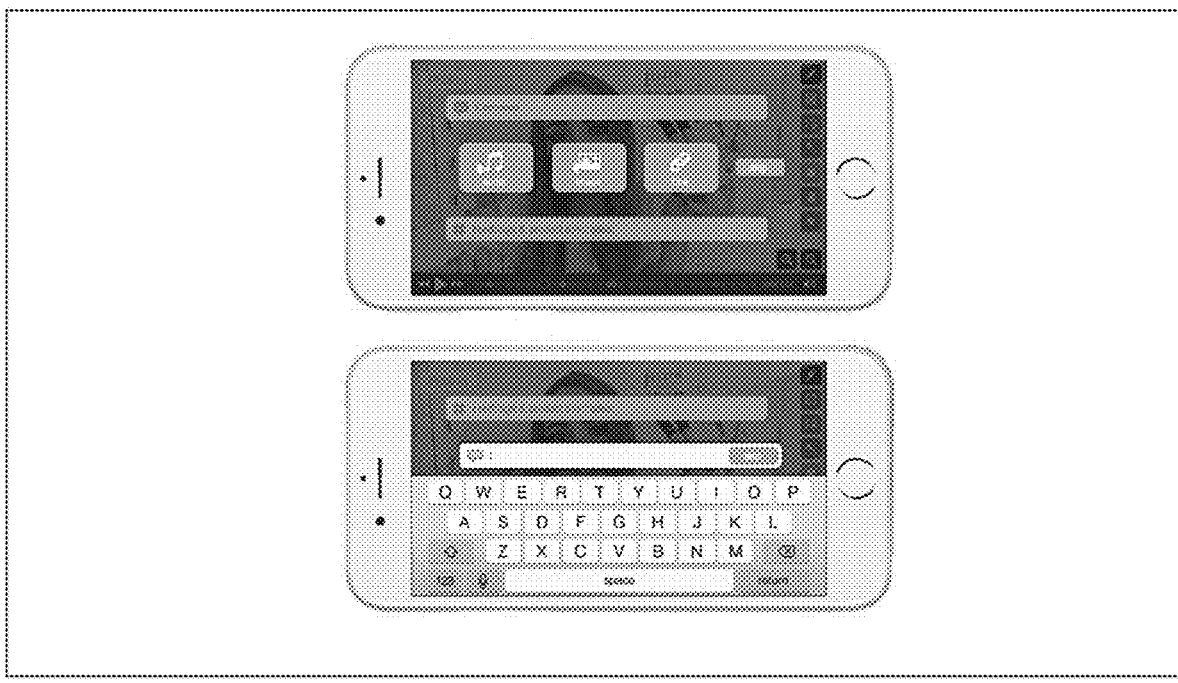

FIG. 22: Once a creator is ready to publish, they are led to the object detail overlay. Users can enter a comment, Hashtags and product descriptions, and add media to any object they choose. Each object can link to an image, audio, or link.

Figure 23:
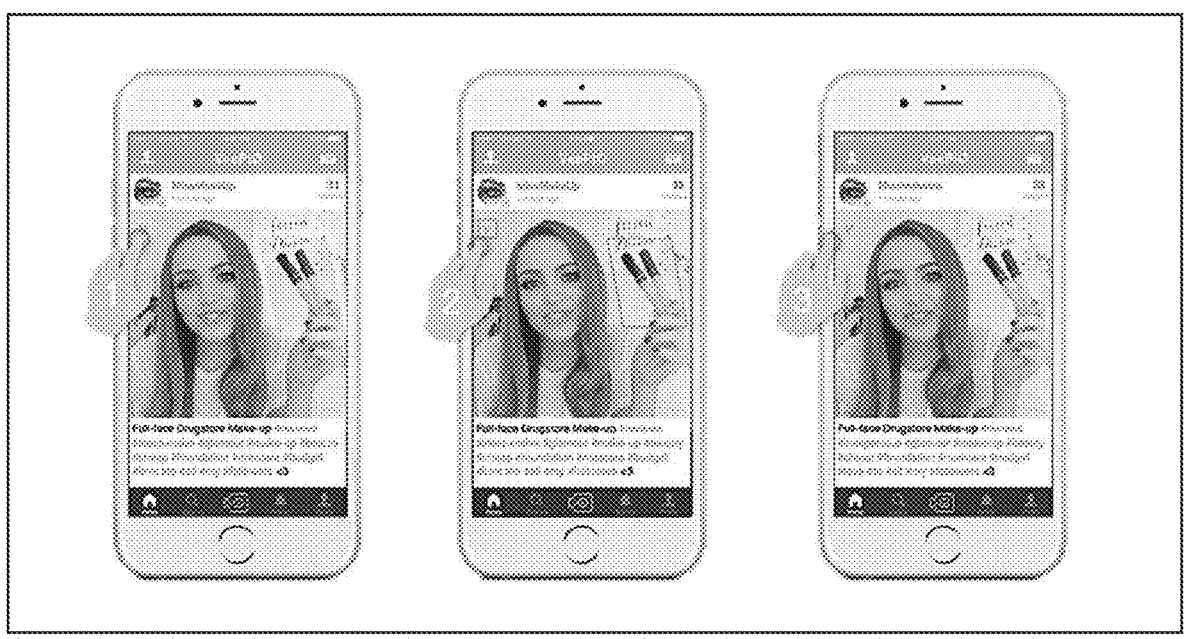

FIG. 23: Once published, the video shows up first in the feed. Tapping the "V" once reveals a transparent halo around each Veep'd object. (1st Screen) Tapping twice places colored boxes on each object so users can view multiple objects with ease. (2nd Screen) Veep'ers can turn objects off by tapping the "V" watermark a third time. (3rd Screen)

Figure 24:
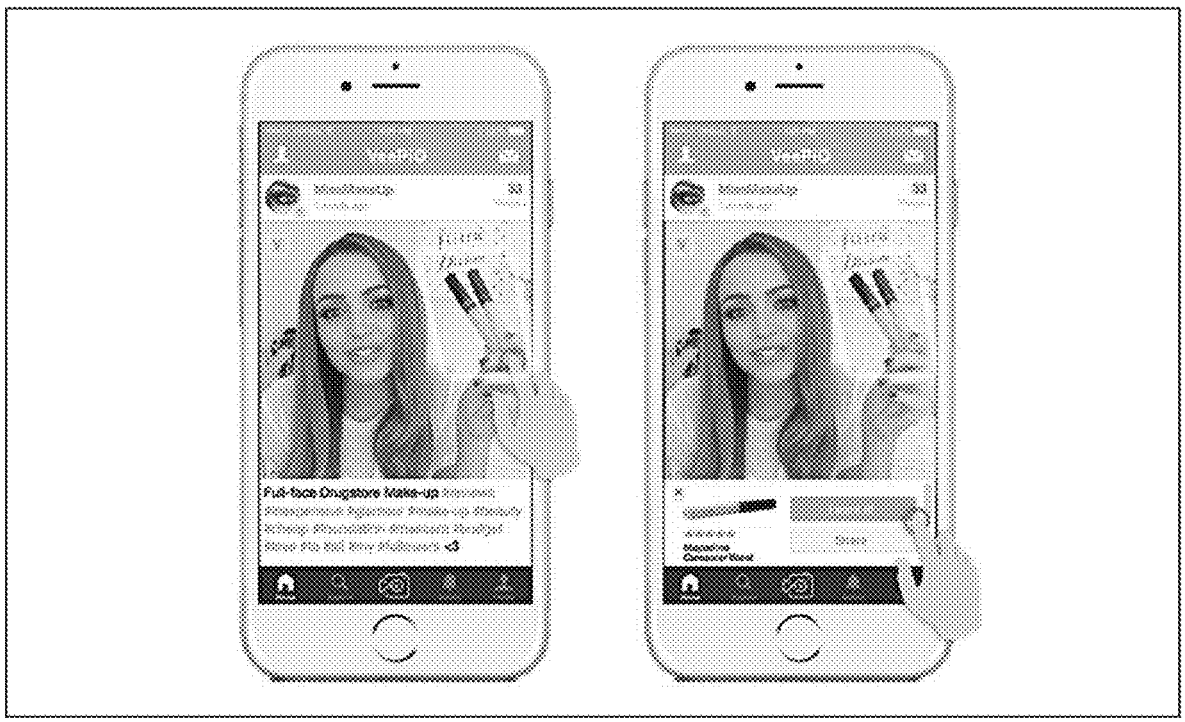

FIG. 24: With object view on, it's easy to tap any Veep'd object and bring up the "I want it!" fly-out.

Figure 25:
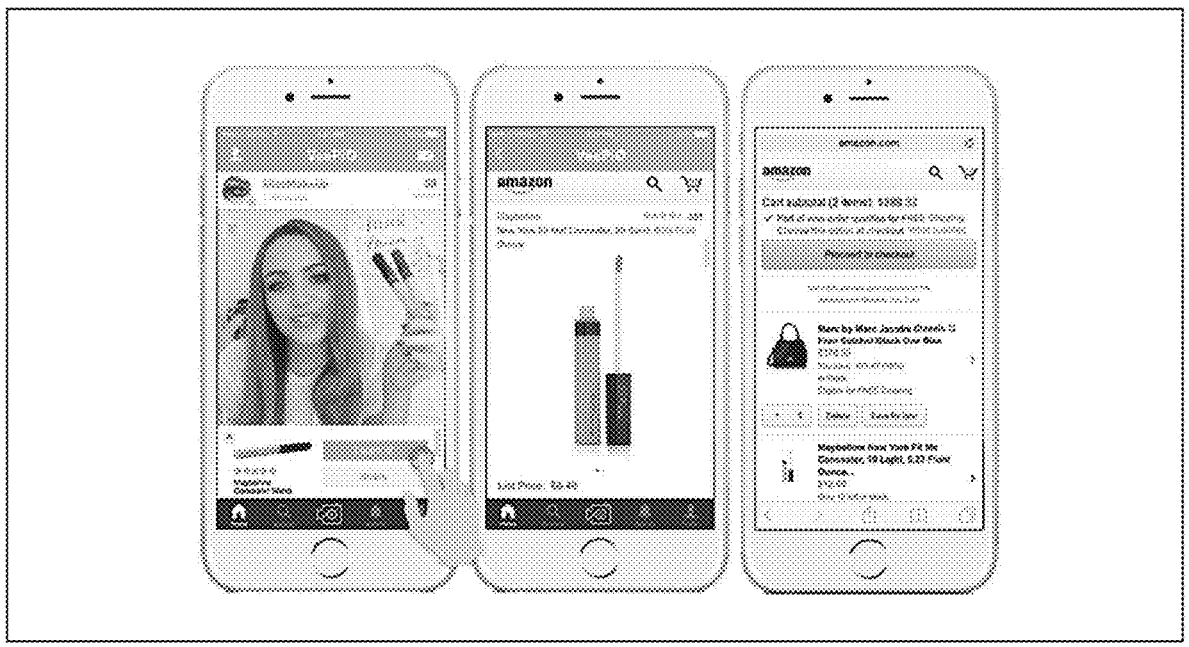

FIG. 25: Users can then purchase Veep'd objects straight from the video with no hurdles to checkout.

Figure 26:
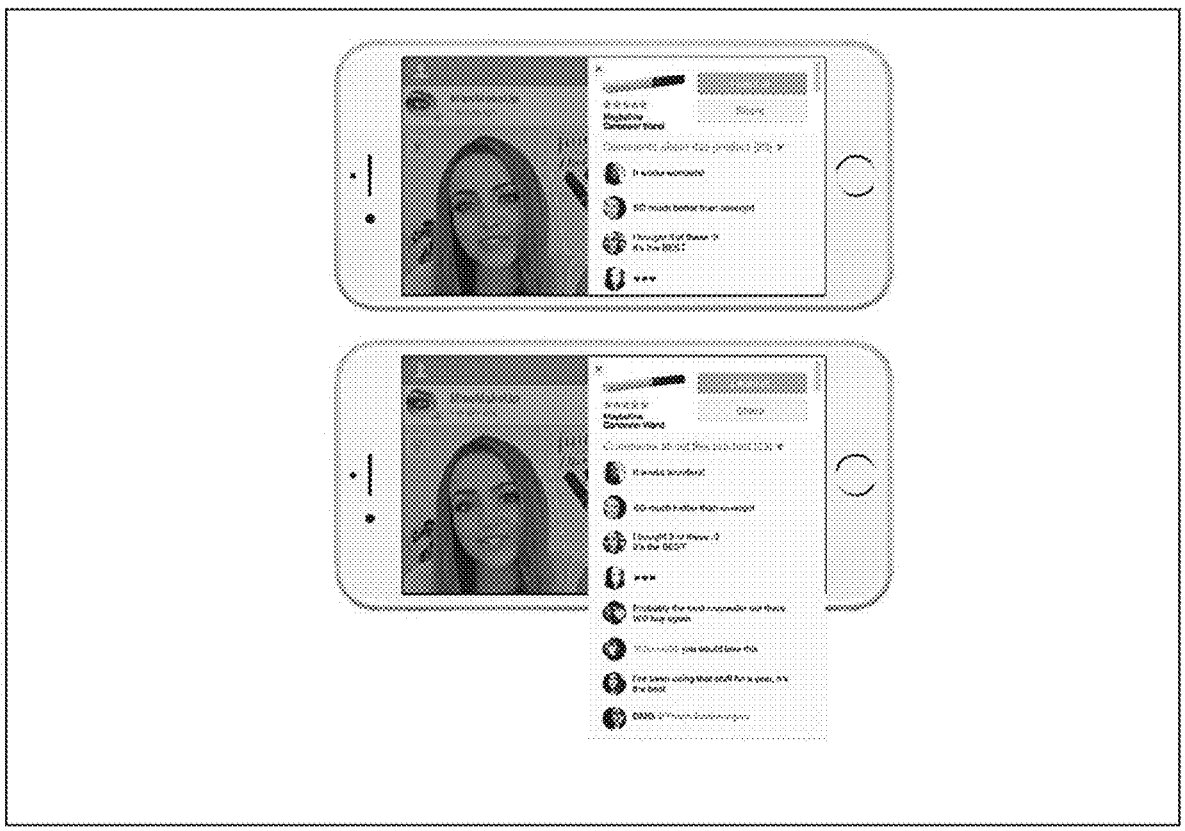

FIG. 26: Veepio users can also share and view sub-comments related to individual products.

Figure 27:
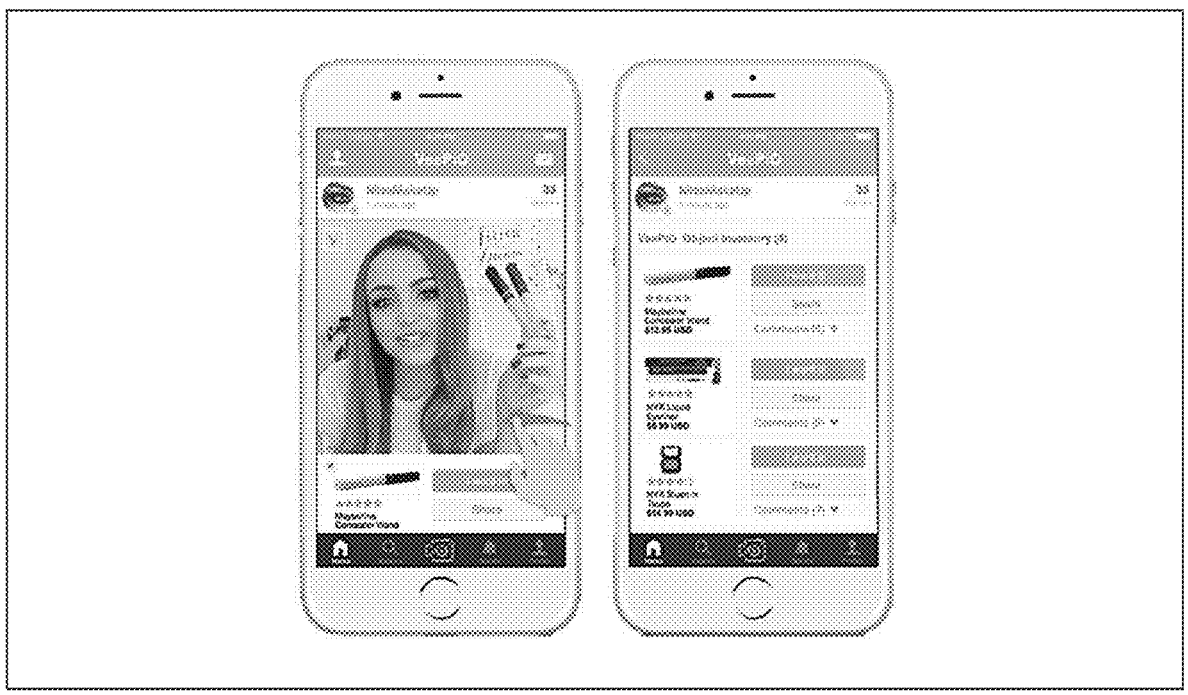

FIG. 27: Swiping left on the video guides users to a list of all Veep'd objects within a single video.

Figure 28:
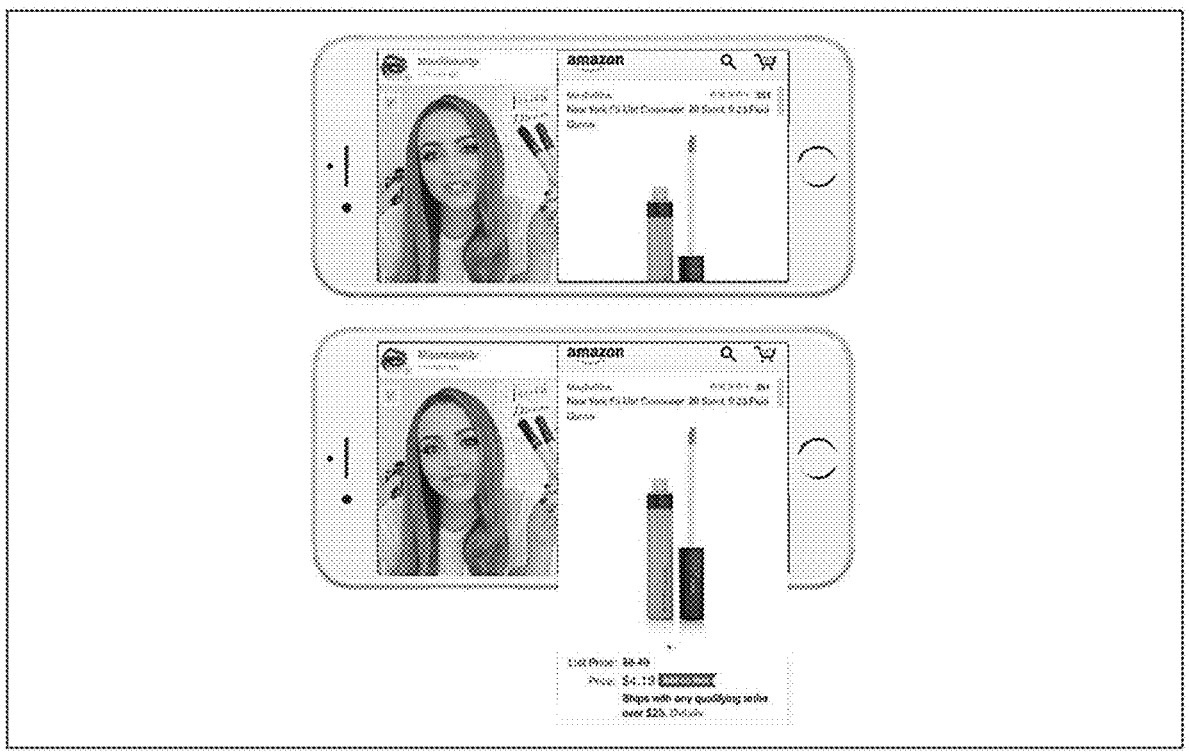

FIG. 28: No re-direct is required in VeePiO. Users can view product pages via a split screen, giving them a way to browse that product while they watch it in action.

Figure 29:

FIG. 29: VeePiO users can earn money from all Veep'd objects that go to purchase. Over time, VeePiO users can chart their growth and watch their progress via their profile. The features of the first preferred embodiment are summarized below.

A first method is provided for ranking videos according to a duration of time a given object appears in the video. The first method operates as follows:

a. Provide a database of video files.

b. Search each video file for the occurrence of at least one object.

c. Determine a duration of time that the at least one object was displayed in each video file.

d. For each video file, output information specifying the video file and the duration of time.

The first method may further include the following additional steps:

i. Output information specifying a ranking of the duration of time in a given video file relative to each of the other video files in the database.

ii. Search the video file for the occurrence of first and second objects, determine a duration of time that each of the first object and the second object were displayed in each the video file, and output information specifying the video file and the duration of time.

iii. Determine contextual information related to the duration of time that the at least one object was displayed in each the video file, and output information specifying the video file, the duration of time, and the contextual information.

A first system is provided for creating analytic information related to viewer activity in viewing videos having segmented video objects. The first system includes the following components:

a. A video server comprising a computer connectable to a distributed network and having a processor, random access memory, read-only memory, and mass storage memory.

b. At least one video file stored in a video database on or accessible to the video server.

c. An object inventory database stored on or accessible to the video server, the object inventory database containing information describing a location of at least one video object within the at least one video file.

d. Object description content in a database stored on or accessible to the video server.

e. A video overlay linking the object description content with a given video object and creating a selectable hyperlink whose position tracks a dynamic location of the video object in the video or a space around the at least one object, wherein the video overlay is adapted to allow a consumer to interact with the video overlay to select an object displayed in the video file and add the selected object to a collection of objects.

f. An analytics database recording the interactions of the consumer, including information related to the object selected.

The first system may also include the following features:

i. The analytical information related to the viewer activity is indexed and searchable.

ii. The creator of the video is assigned a number or letter based grading system based on the past performance of the video or videos that the creator has created so that participants in the auction for the hyperlink or hyperlinks associated with the content can evaluate the value of the video without any analytical data being available for that specific video.

iii. The video server includes a software application for displaying object description content associated with the object selected by the consumer.

iv. The video server includes software for sharing the collection of objects or sharing data associated with the collection of objects.

v. The video server shares the collection of objects or shares data associated with the collection of objects with a social networking service via the distributed network.

vi. The analytics database includes information about the consumer, including information about objects that were added to the collection of objects.

vii. The distributed network is the World Wide Web and/or a social network.

viii. The video server includes a software application for purchasing an item associated with the selected object.

ix. The analytics database includes information about items purchased associated with the selected object.

A second system is provided for making an interactive overlay for a video. The second system includes the following components:

a. A server including a computer having a processor, random access memory, read-only memory, and mass storage memory. The server includes one or more video files stored in a video database.

b. An object inventory database stored on the server and containing information describing a location of at least one video object within one of the video files.

c. An overlay generation application executed on the server for creating a video overlay including at least one selectable hyperlink whose shape and position tracks a dynamic location of the video object in the video. The overlay is stored on the server.

The second system may also include the following features:

i. Creators of the video and viewers of the video are able to post comments related to the video and/or the at least one interactive object in the video that are displayed when the overlay that tracks the interactive object is clicked or touched. The comments are specific to only the interactive object they are related to.

ii. The creators of the video are able to associate other content like comments, pictures, links, audio files to the interactive objects. This content appears when the objects are hovered over, clicked or touched.

iii. A wireframe database is stored on the server. The wireframe database stores three dimensional wireframe representations of at least one video object. The overlay generation application matches occurrences of video objects in the object inventory library with three-dimensional wireframe representations of at least one video object and creates a video overlay including matched wire frame representations of the at least one video object wherein the shape and position of the wireframe representation tracks a dynamic location of the video object in the video.

A third system is provided for making an interactive overlay for a video. The third system includes the following components:

a. A server including a computer having a processor, random access memory, read-only memory, and mass storage memory. The server includes one or more video files stored in a video database.

b. An object inventory database stored on the server and containing information describing a location of at least one video object within one of the video files.

c. A wireframe database stored on the server. The wireframe database stores a three dimensional wireframe representation of at least one video object.

d. An overlay generation application executed on the server. The overlay generation application matches occurrences of video objects in the object inventory library with a corresponding three-dimensional wireframe representation of at least one video object and creates a video overlay including matched wireframe representations of the at least one video object, wherein the shape and position of the wire frame representation tracks a dynamic location of the video object in the video. The overlay is stored on the server.

The video overlay may include at least one selectable hyperlink whose shape and position tracks a dynamic location of the video object in the video.

A fourth system is provided for making an interactive overlay for a video. The fourth system includes the following components:

a. A server including a computer having a processor, random access memory, read-only memory, and mass storage memory. The server includes one or more video files stored in a video database.

b. An object inventory database stored on the server and containing information describing coordinates of at least one video object within one of the video files.

c. A wire frame database stored on the server, the wireframe database storing a three-dimensional wireframe representation of at least one video object.

d. A wireframe generation application executed on the server. The wireframe generation application selects a video object from the video object inventory database and generates a three-dimensional wire frame of the selected video object from multiple perspective occurrences of the video object in the video file.

The fourth system may also include the following features:

i. The wireframe generation application generates a lighting model for each occurrence of a video object in a video frame from light distribution on the video object.

ii. An overlay generation application executed on the server. The overlay generation application matches occurrences of video objects in the object inventory library with three dimensional wireframe representations of at least one video object and creates a video overlay including matched wire frame representations of the at least one video object, wherein the shape and position of the wire frame representation tracks a dynamic location of the video object in the video.

iii. The video overlay includes at least one selectable hyperlink whose shape and position tracks a dynamic location of the video object in the video.

A fifth system is provided for automatically segmenting and classifying video content into objects. The fifth system includes the following components:

a. A server including a computer connectable to a distributed network and having a processor, random access memory, read-only memory, and mass storage memory. The server includes one or more video files stored in a video database.

b. A wireframe database stored on the server. The wireframe database stores a three dimensional wireframe representation of at least one video object and at least one of descriptive information and semantic information used to describe the object.

c. An object inventory database containing information describing a location of at least one video object within one of the video files.

d. A video content analysis application executed on the processor. The video content analysis application segments the video files to identify locations of video objects, searches for a matching occurrence in the wireframe database for each video object, retrieves information describing the video object from the wireframe database, and stores in the object inventory database information describing the dynamic location of the video object within the video and information describing the video object.

After the video has been segmented into frames, an object recognition algorithm can track and identify every frame where a specific object appears. Further, if the creator of the video identifies an object in a frame that appears after the first frame where the object appears, the algorithm is able to process the video frames in reverse time sequence so that the overlay can be applied to the first frame in which the object appears.

A sixth system is provided for viewing video having segmented video objects. The sixth system includes the following components:

a. A video server comprising a computer connectable to a distributed network and having a processor, random access memory, read-only memory, and mass storage memory.

b. At least one video file stored in a video database on or accessible to the video server.

c. An object inventory database stored on or accessible to the video server. The object inventory database contains information describing a location of at least one video object within the at least one video file.

d. Object description content in a database stored on or accessible to the video server.

e. A video overlay linking the object description content with a given video object and creating a selectable hyperlink whose position tracks a dynamic location of the video object in the video, wherein the video overlay is adapted to allow a consumer to interact with the video overlay to select an object displayed in the video file and add the selected object to a collection of objects.

A second method is provided for interacting with a video file content exchange. The first method operates as follows:

a. Provide at least one video file stored in a video database on or accessible to a video server via a distributed network.

b. Provide an object inventory database stored on or accessible to the video server via the distributed network, the object inventory database containing information describing a location of at least one video object within the at least one video file.
  c. Provide a video overlay linking object description content with a given the video object and create a selectable hyperlink.
  d. Allow consumers to display and access the at least one video file.
  e. Allow consumers to select an object displayed in the video file by interacting with the video overlay and add the selected object to a collection of objects.

To summarize, the first preferred embodiment provides a system and method for identifying objects in video either automatically by using an object database or manually by using information provided by the creator of the video, making the objects interactive in every frame of the video that they appear, allowing the creator to embed information behind the video objects that appears when a viewer hovers over, clicks or touches the object, allowing the creator to describe at least one object that appears in a video, associating a hyperlink with a clickable space around the object in every frame that the object appears in, and electronically auctioning the rights to the hyperlink and what data the hyperlink connects to. The system includes a video server communicating with a consumer server over a distributed network. The video server includes at least one video file, an object inventory database, and relevant content including associated hyperlinks in a database stored on or accessible to the video server. The object inventory database contains information describing a location of at least one video object within at least one video file and the hyperlink that is associated with the object. A video overlay links the relevant content with a given video object and creating a selectable hyperlink whose position tracks a dynamic location of the video object in the video. The consumer server includes a software application for accessing and displaying at least one video file stored in the video database, the software application including means for interacting with the video overlay to select an object displayed in the video file.

II. Embodiment 2

In describing the VEEPIO platform, also referred to interchangeably as an "application platform," the following glossary of terms are provided:
  i. content owner (also, referred to interchangeably as "content provider"): entity that controls the posting of content in electronic media (image or video) and which receives any monetization from the posting of the content.
  ii. content creator (creator): In most instances, the content owner is the same entity as the content creator. However, a creator may be hired to make content for a content owner, in which case the entities would be different. However, in the figures described below, it is presumed that these entities are the same.
  iii. viewer (used interchangeably with "user"): person who views content, and optionally purchases objects shown in the content. In the context of the present invention, the viewer interacts with display screen within the VEEPIO app.
  iv. buyer: a viewer who purchases a VEEP'ed object.
  v. digital media file: This refers to the file containing a specific image or video.
  vi. Uniform Resource Identifier (URI): A URI is the generic term for all types of names and addresses that refer to objects on the World Wide Web. A Uniform Resource Locator (URL) is one type of URI.
  vii. web address: synonym for a URL that uses the HTTP or HTTPS protocol.
  viii. point (pointing): This refers to the action of interacting with a region of a digital media file being shown on a display screen. In a preferred embodiment, the purpose of the pointing is to identify an object of interest at a particular location within the displayed digital media file. The pointing may be performed with a conventional pointing devices, such as a mouse. If the display screen has a touch surface, the pointing may be performed by touching, clicking on, or hovering over the location with a finger or the like. Other location identifying technology may be used as well.

The paradigm of VEEPIO is that a viewer is in VEEPIO's smartphone app viewing VEEP'd media content. If a viewer clicks on a VEEPIO object in a media source, a separate window opens on the display screen that provides the object information, the content owner's description of the object, and the social media feed regarding the object.

Figure 30A:
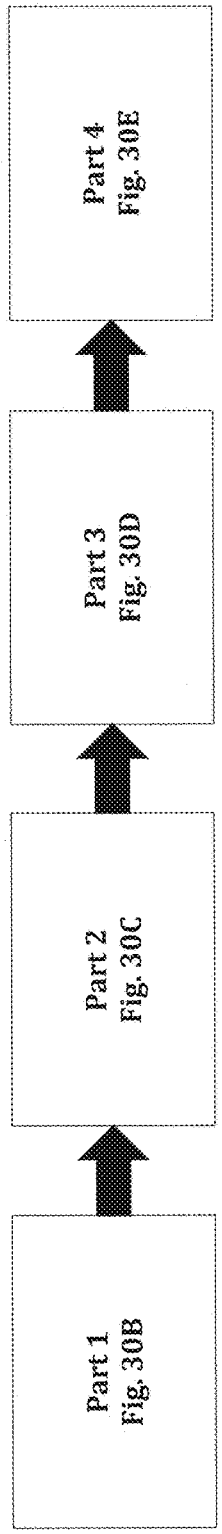
FIGS. 30A-30E, taken together, show an overview of another embodiment of the present invention.
Figure 30B:
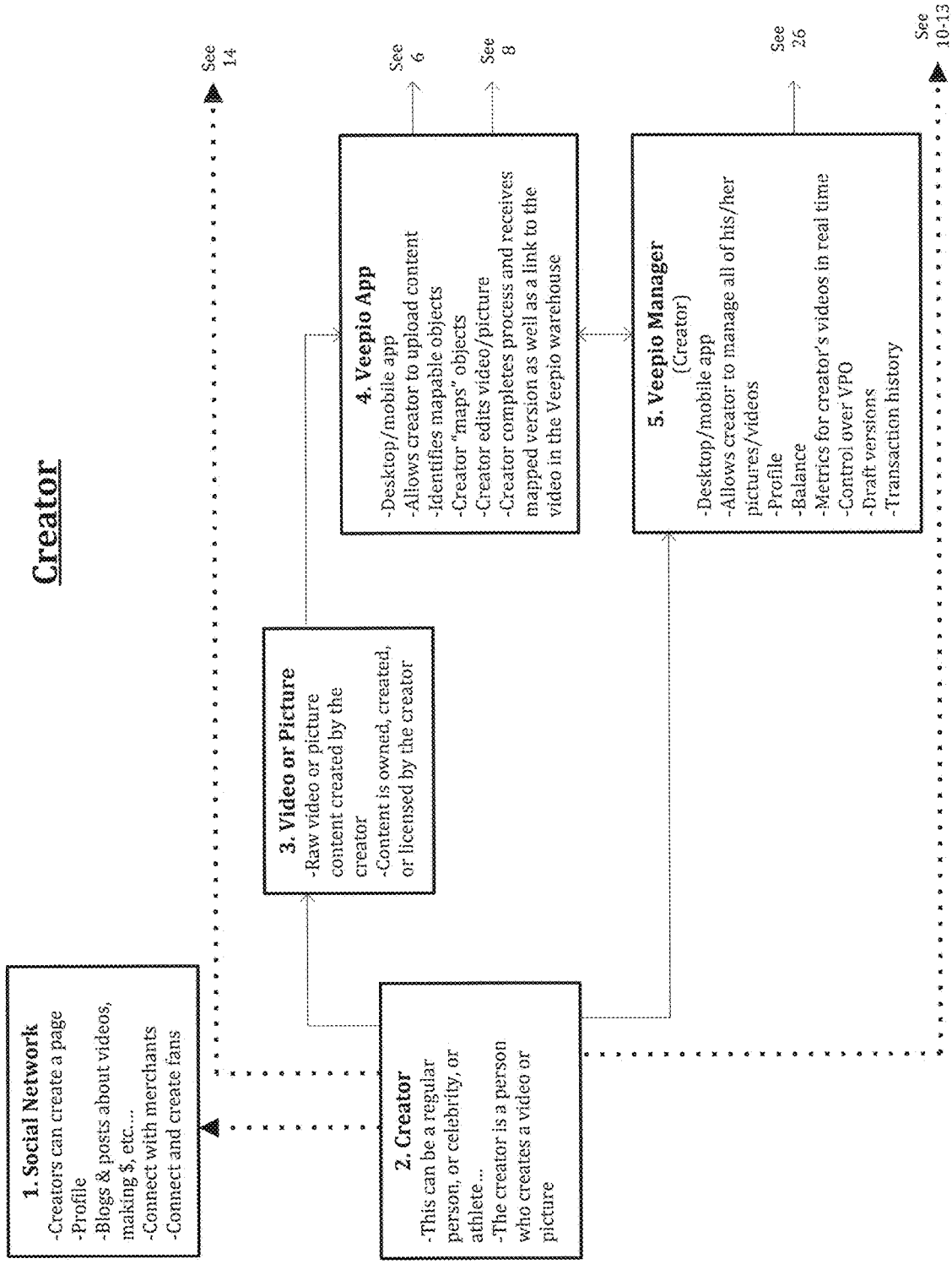
Figure 30C:
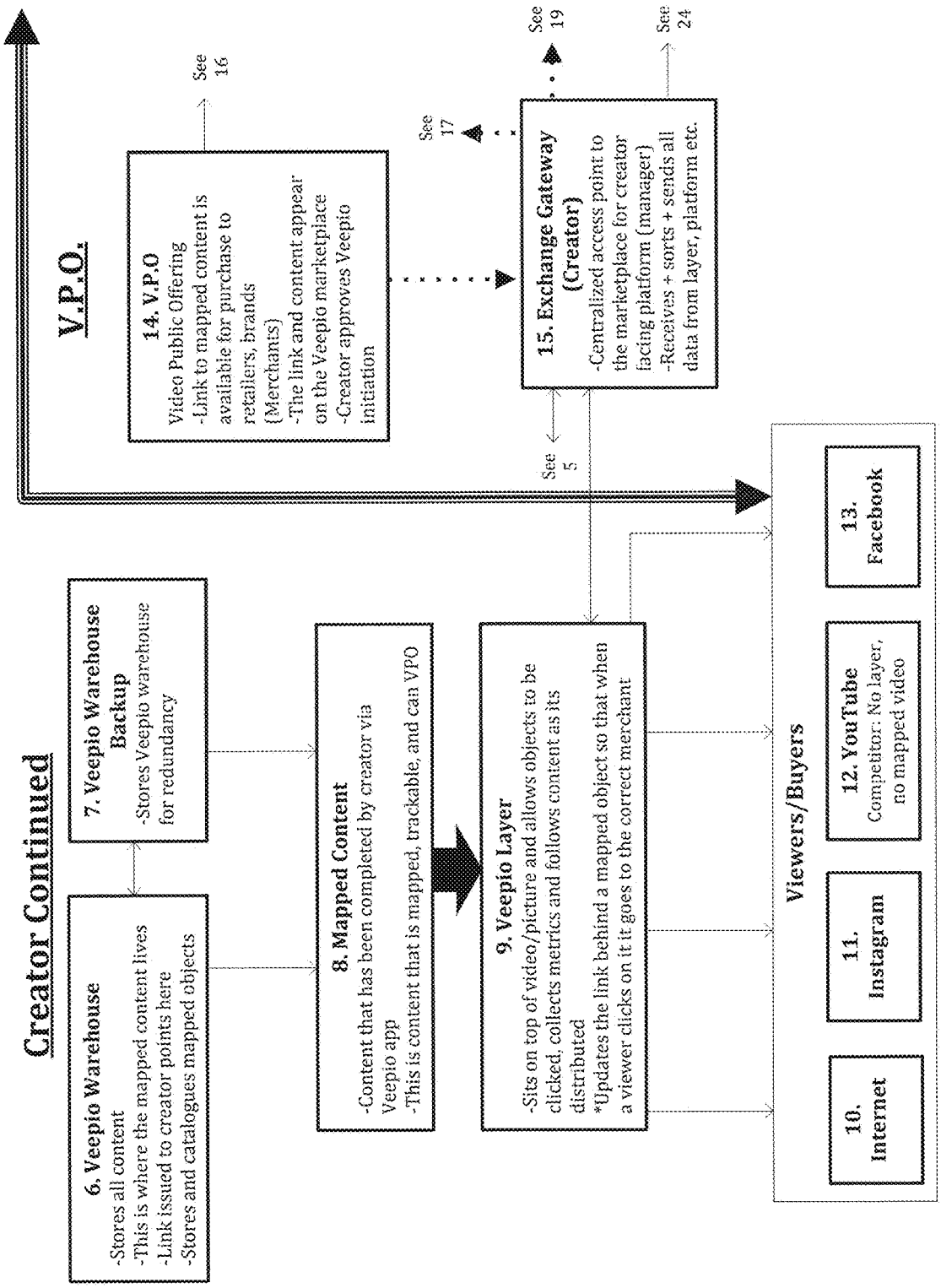
Figure 30D:
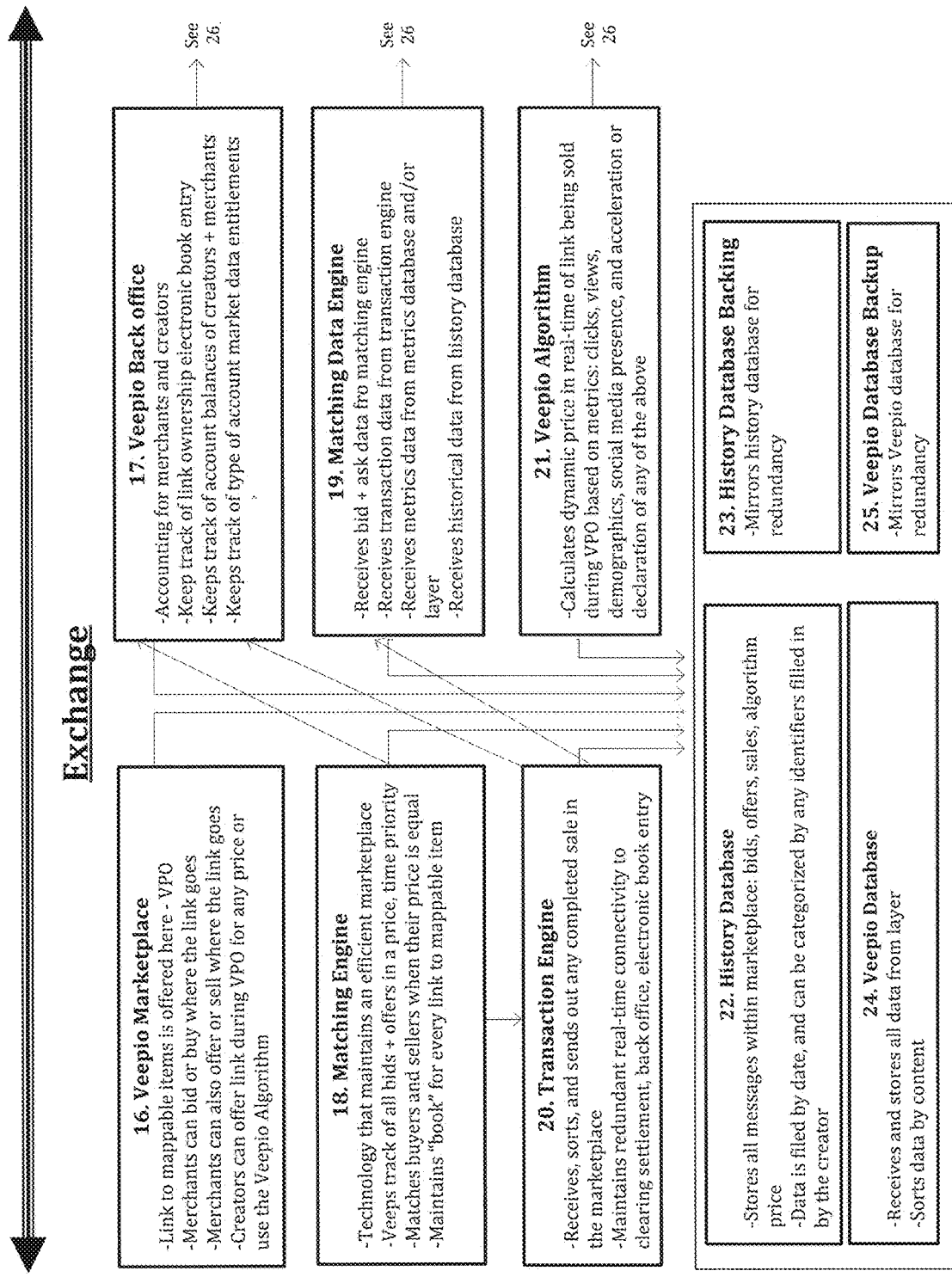
Figure 30E:
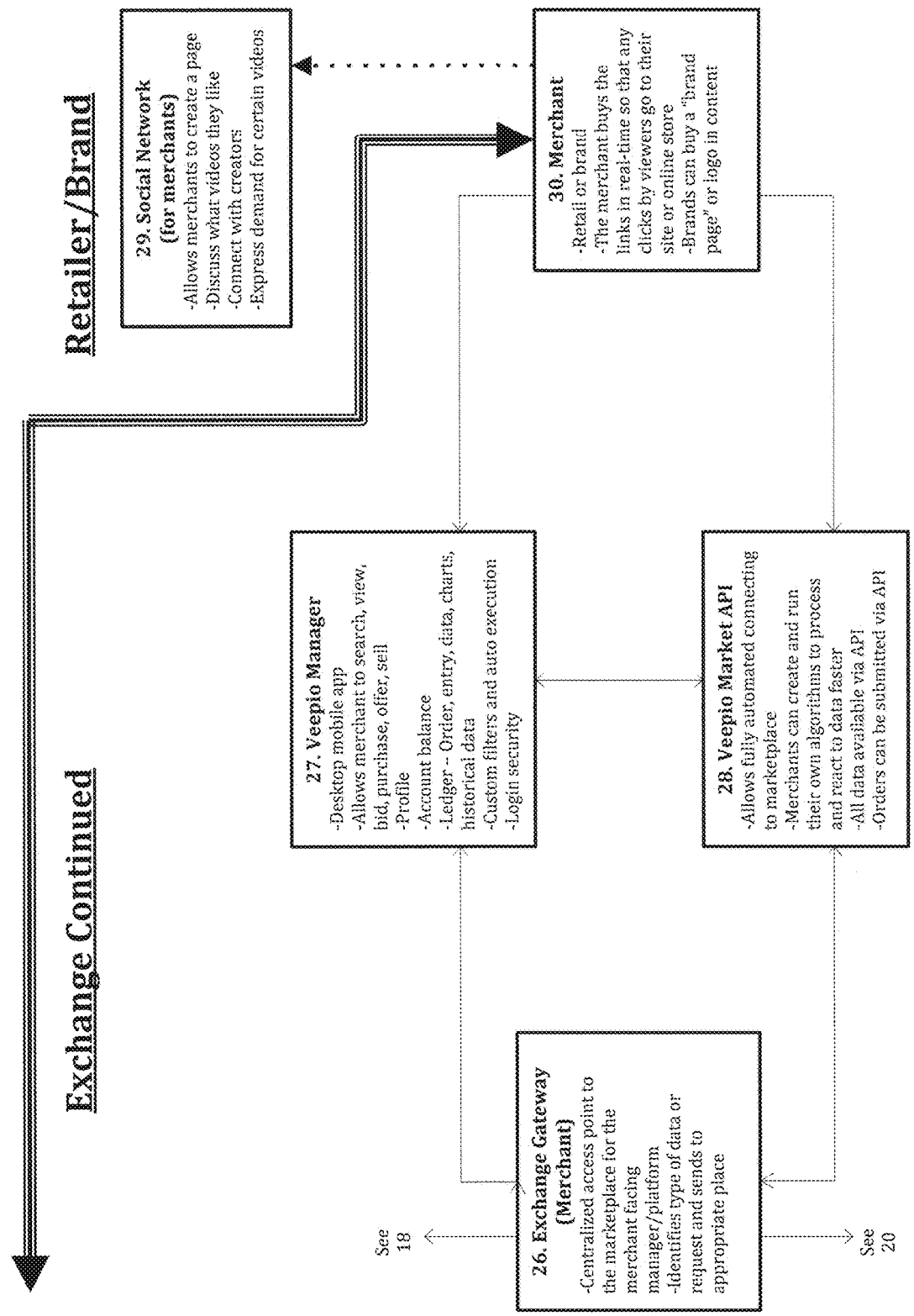

FIGS. 30A-30E, taken together, show an overview of embodiment 2. This embodiment includes many of the same features described above in embodiment 1, and thus is partially redundant with embodiment 1. FIG. 30A shows how FIGS. 30B-30E are connected and also provides a key to the three types of flow lines used in FIGS. 30B-30E. There are 30 parts of the overall process. The parts interconnect across the multiple figures via the labels that read "See #" wherein # is the part. The parts are described within the figures, but are repeated below for convenience.
  1. Social network
     i. Creators can create a page
     ii. Profile
     iii. Blogs & posts about videos, making $, and the like
     iv. Connect with merchants
     v. Connect and create fans
  2. Creator
     i. This can be a regular person, celebrity, athlete or the like.
     ii. The creator is a person who creates a video or picture
  3. Video or Picture
     i. Raw video or picture content created by the creator
     ii. Content is owned, created, or licensed by the creator
  4. Veepio App (Veepio Application)
     i. Desktop/mobile app
     ii. Allows creator to upload content
     iii. Identifies mappable objects
     iv. Creator "maps" objects
     v. Creator edits video/picture
     vi. Creator completes process and receives mapped version as well as a link to the video in the Veepio warehouse
  5. Veepio Manager (Creator)
     i. Desktop/mobile app
     ii. Allows creator to manage all of his/her pictures/videos
     iii. Profile
     iv. Balance
     v. Metrics for creator's videos in real time
     vi. Control over VPO
     vii. Draft versions
     viii. Transaction history
  6. Veepio Warehouse
     i. Stores all content
     ii. This is where the mapped content lives
     iii. Link issued to creator points here iv. Stores and catalogues mapped objects
7. Veepio Warehouse Backup
   Stores Veepio warehouse for redundancy
8. Mapped Content
   i. Content that has been completed by creator via Veepio app
   ii. This is content that is mapped, trackable, and can VPO
9. Veepio Layer
   i. Sits on top of video/picture and allows objects to be clicked, collects metrics and follows content as its distributed
   ii. Updates the link behind a mapped object so that when a viewer clicks on it, it goes to the correct merchant
10. Internet
11. Instagram
12. YouTube: Competitor: No layer, no mapped video
13. Facebook
14. V.P.O.—Video Public Offering
   i. Link to mapped content is available for purchase to retailers, brands (Merchants)
   ii. The link and content appear on the Veepio marketplace
   iii. Creator approves Veepio initiation
15. Exchange Gateway (Creator)
   i. Centralized access point to the marketplace for creator facing platform (manager)
   ii. Receives+sorts+sends all data from layer, platform, and the like
16. Veepio Marketplace
   i. Link to mappable items is offered here—VPO
   ii. Merchants can bid or buy where the link goes
   iii. Merchants can also offer or sell where the link goes
   iv. Creators can offer link during VPO for any price or use the Veepio Algorithm
17. Veepio Back office
   i. Accounting for merchants and creators
   ii. Keep track of link ownership electronic book entry
   iii. Keeps track of account balances of creators+merchants
   iv. Keeps track of type of account market data entitlements
18. Matching Engine
   i. Technology that maintains an efficient marketplace
   ii. Veeps track of all bids+offers in a price, time priority
   iii. Matches buyers and sellers when their price is equal
   iv. Maintains "book" for every link to mappable item
19. Matching Data Engine
   i. Receives bid+ask data fro matching engine
   ii. Receives transaction data from transaction engine
   iii. Receives metrics data from metrics database and/or layer
   iv. Receives historical data from history database
20. Transaction Engine
   i. Receives, sorts, and sends out any completed sale in the marketplace
   ii. Maintains redundant real-time connectivity to clearing settlement, back office, electronic book entry
21. Veepio Algorithm: Calculates dynamic price in real-time of link being sold during VPO based on metrics: clicks, views, demographics, social media presence, and acceleration or declaration of any of the above
22. History Database
   i. Stores all messages within marketplace: bids, offers, sales, algorithm price
   ii. Data is filed by date, and can be categorized by any identifiers filled in by the creator
23. History Database Backing: Mirrors history database for redundancy
24. Veepio Database
   i. Receives and stores all data from layer
   ii. Sorts data by content
25. Veepio Database Backup: Mirrors Veepio database for redundancy
26. Exchange Gateway (Merchant)
   i. Centralized access point to the marketplace for the merchant facing manager/platform
   ii. Identifies type of data or request and sends to appropriate place
27. Veepio Manager
   i. Desktop mobile app
   ii. Allows merchant to search, view, bid, purchase, offer, sell
   iii. Profile
   iv. Account balance
   v. Ledger—Order, entry, data, charts, historical data
   vi. Custom filters and auto execution
   vii. Login security
28. Veepio Market API
   i. Allows fully automated connecting to marketplace
   ii. Merchants can create and run their own algorithms to process and react to data faster
   iii. All data available via API
   iv. Orders can be submitted via API
29. Social Network (for merchants)
   i. Allows merchants to create a page
   ii. Discuss what videos they like
   iii. Connect with creators
   iv. Express demand for certain videos
30. Merchant
   i. Retail or brand
   ii. The merchant buys the links in real-time so that any clicks by viewers go to their site or online store
   iii. Brands can buy a "brand page" or logo in content Overview of Embodiment 2

An overview of embodiment 2 is described with respect to sample media sources Instagram and YouTube. However, the present invention is not limited to any particular media source.

1. "Track" Feature a. Instagram Embodiment: Steps of a Manual Process (Performed by Content Owner (Content Provider))

i. Place finger or pointer on an object in the Instagram image and indicate that you wish "track" the object.

ii. In a separate window, a search engine opens up and the content owner manually enters search terms to attempt to locate the object at an e-commerce site (e.g., AMAZON®, Lands End®).

iii. If the object is located in the search results, the content owner navigates to the site in the search results hit. The URL of the search results hit (typically a very long string of characters) appears in the location bar, as is well-known. For example, here is the URL of CREST Whitestrips on Amazon.com: http://www.amazon.com/Crest-White-Whitestrips-Professional-Effects/dp/B00336EUTK iv. The content owner associates the URL with the tracked object in the image. The link itself is not shown in the image.

v. A database associated with the Veepio platform maintains an association with the tracked object in the content owner's image and the URL. This database record is unique to the user's image ("personalized object"). The database record may also include additional description added by the user about the object, as well as a social media feed regarding the object in the user's image.

After completion of these steps, a subsequent viewer of the Instagram image will be provided with a visual cue that one or more objects in the image are clickable. If clicked, a browser is opened that automatically navigates to the previously stored URL of the e-commerce site so that the items can be purchased, and the viewer may also see whatever user description or social media feed may exist for the tracked object. (The URL is not viewable within the image.)

In an alternative version, steps ii. and iii. operate as follows:

ii. In a separate window, a VEEPIO-related search engine opens up and the content owner manually enters search terms to attempt to locate the object in a VEEPIO-related database of objects, wherein each object has its own URL. These URLs may be associated with a site provided by the product manufacturer (as opposed to an e-commerce site where the product can be purchased) or a privately developed site of objects (e.g., a database of described objects) that VEEPIO is licensed to use.

iii. If the object is located in the search results, the content owner navigates to the site in the search results hit. The URL of the search results hit appears in the location bar, as is well-known. For example, here is the URL of CREST Whitestrips in the VEEPIO-related database: http://veepio/ . . . OR http://crest.com/ . . . .

The remaining steps iv. and v. are the same as above.

In this alternative version, after completion of these steps, a subsequent viewer of the Instagram image will be provided with a visual cue that one or more objects in the image are clickable. If clicked, a browser is opened that automatically navigates to the previously stored URL, and the viewer may also see whatever user description or social media feed may exist for the tracked object. (Again, the URL is not viewable within the image.)

If the viewer wishes to purchase the object, the auction process described below occurs and the e-commerce site that won the auction appears so that the items can be purchased.

b. Instagram Embodiment: Steps of an Automated Process i. The content owner indicates that they want to "track" the objects in an Instagram image that is on the display by selecting an "auto-track" option.

ii. The Instagram image is uploaded to Veepio's platform and an auto-recognition process identifies all of the objects in the image that match objects in the platform's library.

iii. The content owner is presented with a list of the objects and selects the objects that they wish to "track" for their Instagram image.

iv. (same as step v. above) A database associated with the Veepio platform maintains an association with the tracked object(s) in the content owner's image and the URL. This database record is unique to the content owner's image ("personalized object"). The database record may also include additional description added by the content owner about the object(s), as well as a social media feed regarding the object(s) in the content owner's image.

In both manual and automated embodiments, the content owner receives a portion of the proceeds of any e-commerce purchase.

In both embodiments, a cookie travels with the link to the e-commerce site. As known in the art, e-commerce sites that employ affiliate marketing programs use a cookie of the last place that a person navigated to so as to identify where a potential purchaser came from. Since the viewer is inside of the VEEPIO app, the cookie is used to identify that the purchaser was referred by VEEPIO. VEEPIO has an omnibus account for use with the e-commerce sites and each VEEPIO content owner has a sub-account within the omnibus account for crediting to the content owners of any monetization that may result from the e-commerce activity.

c. Video Embodiment

The same manual and automated processes occur as described above. Once an object is identified, it is followed (tracked) throughout the video.

In the manual process, the content owner freeze-frames the video and identifies the object(s). Backward tracking also occurs so the object(s) are tracked and clickable in previous video frames that contain the object(s). "Key frames" are referred to herein as the frames that the object is in.

2. Object Warehouse

This is the database discussed above that is associated with the Veepio platform. It maintains an association with all tracked objects in the content owner's images/video. Each database record is unique to the content owner's image or video ("personalized object"). The database record may also include additional description added by the content owner about the object, as well as a social media feed regarding the object in the content owner's image or video. If the same object appears in a different image or video, it is maintained in a different database record and has its own content owner description and social media feed.

3. Exchange (Auction)

When implementing the exchange, the URL link is not a link to an e-commerce site, such as AMAZON or Land's End. Instead, the URL link is a link to a VEEPIO-maintained list of "personalized objects" (e.g., Brand/Model XYZ tennis racket in Jane Doe's Instagram photo, Brand/Model Nike sneakers in John Smith's YouTube video). These "personalized objects" have the same additional description added by the content owner about the object, as well as a social media feed regarding the object in the content owner's image or video.

When a viewer clicks on an object and indicates that they want to buy it, a real-time auction occurs in the background. Various information regarding the viewer is made available to the auction participants, such as the number of followers of the viewer and revenue of viewer from previous product purchases, to the extent that such information can be provided by VEEPIO. As viewers make purchases over time, VEEPIO learns their demographics. Also, the number of views of the image/video may be provided to the auction participants.

The viewer is automatically navigated to the e-commerce web page of the winner of the real-time auction where a purchase can be made. The winner is preferably the low-bidder of the auction, but other criteria may be factored into the winner-selection process.

If the object is only available at one location or source, such as a specific Land's End shirt, or an AMAZON Basics cable, the viewer may be provided with the option to purchase an equivalent (generic) object at another e-commerce retailer, and if that option is selected, the auction will include suppliers of the equivalent (generic) object.

The "thing" that is being auctioned is the VEEPIO link of the object (i.e., for this particular purchaser, who wants to offer to sell the object in the link to the purchaser, and for how much?)

4. Monetization Using VEEPIO Analytics

The broad appeal of VEEPIO is that VEEPIO media are always interactive vs. YouTube videos that just play, but have no interactivity within the actual video field. Here, "interactive" means that if the viewer is within the VEEPIO app and the viewer clicks on a region of the display screen that is showing the media, which may be a still image (e.g., an Instagram image) or a video (e.g., a YouTube video), something always gets displayed in a second window on the display screen while the image remains on the screen and the video keeps playing.

There are at least two paradigms to monetization, as follows:

Paradigm 1: The viewer clicks on a previously VEEP'd object in an image or video. Monetization occurs as previously described.

Paradigm 2: The viewer clicks on an image or frame of a video that is not VEEP'd. Some type of content is shown in the second window. The content owner and/or VEEPIO controls what content is shown, such as an ad that matches the demographics of the viewer.

VEEPIO analytics inform content owners where viewers are clicking on their videos (e.g., frames 1,255 and 1,490), as well as the demographics of the viewers. The viewers can then monetize that location as they see fit, using VEEPIO's platform.

5. Video Monetization

When a video is playing in the VEEPIO app, viewers may click on any location in any frame, thereby causing a second window to open. Unless the viewer is clicking on a previously defined object ("personalized object") which causes object-related info to appear in the second window as described above, the content owners allow VEEPIO to display ads in the second window if they wish to monetize the viewer clicking. A content owner may decide not to allow certain frames to invoke a second window.

In most instances, VEEPIO will be in the best position to monetize the clicked frame. However, content owners may be given choices regarding how they wish to monetize the viewer clicks, such as which ads they will allow to be shown in the second window.

6. E-Commerce Purchase (Referring to Version 1 and 3 Tables)

If the viewer wishes to purchase the object, the following scenarios may occur:

1. Affiliate marketing (e.g., Amazon Associates): VEEPIO has an omnibus account and each VEEPIO subscriber has a sub-account. Veepio navigates to Amazon's webpage for the Veep'd object.

2. Real-time auction mode:
   i. Object is well-defined (e.g., Canon EOS Rebel T5 Mfr #: 9126B069) Pre-registered e-commerce sites are provided with demographic information regarding the potential purchaser. The auction is conducted and the potential purchaser is navigated to the auction winner's site.
   ii. Object is not well-defined (e.g., red t-shirt)
   Same as above, except that e-commerce sites identify a red t-shirt in their inventory to use for the auction process.

7. VEEPIO Databases

FIGS. 31A-31C show high level views of selected fields and content of databases for implementing the e-commerce processes described above. These databases maintain the personalized objects (Veep'd objects). In the database of FIG. 31A, the object is purchased from an existing e-commerce site, such as AMAZON. In the database of FIG. 31C, the URL is auctioned for each purchase and the URL's are all VEEPIO-based locations. FIG. 31B shows how a database maintains key frames.

Referring to FIG. 31A, the database includes at least the following fields:
i. Media source
ii. URL (in this example, all are http://www.amazon.com/ ...)
iii. Frames of media source that contain the object (for video media sources)
iv. Object identifier—SKU/UPC/EAN/ASIN/Model #/Mfr #(if available) (Entry in VEEPIO database of described objects)
v. Content owner's description of object (details other than object identifier)
vi. Social media feed regarding the object
vii. location of the object in the media source (one location for an image, location in each key frame for a video media source) This location field is not illustrated in this view of the database.

Referring to FIG. 31B, the database includes at least the following fields:
i. Media source
ii. Product description web page (maintained by VEEPIO or manufacturer)
iii. KEY FRAMES—Frames of media source that contain the object (for video media sources)
iv. Object identifier—SKU/UPC/EAN/ASIN/Model #/Mfr #(if available) (Entry in VEEPIO database of described objects)
v. Content owner's description of object (details other than object identifier)
vi. Social media feed regarding the object
vii. location of the object in the media source (one location for an image, location in each key frame for a video media source) This location field is not illustrated in this view of the database.

Referring to FIG. 31C, the database includes at least the following fields:
i. Media source
ii. URL (in this example, all are http://www.veepio/ ...)
iii. Frames of media source that contain the object (for video media sources)

iv. Object identifier—SKU/UPC/EAN/ASIN/Model #/Mfr #(if available) (Entry in VEEPIO database of described objects)
v. Content owner's description of object (details other than object identifier)
vi. Social media feed regarding the object
vii. location of the object in the media source (one location for an image, location in each key frame for a video media source) This location field is not illustrated in this view of the database.

In the databases of FIGS. 31A-31C, only one object is shown for each media source. However, multiple objects may be Veep'd for a single media source, as illustrated in FIG. 27.

Detailed Description of Embodiment 2

1. "Track" Feature and Object Warehouse

A "track" is potentially any object in a photo or video that has metadata associated with it. When a user clicks or touches a track object in a photo or video, the user interface responds to the click or touch to display the associated metadata, which can be name, title, a website url, or the like.

Figure 32:
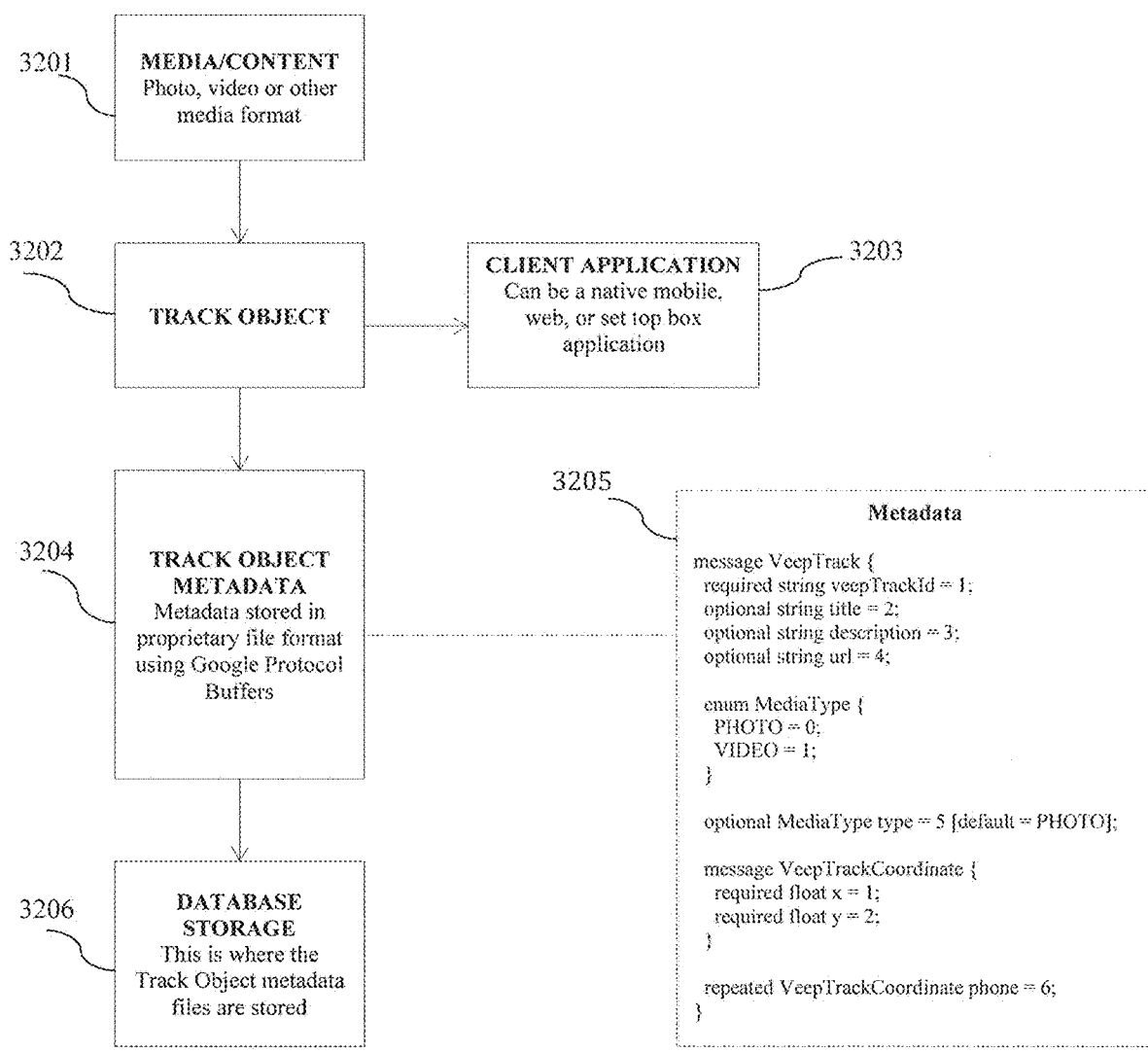
FIG. 32 is an overview flow diagram of a "Track" feature in accordance with one preferred embodiment of the present invention.

FIG. 32 is an overview flow diagram of the "Track" feature and illustrates the following parts:
- 3201: Media/Content The media/content may be a photo, video or other media format.
- 3202: Track Object
- 3203: Client Application: Can be a native mobile, web, or set top box application
- 3204: Track Object Metadata: In one preferred embodiment, the metadata is stored in a proprietary file format using Google Protocol Buffers. (Protocol buffers are Google's language-neutral, platform-neutral, extensible mechanism for serializing structured data.) Other file formats are within the scope of the present invention.
- 3205: Sample Object Metadata is shown in this block. The metadata includes at least title, name, url, and track owner id.
- 3206: Database Storage: This is where the Track Object metadata files are stored. One suitable database storage is a cloud storage solution, such as Amazon Simple Storage Service (Amazon S3) which is commercially available from Amazon Web Services (AWS).

Figure 33:
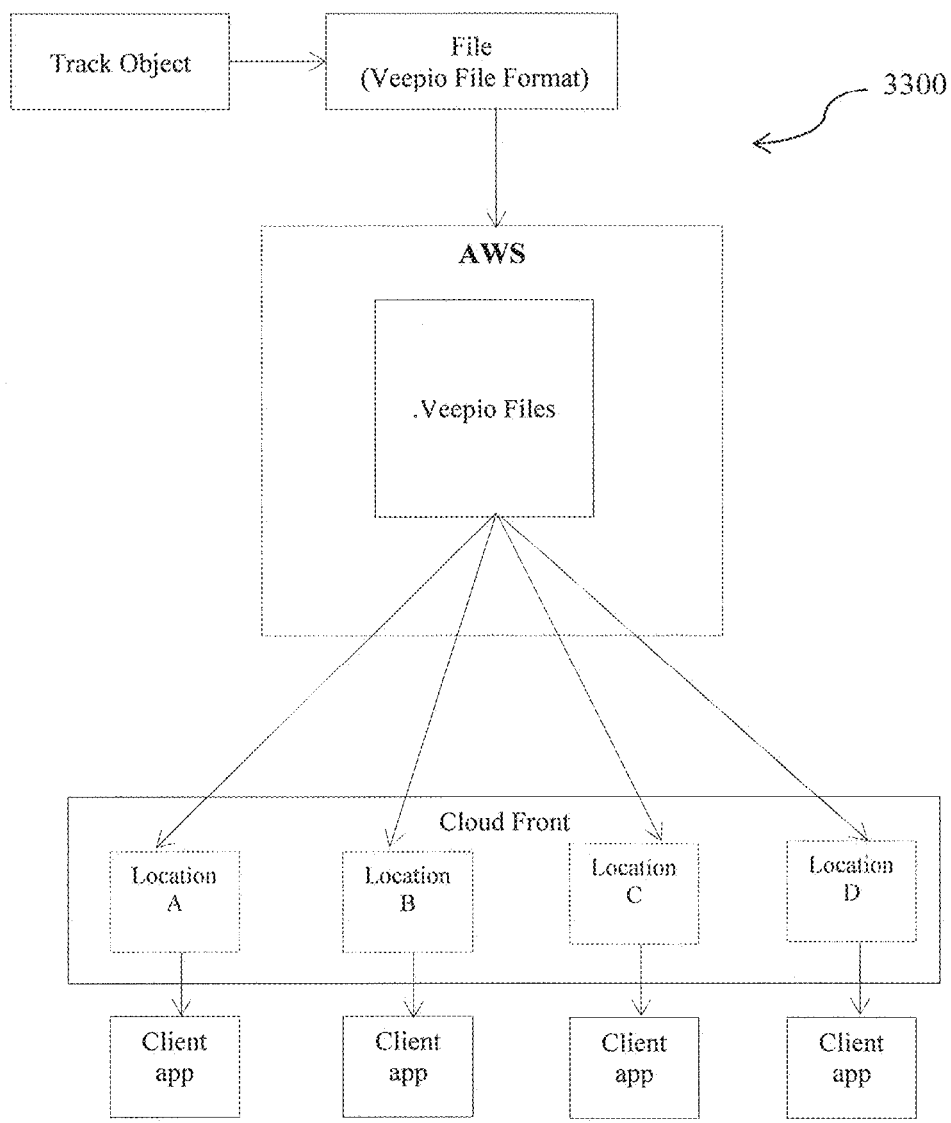
FIG. 33 is a schematic diagram of a database structure for VEEPIO files.

FIG. 33 is a self-explanatory schematic diagram of a database structure 3300 for Veepio files that uses AWS S3.

FIG. 34 is a self-explanatory sample table structure for the tracked objects.

Figure 35:
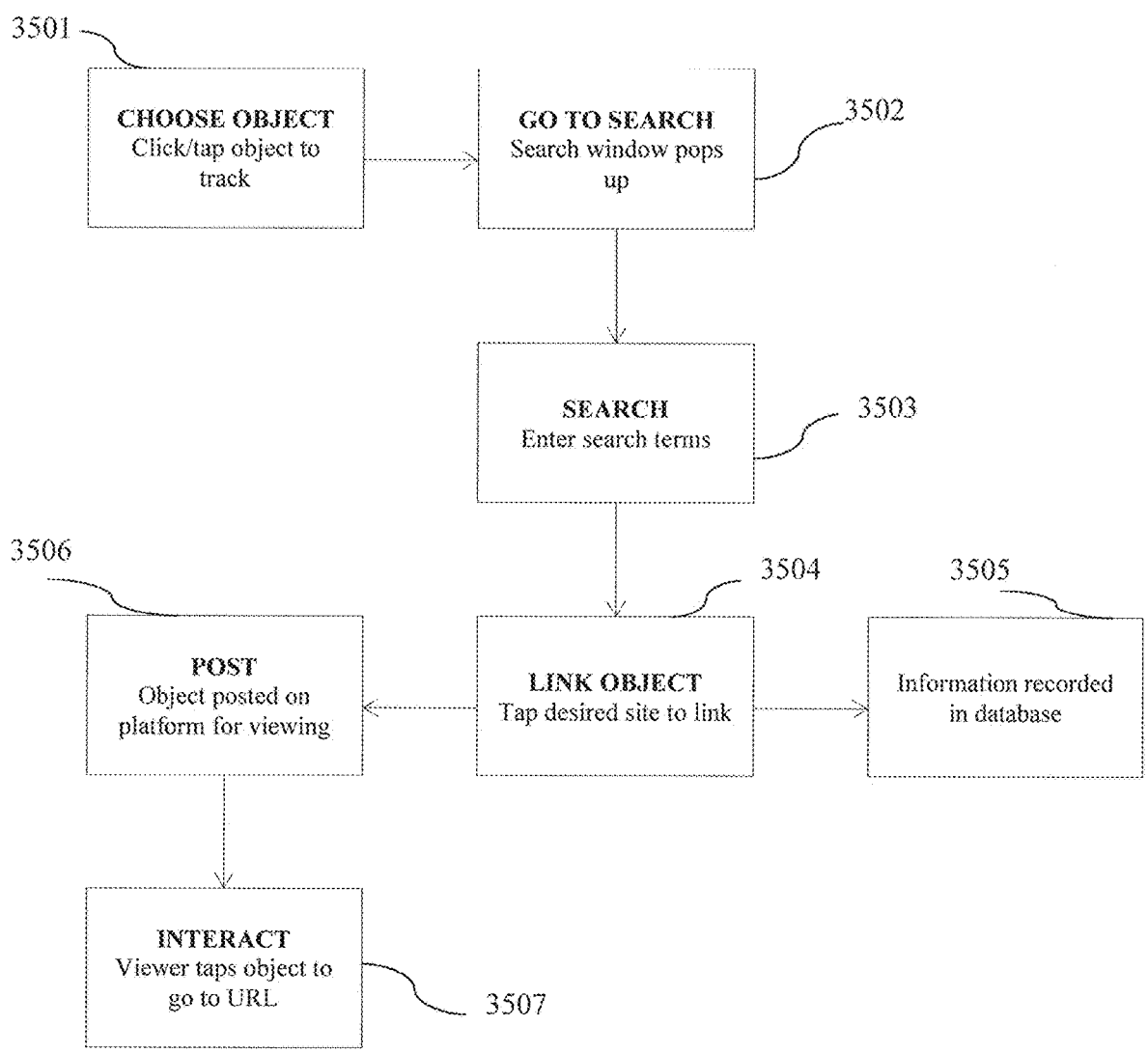
FIG. 35 is a process flowchart for the VEEPIO "Track" feature
Figure 39:
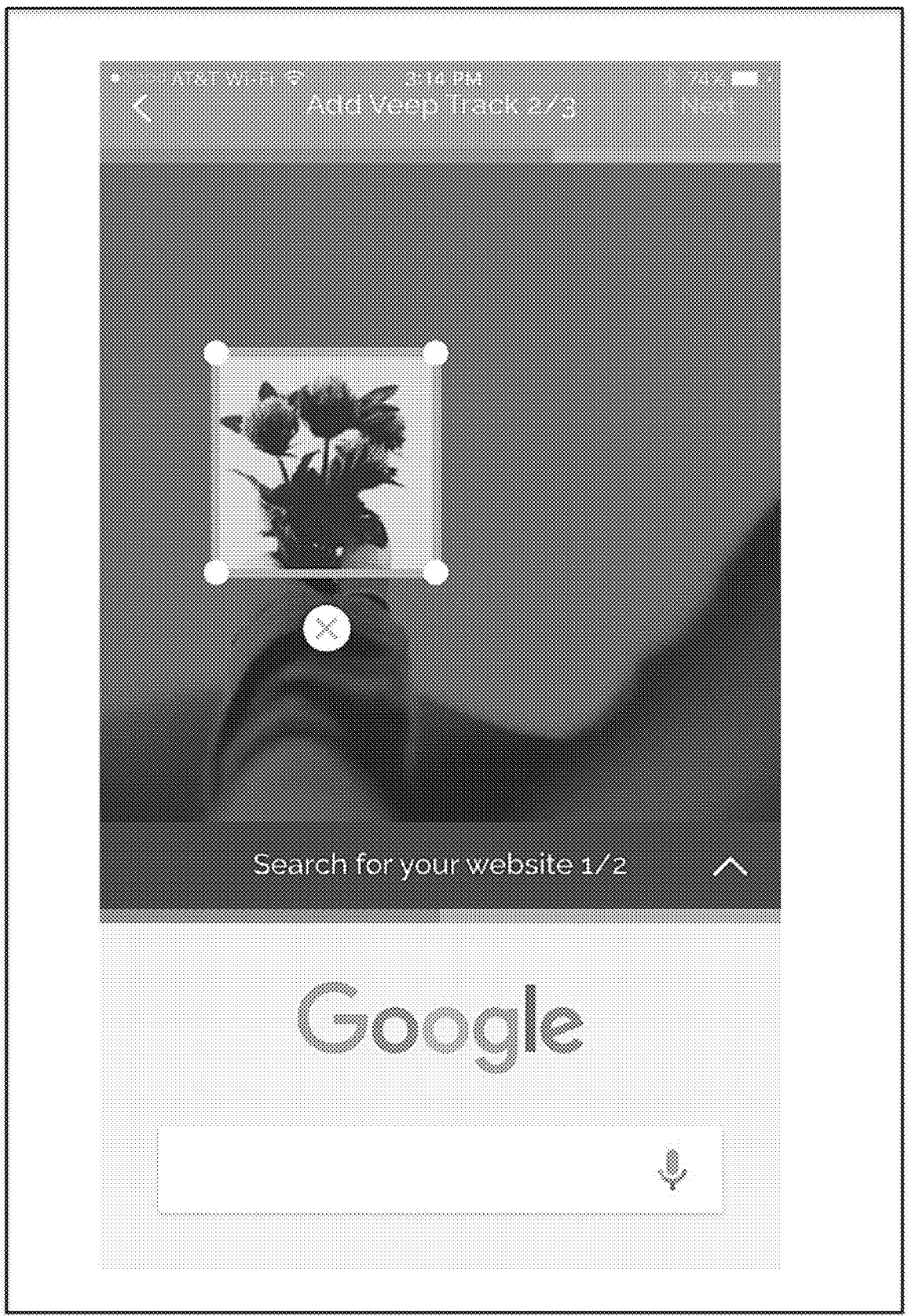
Figure 40:
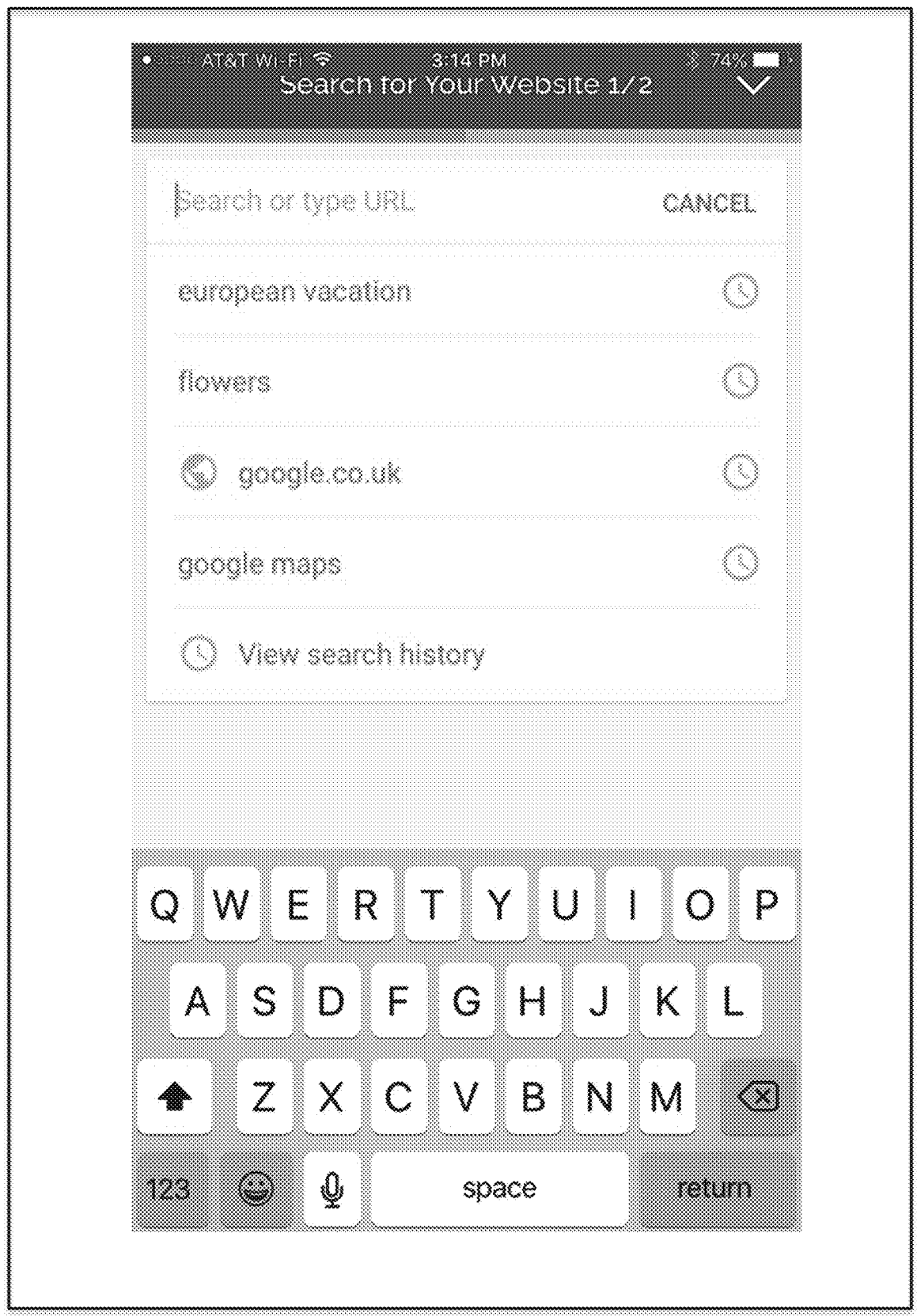
Figure 41:
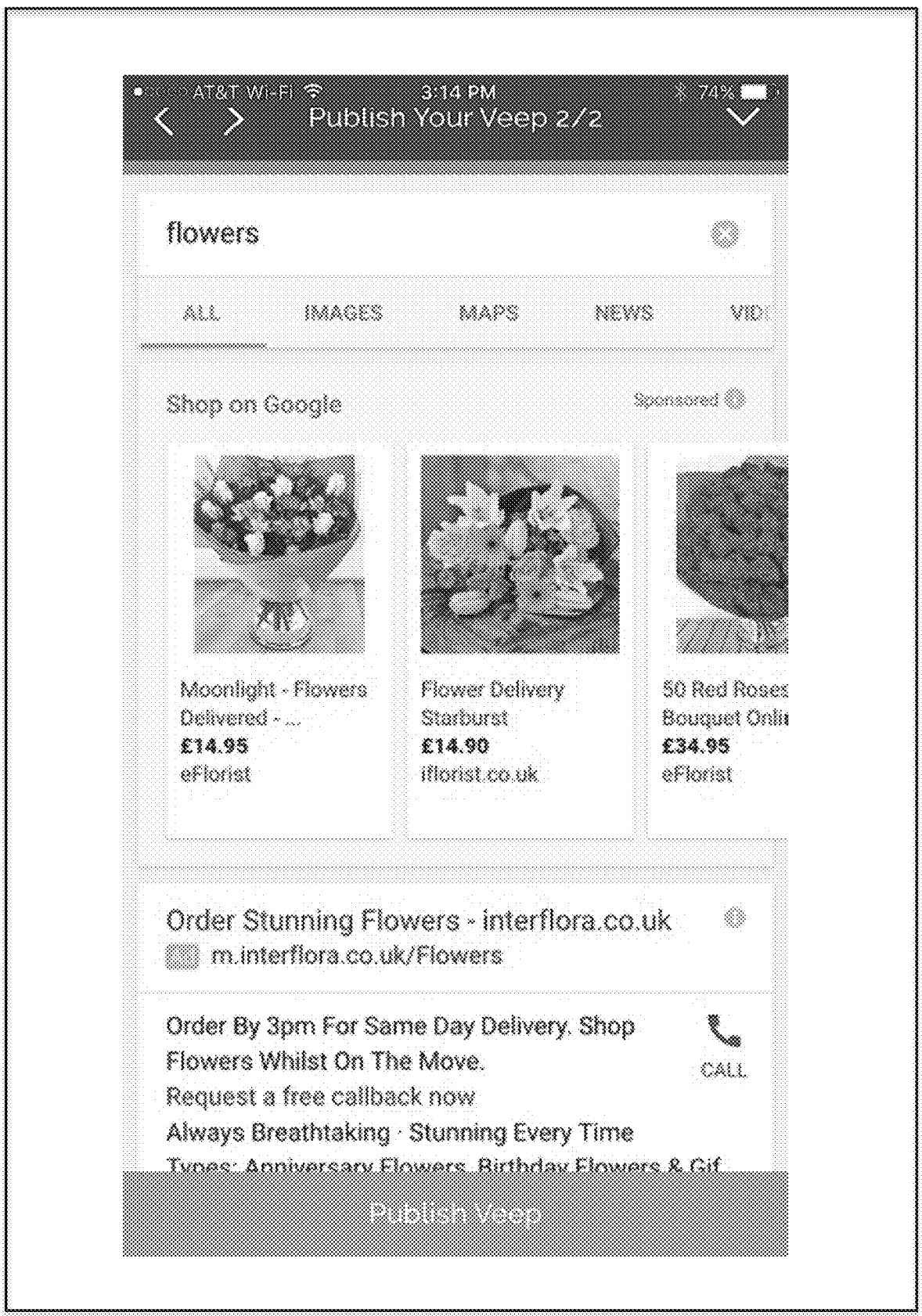

FIG. 35 is a process flowchart for the "Track" feature used by a content creator and viewer and shows the following steps:
- 3501: CHOOSE OBJECT: Click/tap object to track. This step is illustrated in FIG. 21.
- 3502: GO TO SEARCH: Search window pops up. This step is illustrated in FIG. 39, which is also discussed below.
- 3503: SEARCH: Enter search terms. This step is illustrated in FIGS. 40 and 41, which are also discussed below.
- 3504: LINK OBJECT: Tap desired site to link. This step is illustrated in FIG. 42. Here, the content creator has tapped the link for Teleflora (www.teleflora.com).
- 3505: Information is recorded in the Veepio database.
- 3506: POST: Object is posted on Veepio platform for viewing.
- 3507: INTERACT: Viewer taps object of interest to go to URL, view object information, and potentially tap a purchase prompt to open a link and purchase the object. These steps are illustrated in FIGS. 24-25.

Figure 36:
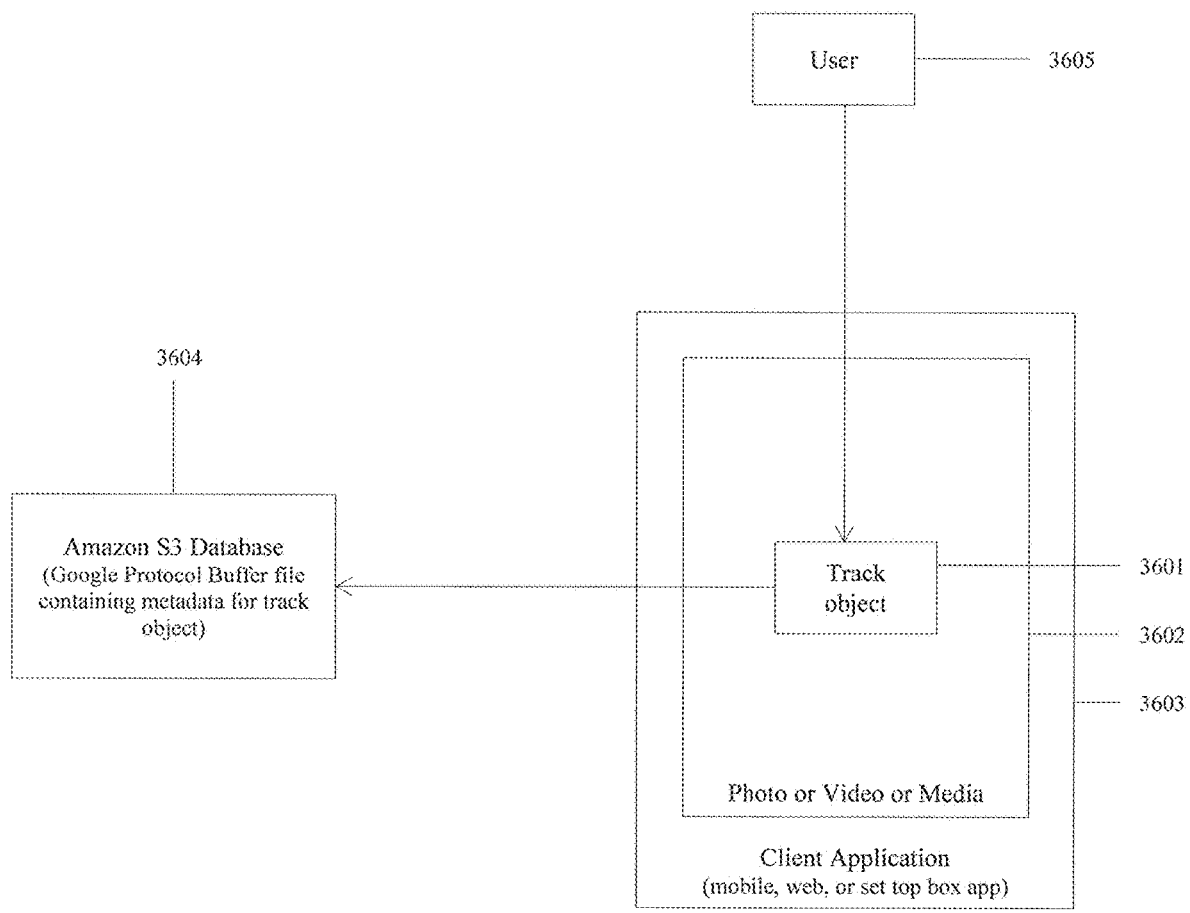
FIG. 36 is a schematic view of the "Track" feature.

FIG. 36 is a schematic view of the "Track" feature and shows the following elements:
- 3601: Track object.
- 3602: A piece of media which may be a photo, video, or any other form of media.
- 3603: An application presenting the media. It can be a mobile, web or television set top box application.
- 3604. Amazon S3 cloud data storage (Google Protocol Buffer file containing metadata for track object).
- 3605. An end user interacts with the track object via touch or click or any form of interaction.

Figure 37:
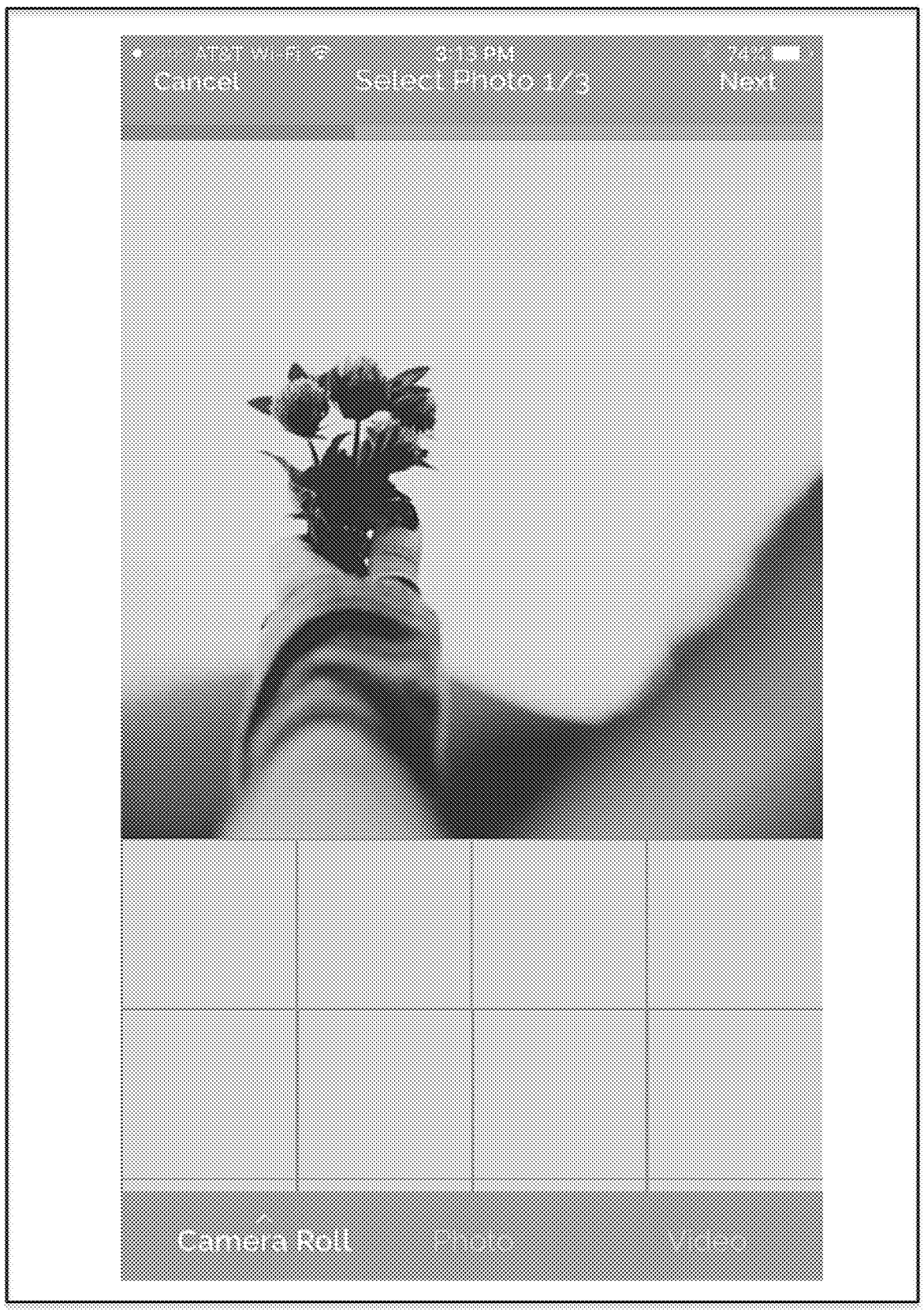

FIGS. 37-49 are display screens showing app version examples of track feature and subsequent viewer interaction with tracked (Veep'd) objects. FIGS. 37-44 show one example and FIGS. 45-49 show another example. Brief explanations of the figures are provided as follows:

FIG. 37: A photo is selected in the Camera Roll of an iPhone library.

Figure 38:
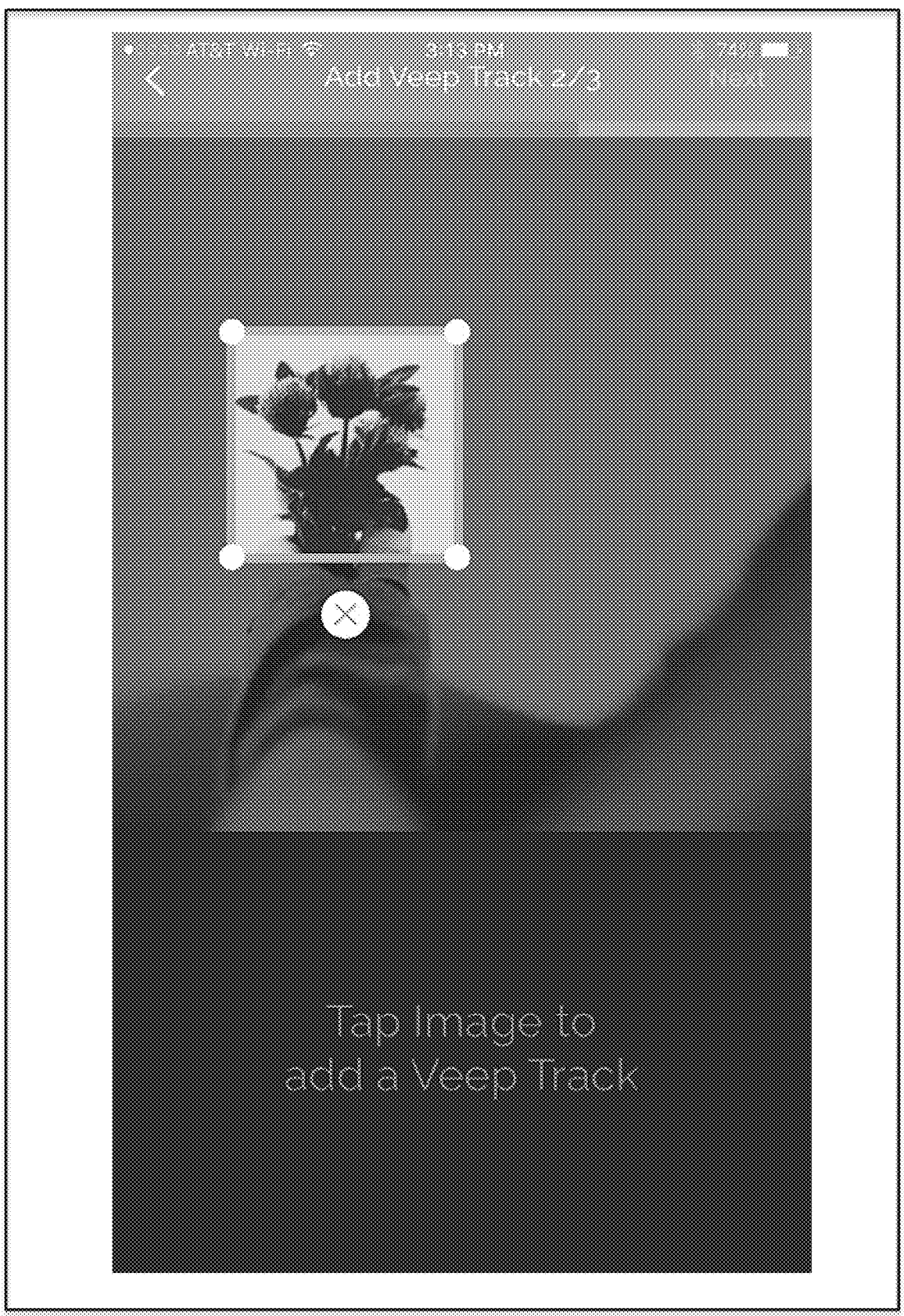

FIG. 38: Tap a region of the image to add a Veep Track.

FIGS. 39-41: Initiate a search engine to search for a website to link to the object in the previously tapped region. For example, the word "flowers" may be entered into the search engine.

FIG. 42: An excerpt of search results is shown. In this example, the website for Teleflora was selected for the link, thereby resulting in the Veep Track being successfully published.

VEEPIO preferably has a pre-established affiliate relationship with most major e-commerce sites. Accordingly, upon selection of the link, the appropriate link is stored in the VEEPIO database so that subsequent purchasers of the VEEP'd object navigate to the e-commerce site via the affiliate link in a similar manner as described above wherein AMAZON is the default e-commerce site. If the content creator selects a link that is not an e-commerce site, such as the NASA or Smithsonian site shown in the search results of FIG. 42, the content creator would not receive any proceeds of an e-commerce purchase if the viewer decides to purchase the object. However, most content creators will be motivated to select an e-commerce site over a purely informational site because the main goal of the VEEPIO platform is to allow for monetization of the content creator's media.

If a particular e-commerce site that the content creator wishes to select does not have a pre-established affiliate relationship with VEEPIO, the VEEPIO platform may respond in any of the following ways:
i. Allow the content creator to link to the selected site, without any further messaging from the VEEPIO platform.
ii. Inform the content creator that no monetization is available if the selected site is linked and allow the content creator to continue with that choice or select another link. The VEEPIO platform may display the search results with an overlay that indicates which search result hits provide for monetization.
iii. Prohibit the content creator from selecting a site that does not allow for monetization. In one approach to this option, the search results are filtered prior to being displayed to the viewer so as to only include e-commerce sites that have a pre-established affiliate relationship with VEEPIO.

Figure 43:
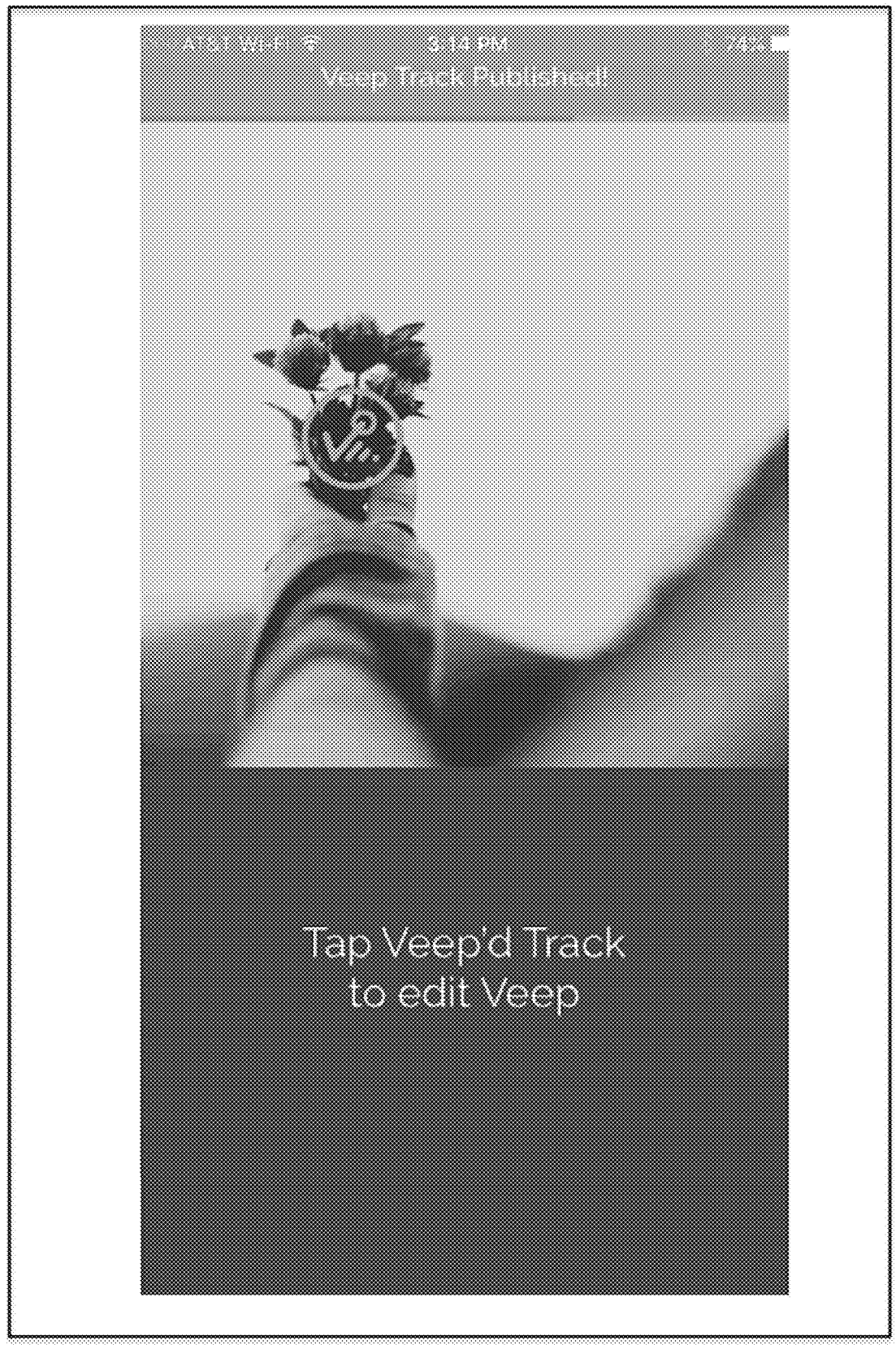
Figure 44:
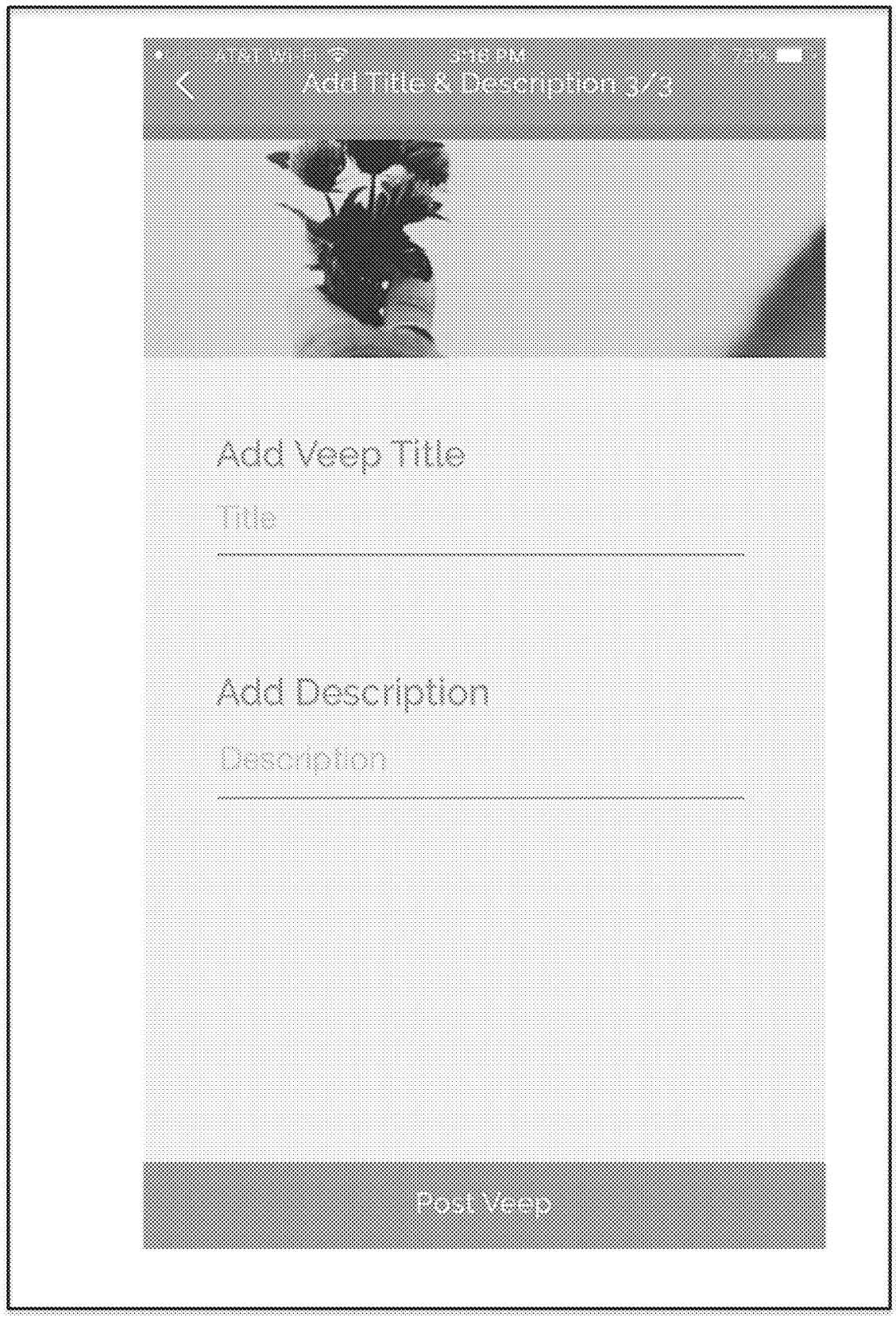

FIGS. 43-44: The content creator may now tap the Veep'd object to add a Title and Description. After entry of these items, the button "Post Veep" is selected.

FIGS. 45-49 show an example of a previously Veep'd video clip of a football game.

Figure 45:
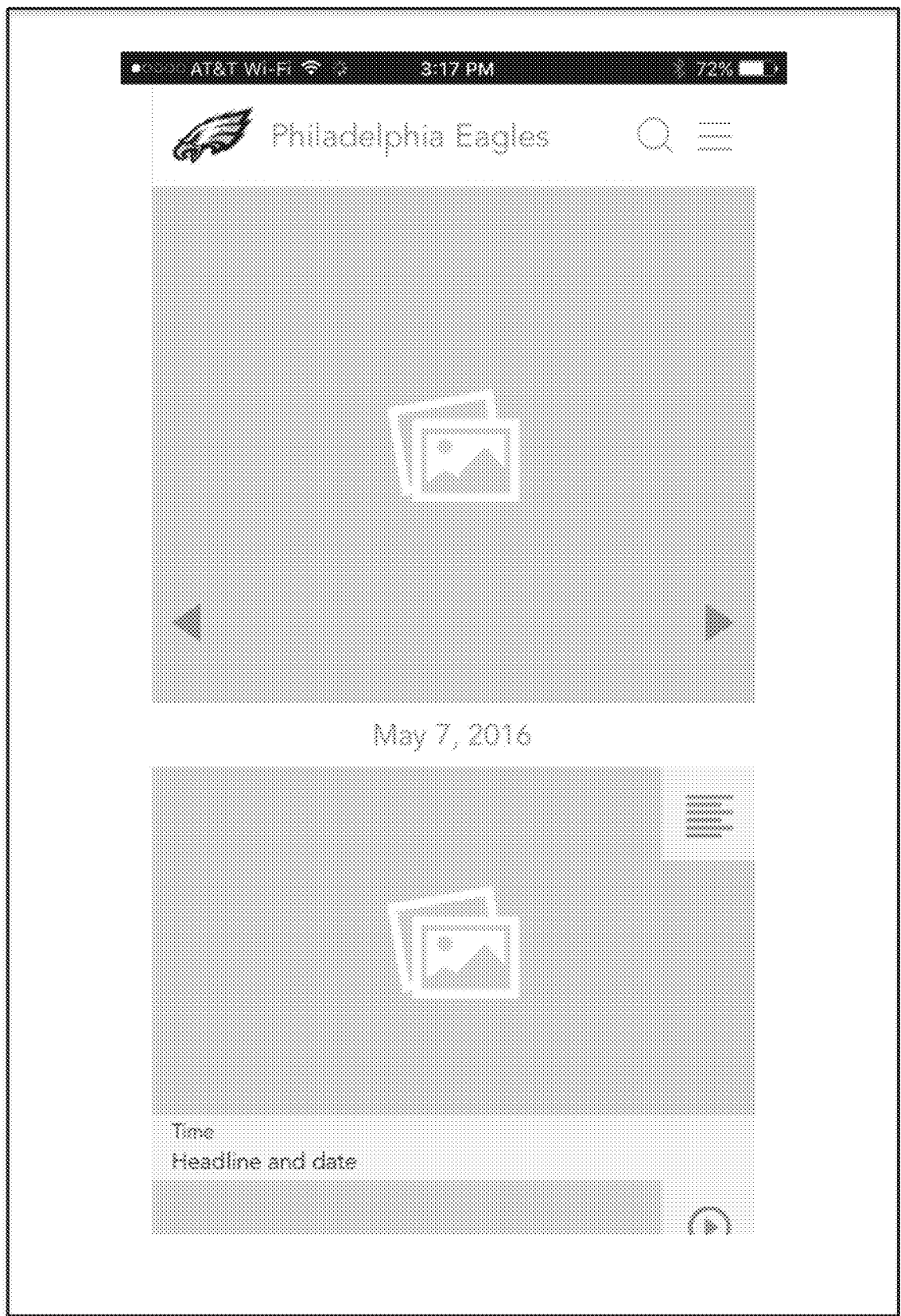

FIG. 45: Viewer plays the video clip.

Figure 46:
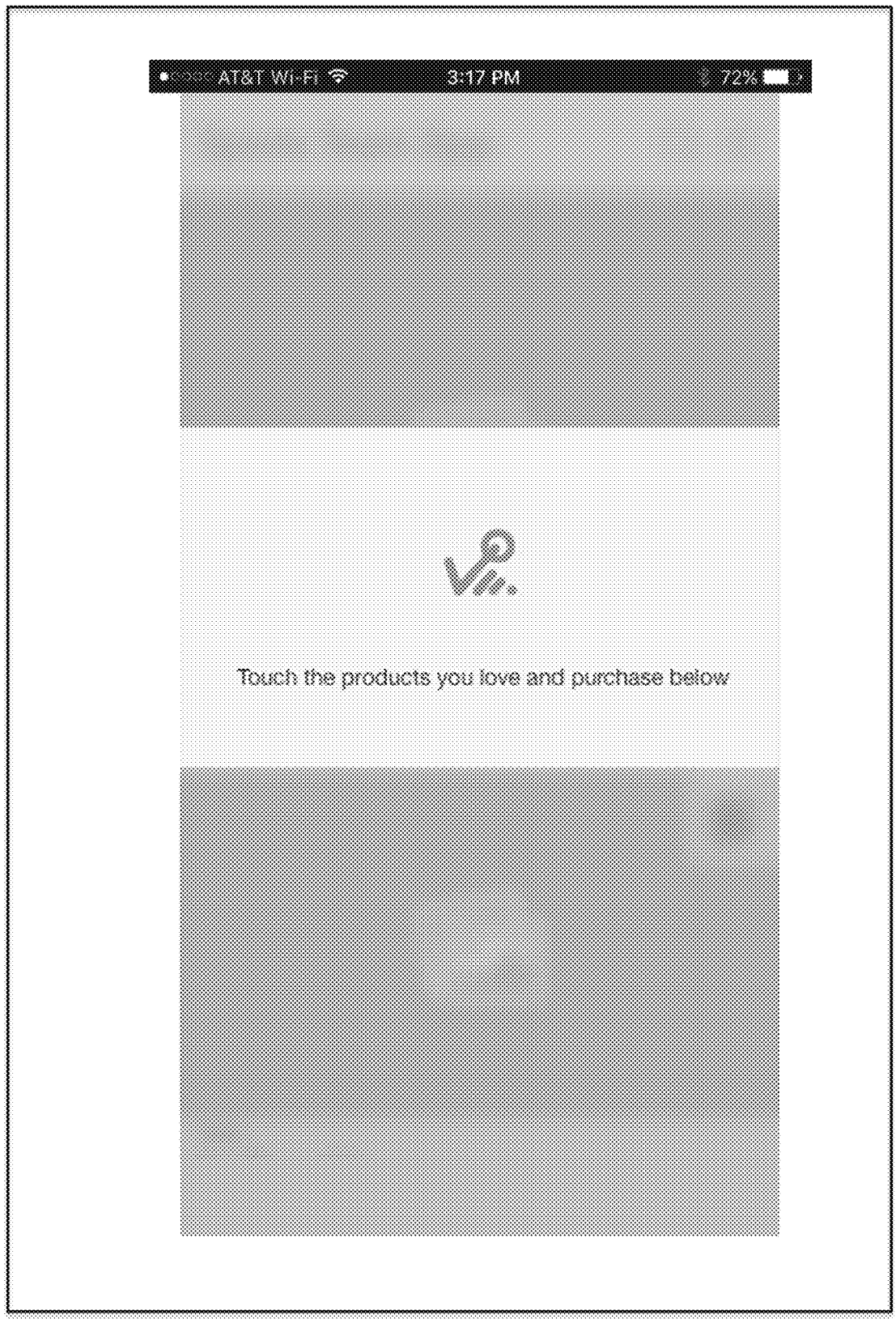

FIG. 46: Viewer is instructed to "Touch the products you love and purchase below. The upper portion of the display screen shows the video clip and the lower portion of the display screen is used for product information and potential purchase.

Figure 47:
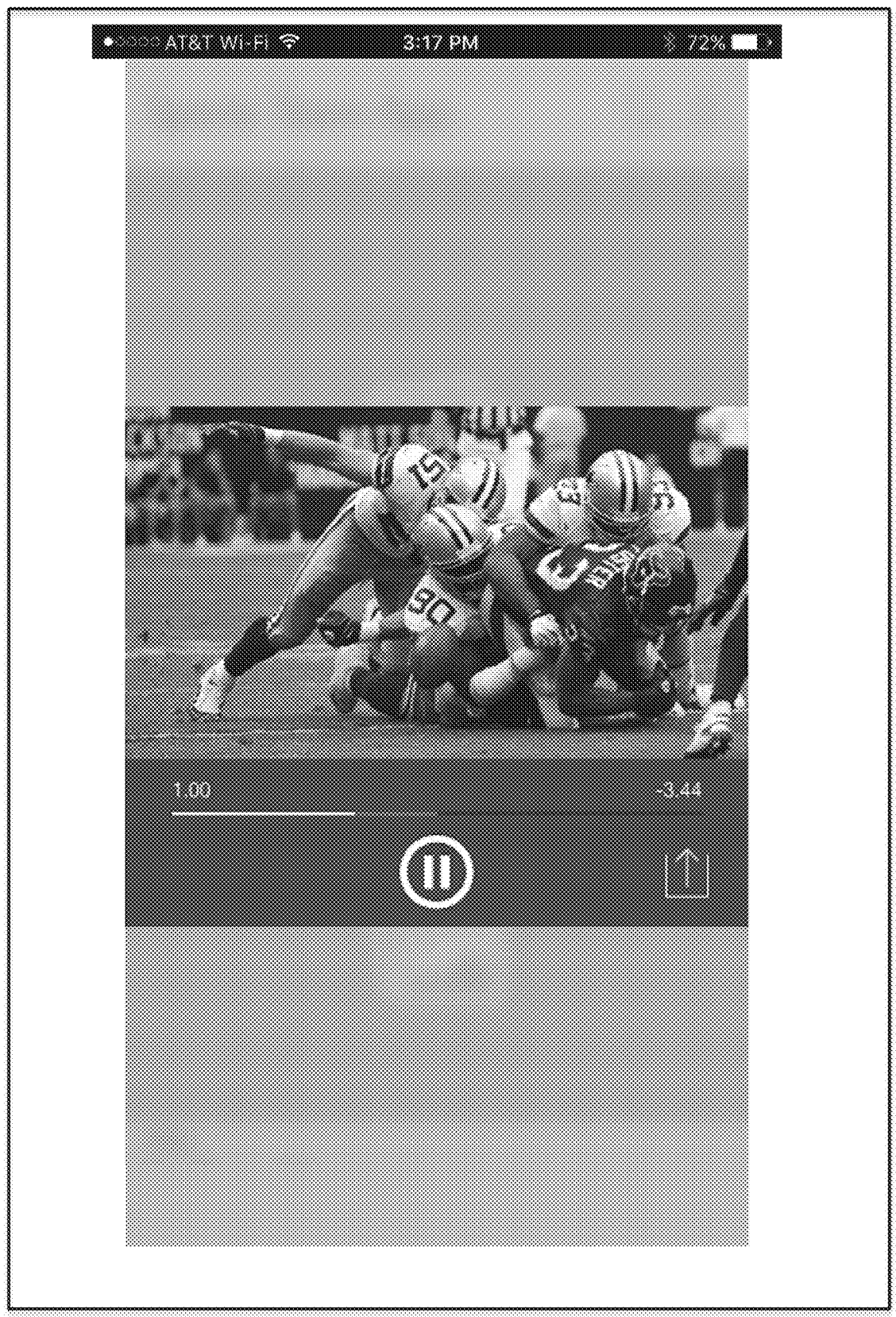

FIG. 47: Video clip plays.

Figure 48:
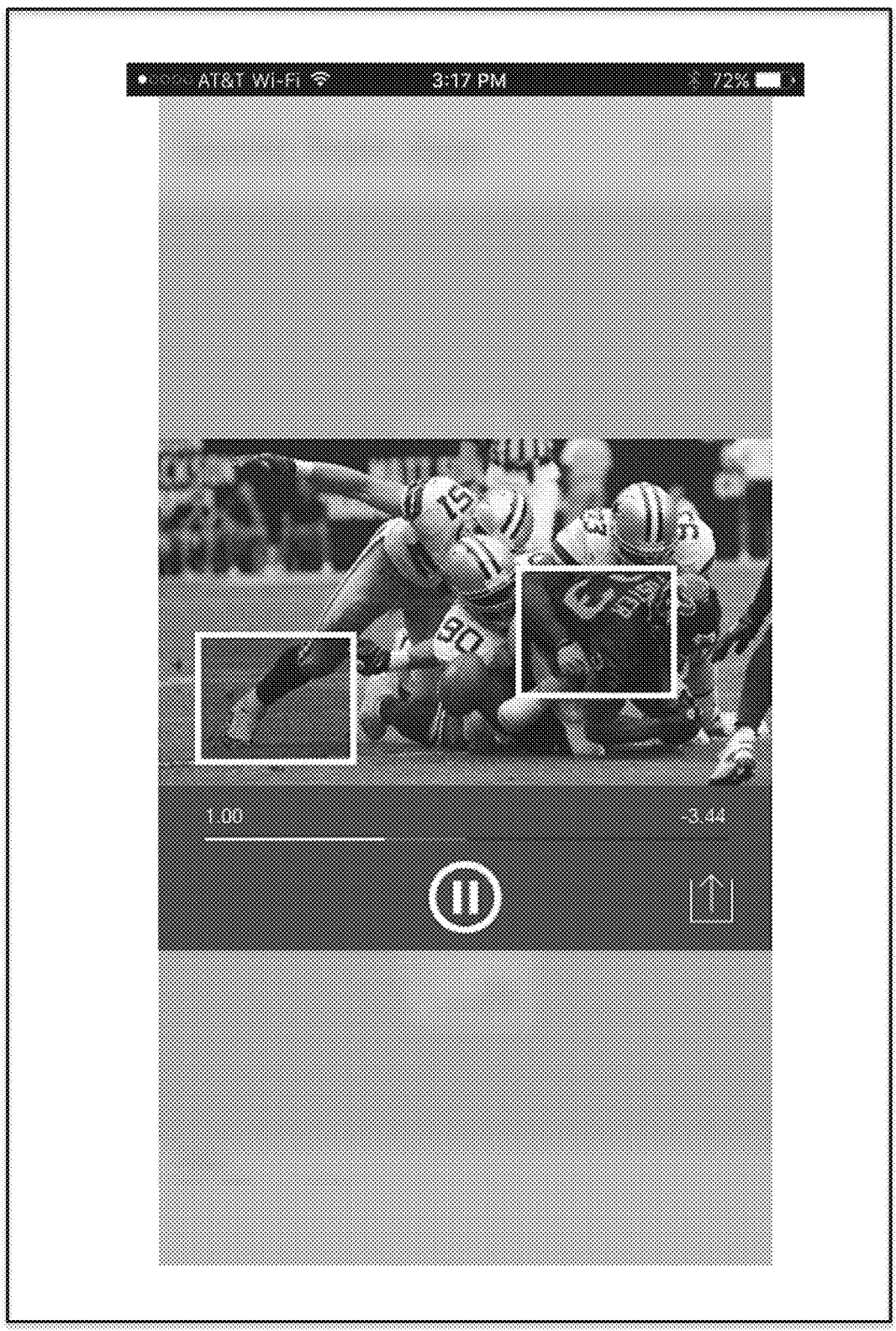

FIG. 48: Viewer touches two parts of the display screen (football boots of one player, and jersey of another player.

Figure 49:
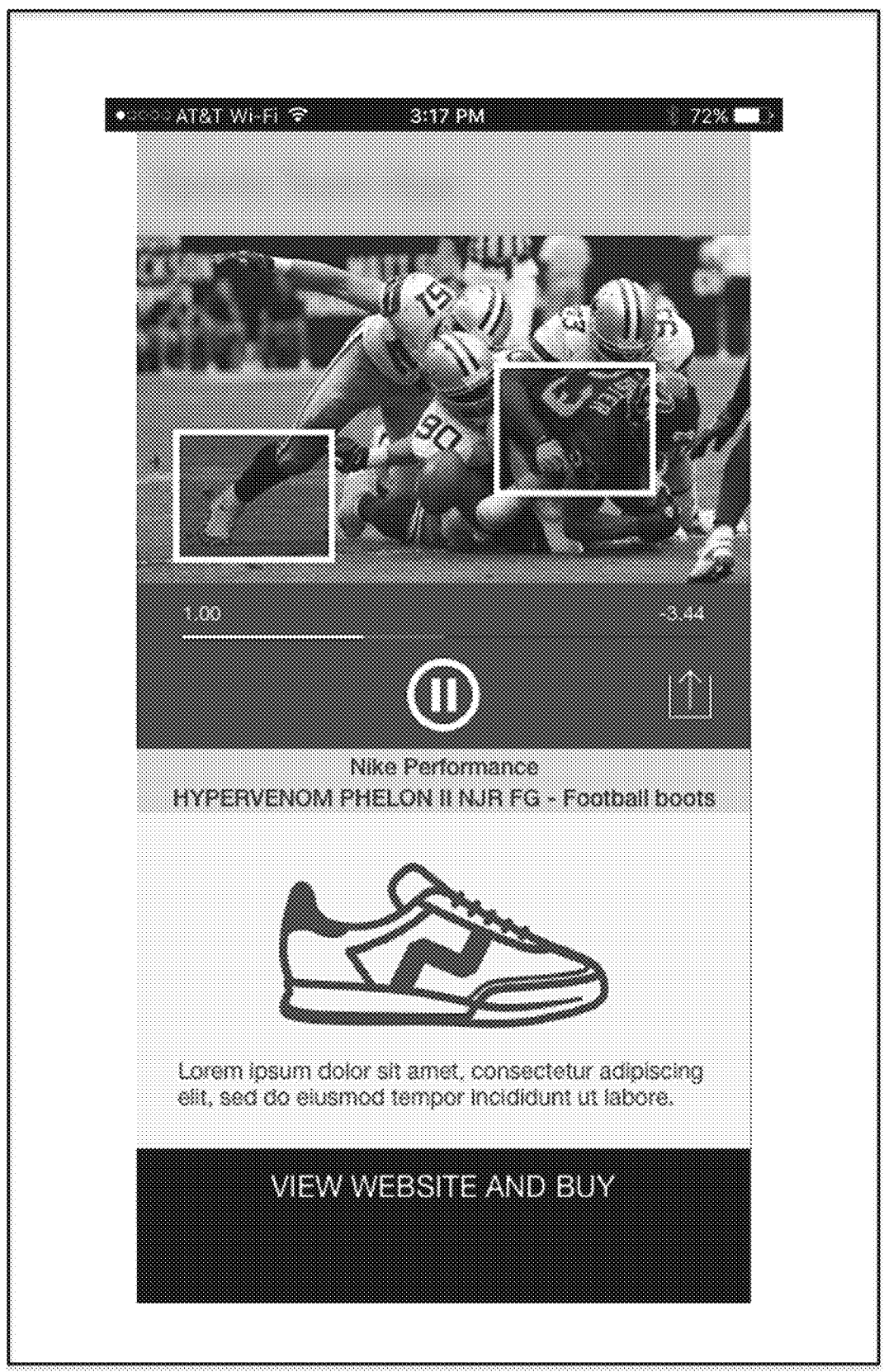

FIG. 49: The lower portion of the display screen shows the exact product associated with the player's football boots, here, the Nike Performance Hypervenom Phinish II NJR FG shoe. If desired, the viewer may navigate directly to the website and buy the shoe. The information that is shown in FIG. 49 is the same information that is entered when using the display screen of FIG. 44.

Figure 50:
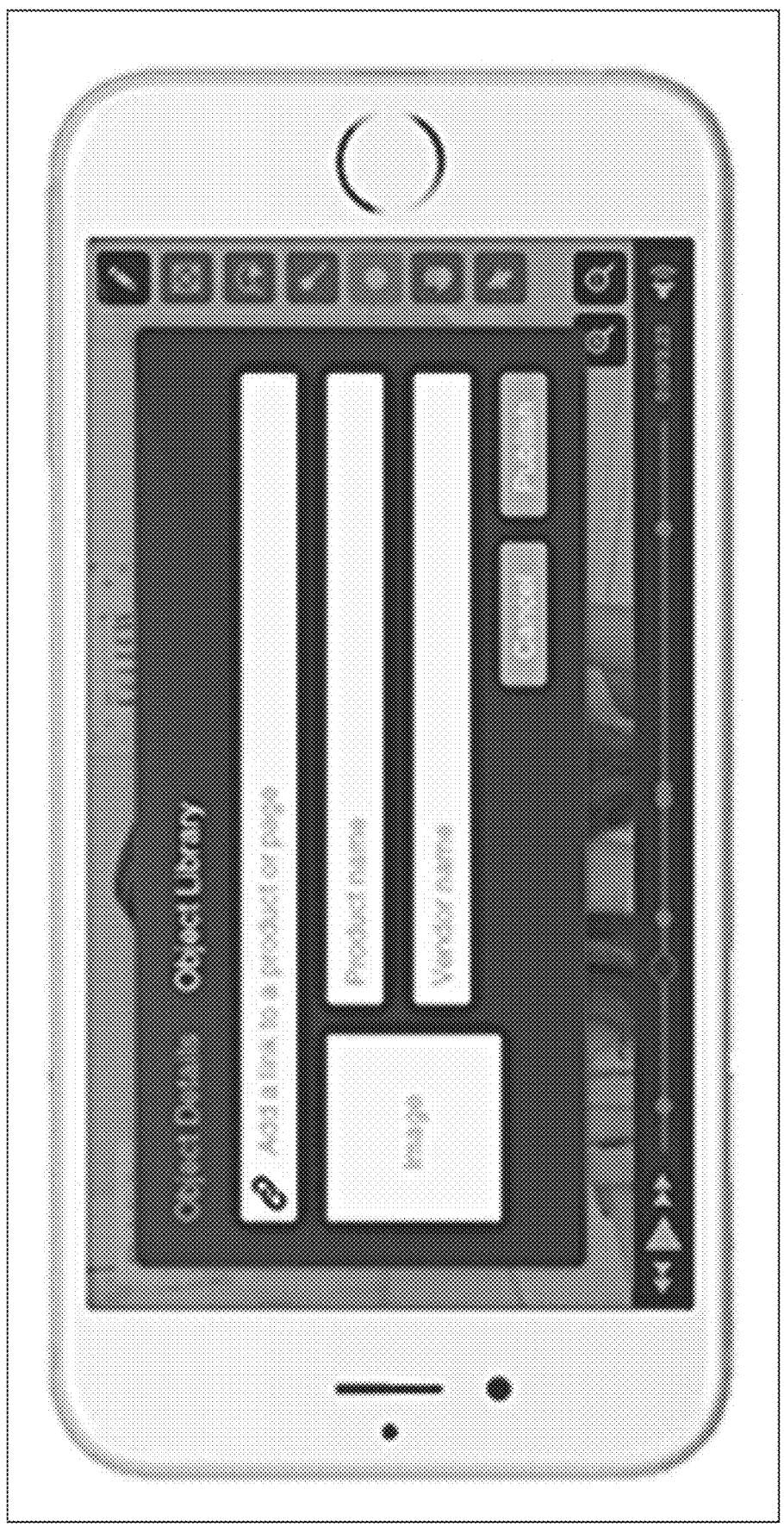
Figure 51A:
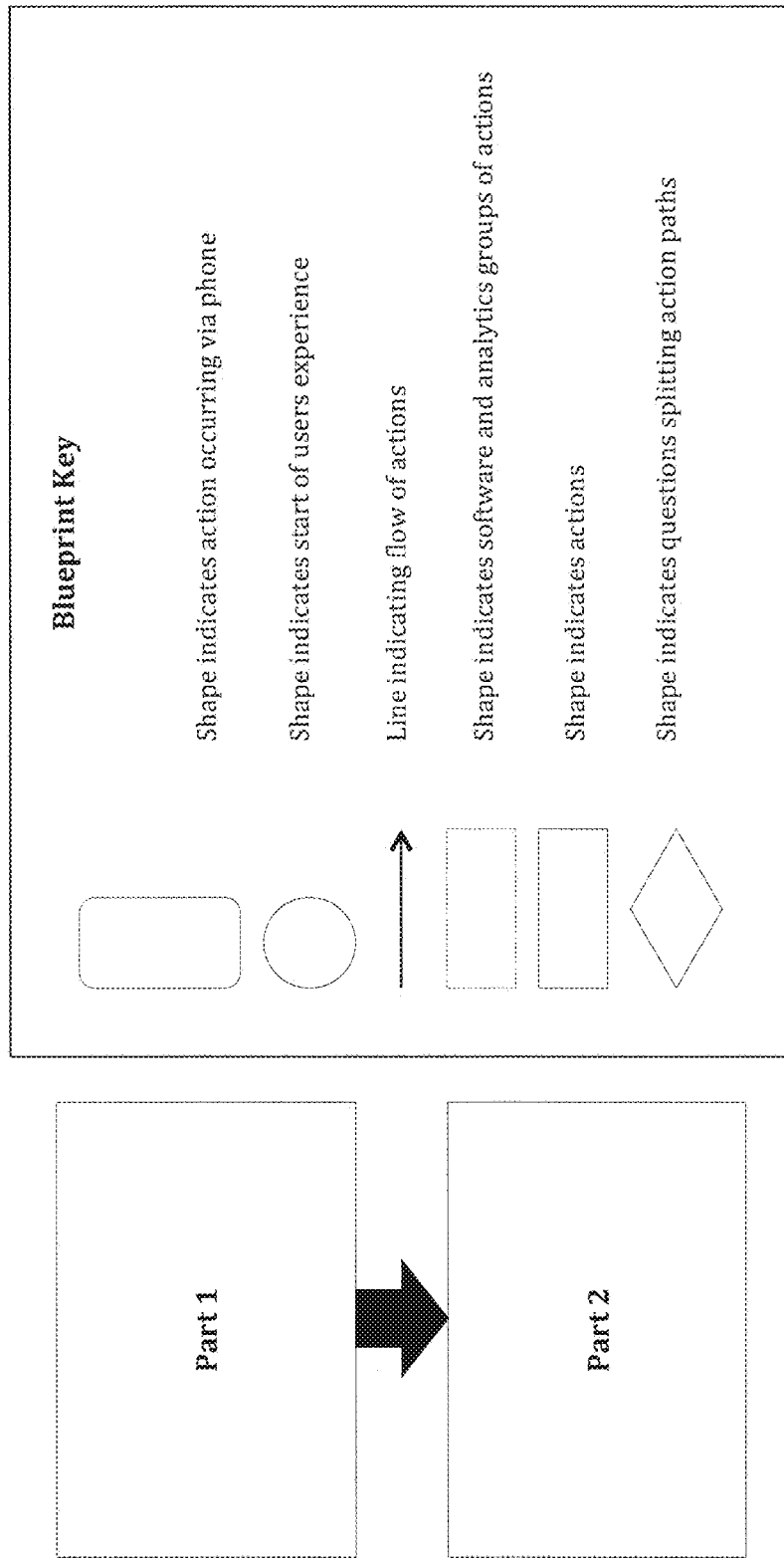
FIGS. 51A-51C, taken together, show a technical flowchart and framework of the VEEPIO process.
Figure 51B:
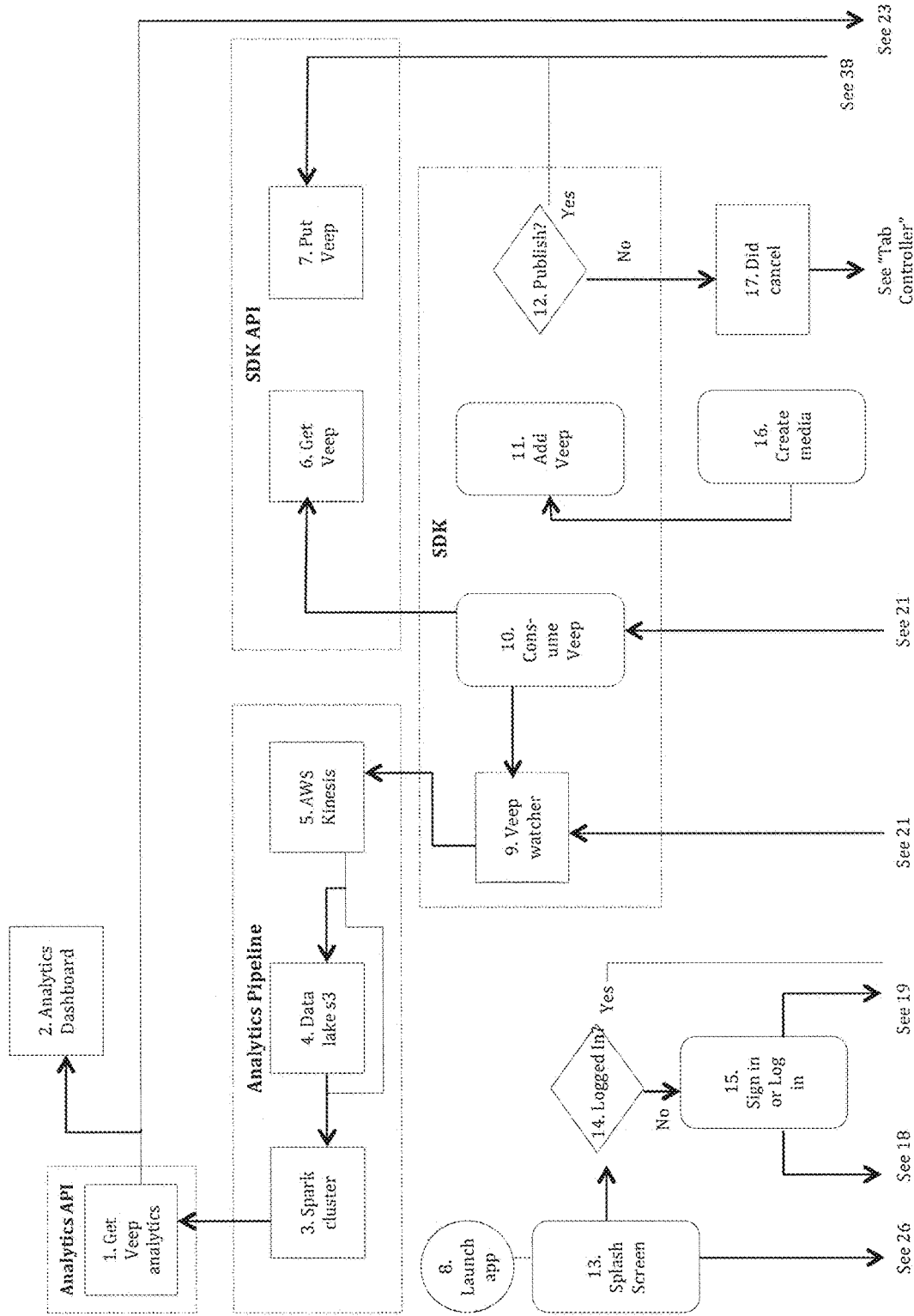
Figure 51C:
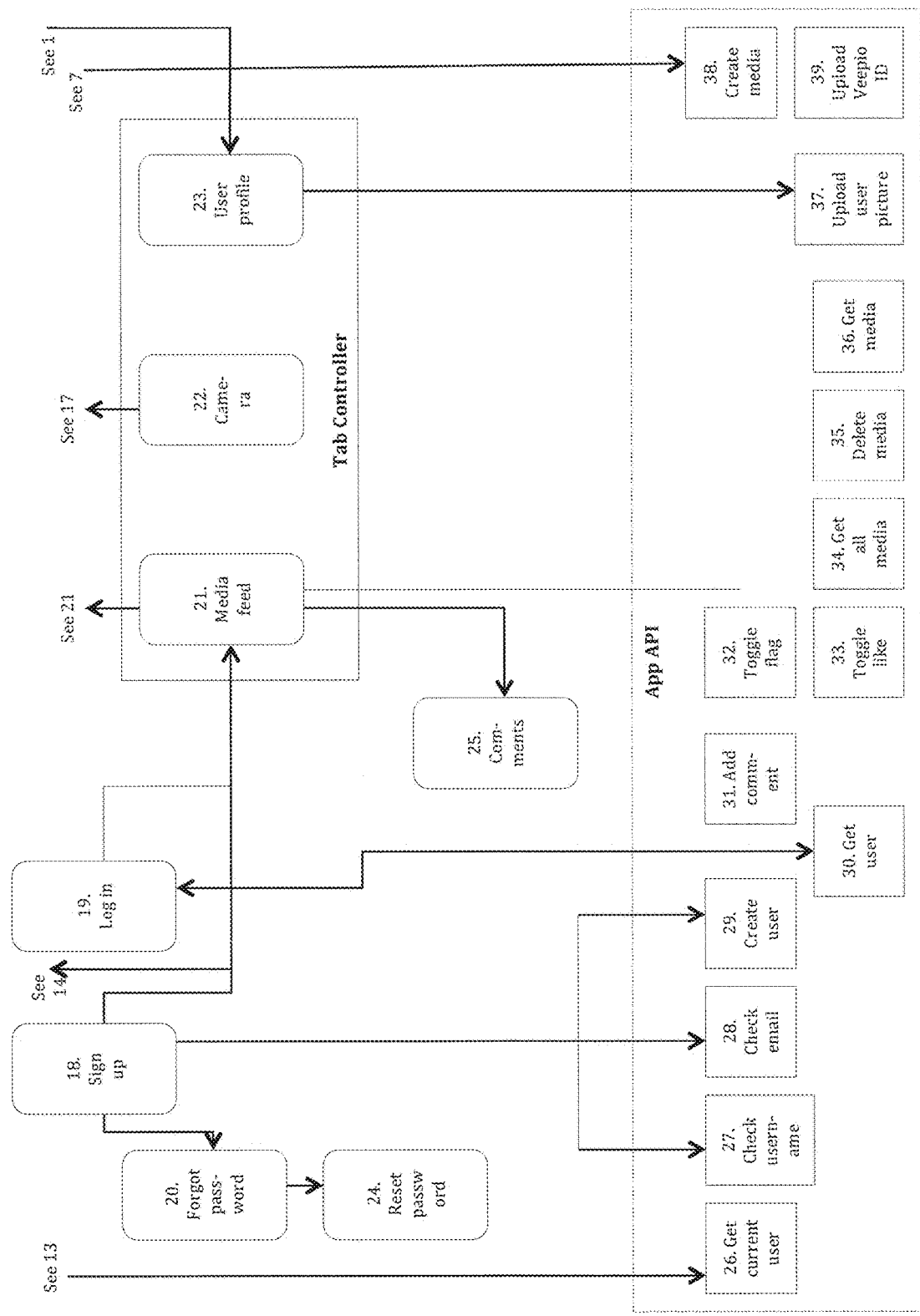

FIG. 50 shows another user interface display screen that may be used for entering object details for the object library when a content creator describes a Veep'd object. This is similar to the user interface display screen in FIG. 22 for entering object details. The fields in FIG. 50 include:
  i. Add a link to a product or page
  ii. Product name
  iii. Vendor name
  iv. Image FIGS. 51A-51C, taken together, show a technical flowchart and framework of the VEEPIO process. FIG. 51A shows how FIGS. 51B-51C are connected and also provides a key to the symbols used in FIGS. 51B-51C. There are 39 parts of the overall process. The parts interconnect across the multiple figures via the labels that read "See #" wherein # is the part. The parts are described within the figures, but are repeated below for convenience, with additional explanatory text for some of the parts.
  1. Get Veep analytics
  2. Analytics Dashboard
  3. Spark cluster (This refers to Apache Spark™ which is an open source cluster computing framework)
  4. Data lake s3 (A "data lake" is a storage repository that holds a vast amount of raw data in its native format until it is needed. "s3" refers to Amazon S3, as discussed above.)
  5. AWS Kinesis (This refers to Amazon Kinesis which is a platform for streaming data on AWS.)
  6. Get Veep
  7. Put Veep
  8. Launch App
  9. Veep watcher
  10. Consume Veep
  11. Add Veep
  12. Publish?
  13. Splash Screen
  14. Logged In?
  15. Sign in or Log in
  16. Create media
  17. Did cancel
  18. Sign up
  19. Log in
  20. Forgot password
  21. Media Feed
  22. Camera
  23. User Profile
  24. Reset password
  25. Comments
  26. Get current user
  27. Check username
  28. Check email
  29. Create user
  30. Get user
  31. Add comment
  32. Toggle flag
  33. Toggle like
  34. Get all media
  35. Delete media
  36. Get media
  37. Upload user picture
  38. Create media
  39. Upload Veepio ID The technical framework includes the following components:
  i. Analytics API: part 1
  ii. Analytics Pipeline: parts 3-5
  iii. SDK API: parts 6, 7
  iv. SDK: parts 9-12
  v. Tab Controller: parts 21-23
  vi. App API: parts 26-39

Part 1 of the Appendix shows sample source code for the data model of the tracked objects.

Part 2 of the Appendix shows sample source code for the overall "Track" feature.

Part 3 of the Appendix shows sample source code for the object metadata.

2. Monetization

Figure 52:
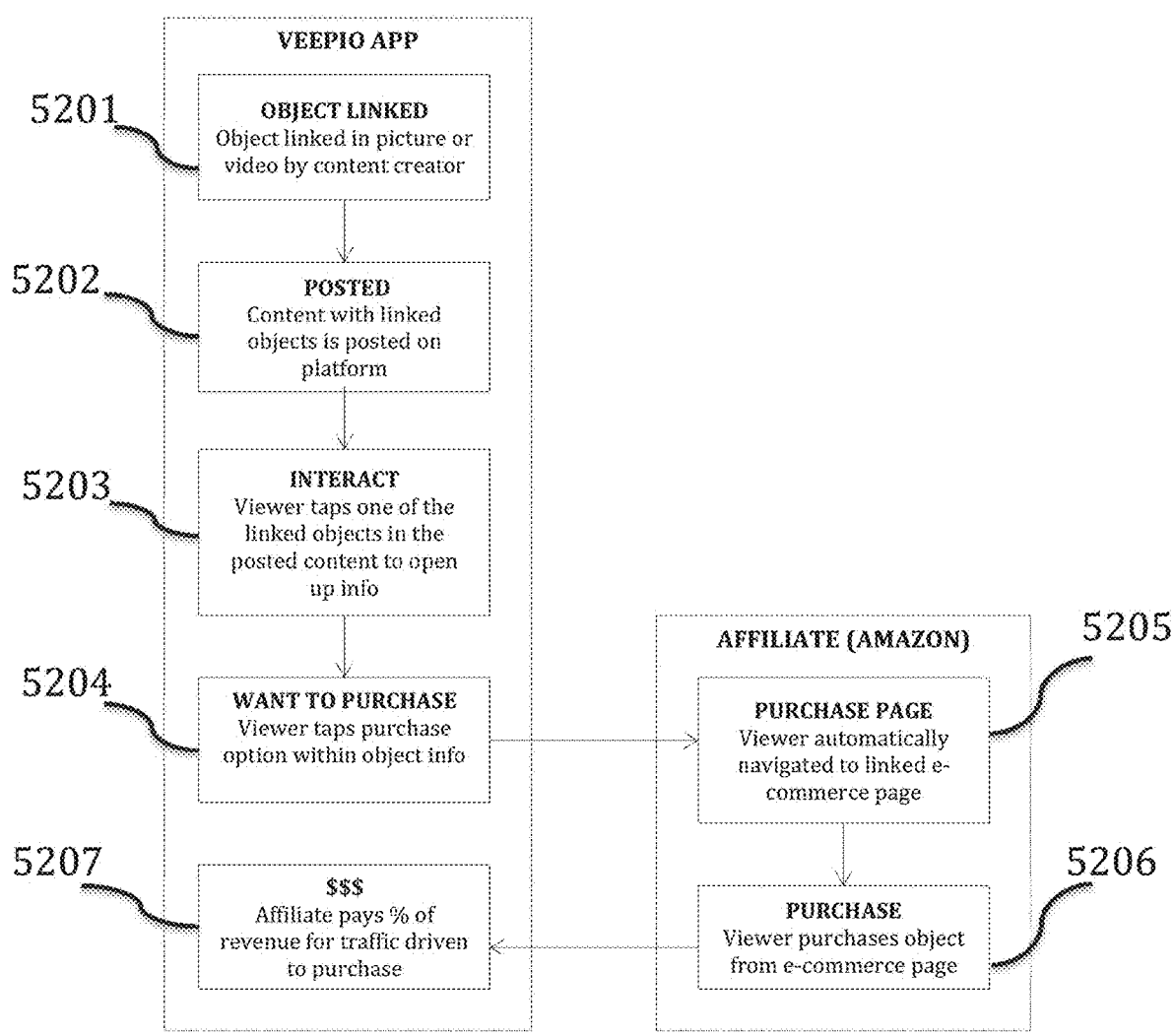
FIG. 52 shows a flowchart of a monetization process using the VEEPIO platform.
Figure 53B:
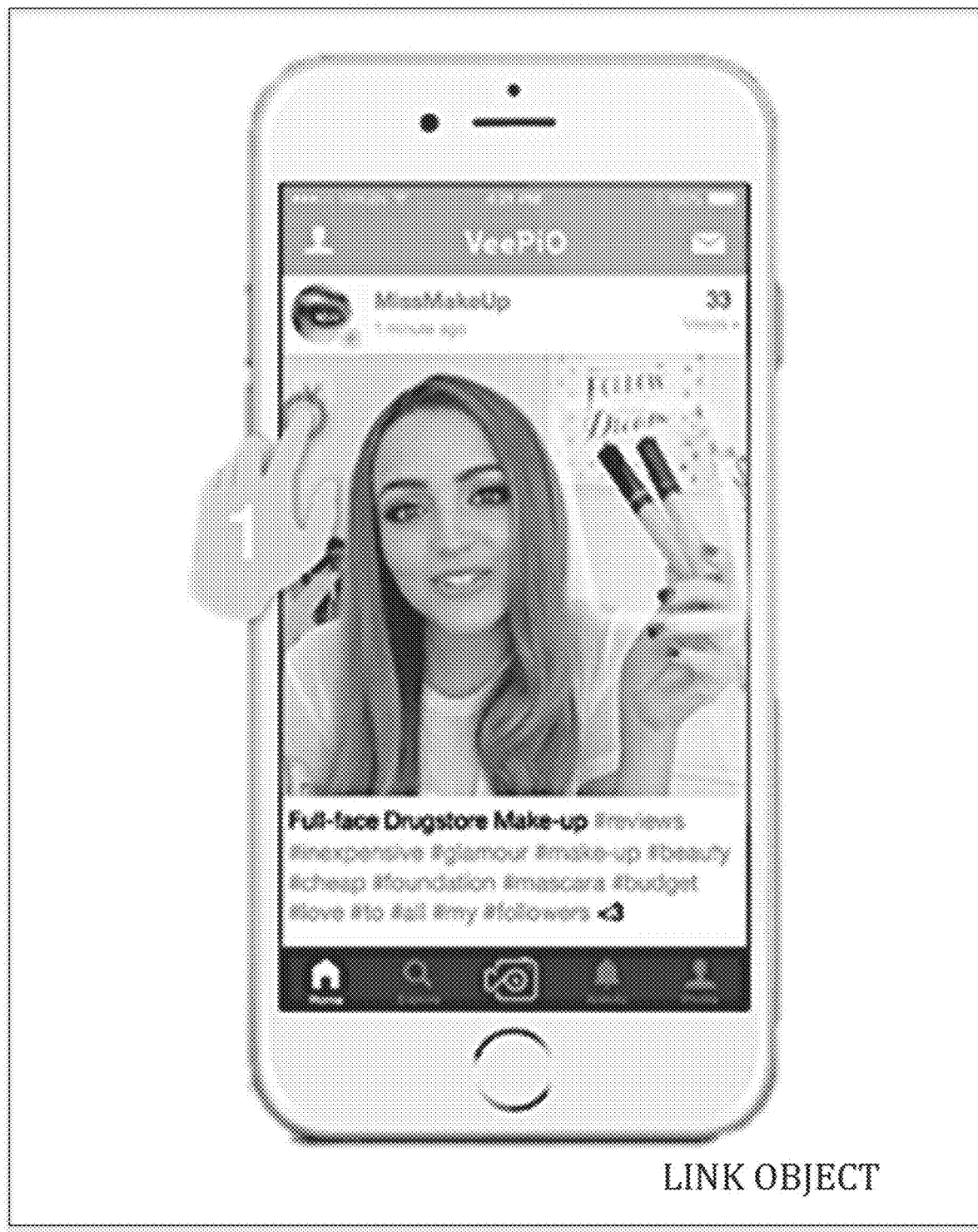
Figure 53C:
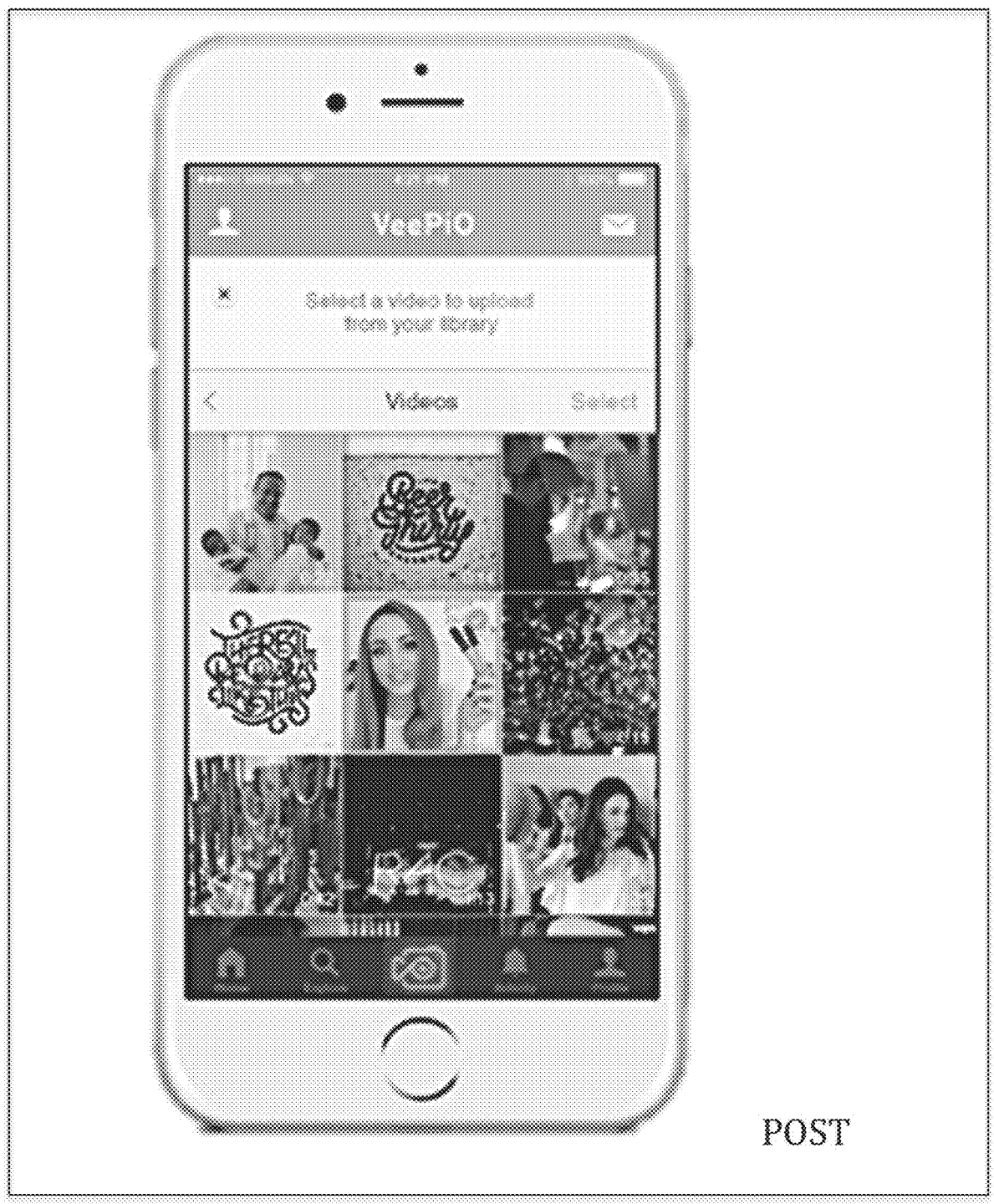
Figure 53D:
Figure 53E:
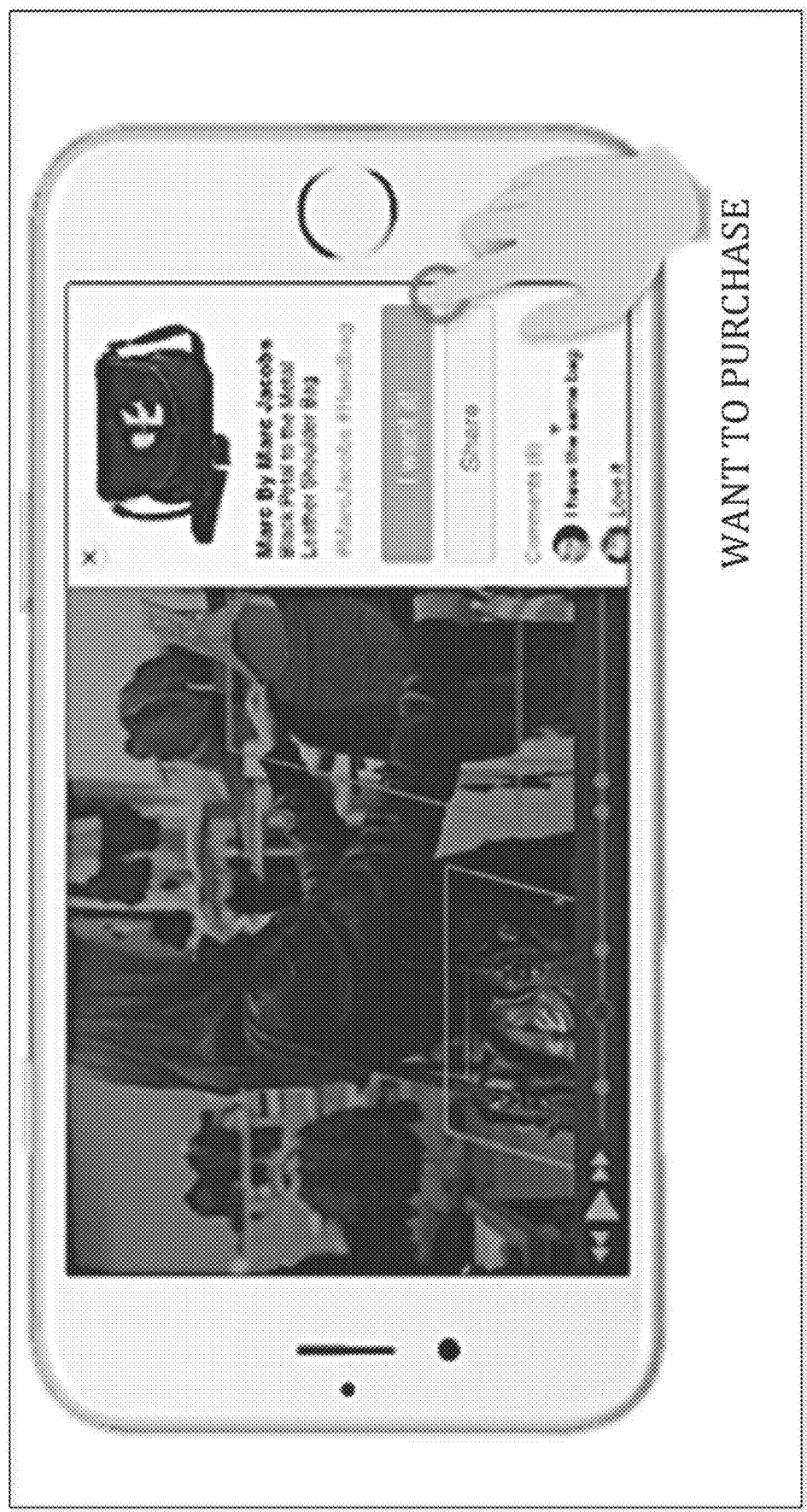
Figure 53F:
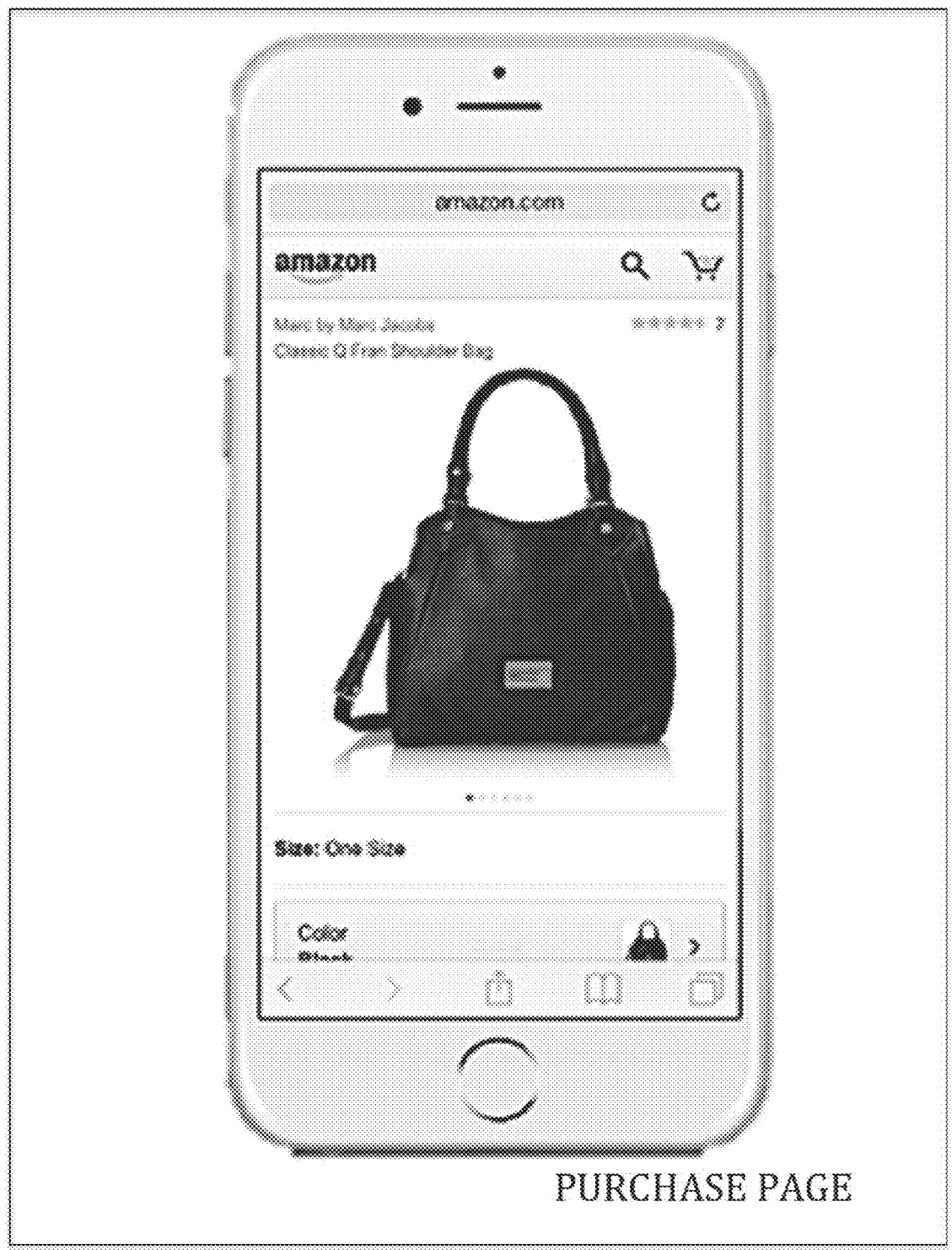

FIG. 52 shows a flowchart of a monetization process using the VEEPIO platform. In this example, VEEPIO has a pre-established affiliate relationship with Amazon. The steps of the flowchart are further explained with respect to user interface display screens shown in FIGS. 53A-53H. FIG. 53A shows the flow order of FIGS. 53B-53H.

Figure 53G:
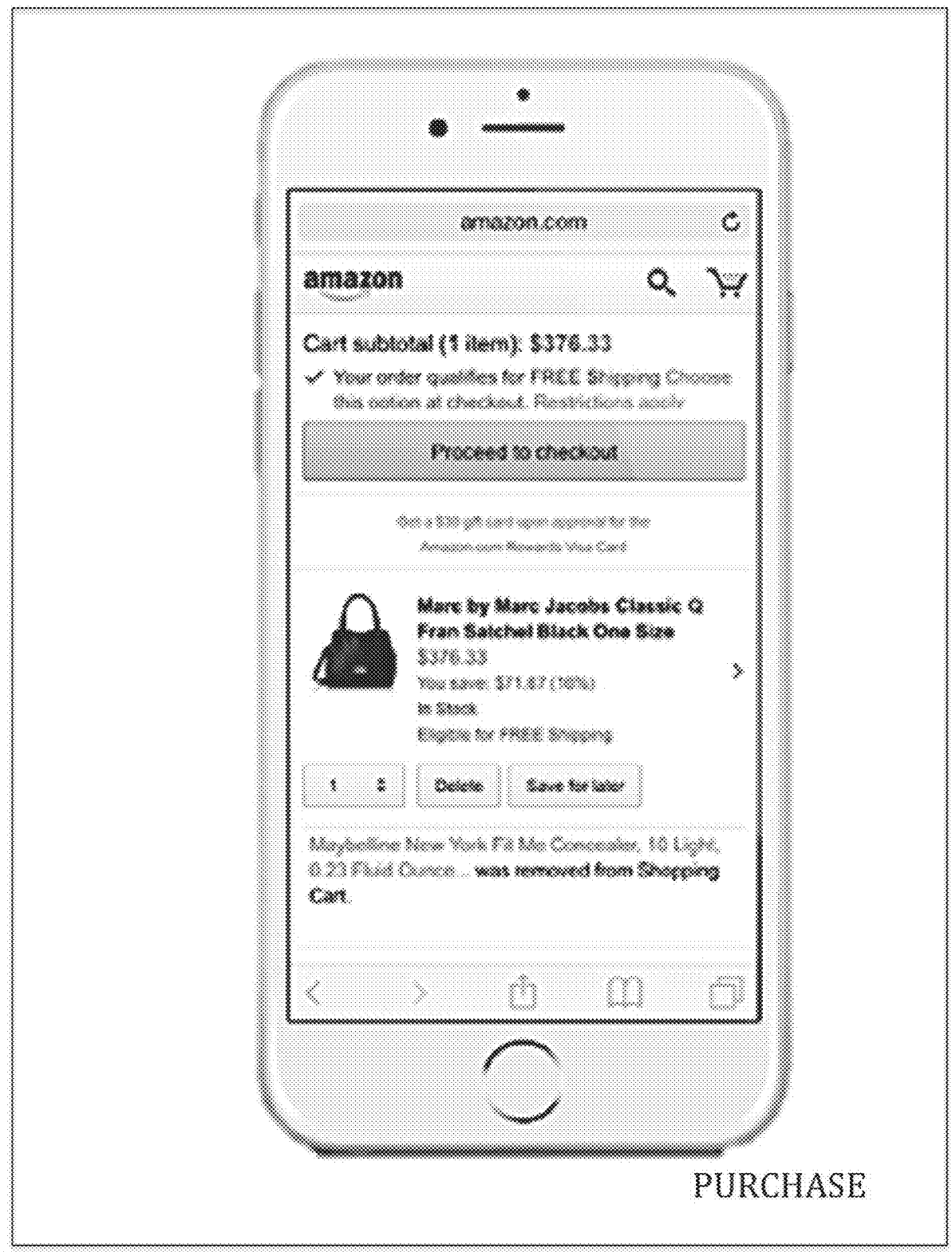
Figure 53H:

5201: OBJECT LINKED: Object linked in picture or video by content creator. (FIG. 53A)
  5202: POSTED: Content with linked objects is posted on platform. (FIG. 53B)
  5203: INTERACT: Viewer taps one of the linked objects in the posted content to open up info. (FIG. 53C)
  5204: WANT TO PURCHASE: Viewer taps purchase option within object info. (FIG. 53D)
  5205: PURCHASE PAGE: Viewer automatically navigated to linked e-commerce page. (FIG. 53E)
  5206: PURCHASE: Viewer purchases object from e-commerce page. (FIG. 53F)
  5027: $$$: Affiliate pays % of revenue for traffic driven to purchase. (FIG. 53G)

3. Exchange/Real-Time Auction

Figure 54:
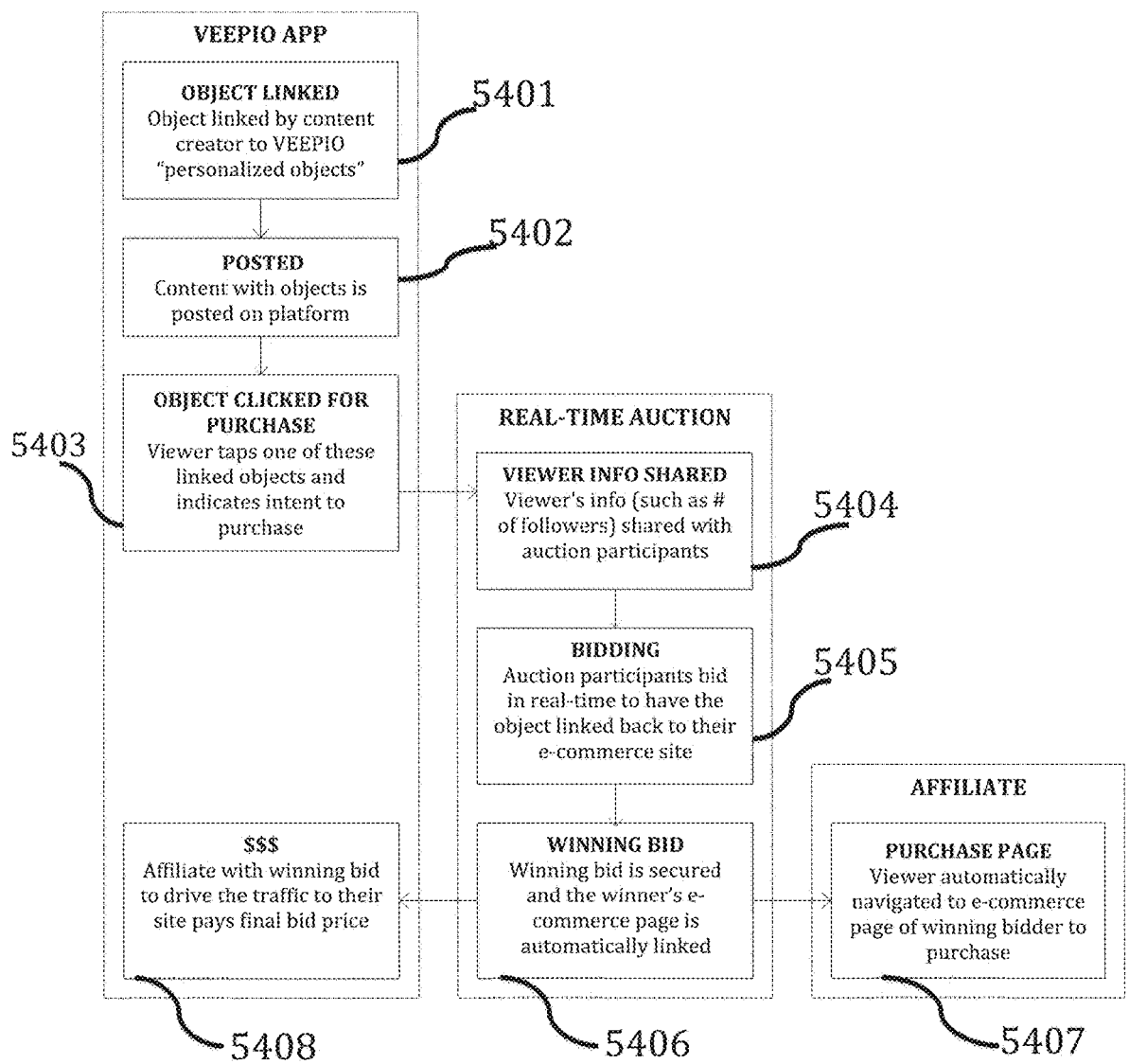
FIG. 54 shows a flowchart of the Exchange/Real-Time Auction process using the VEEPIO platform.

FIG. 54 shows a flowchart of the Exchange/Real-Time Auction process using the VEEPIO platform and includes the following steps:

5401: OBJECT LINKED: Object linked by content creator to VEEPIO "personalized objects."
  5402: POSTED: Content with objects is posted on VEEPIO platform.
  5403: OBJECT CLICKED FOR PURCHASE: Viewer taps one of these linked objects and indicates an intent to purchase.
  5404: VIEWER INFO SHARED: Viewer's information (such as number of followers) is shared with auction participants.

5405: BIDDING: Auction participants bid in real-time to have the object linked back to their e-commerce site.

5406: WINNING BID: Winning bid is secured and the winner's e-commerce page is automatically linked.

5407: PURCHASE PAGE: Viewer is automatically navigated to the e-commerce page of winning bidder to make the purchase.

5408: $$$$: Affiliate with winning bid to drive the traffic to their site pays final bid price.

Steps 5404-5406 are associated with the real-time auction and are not seen by Veep viewers. That is, these steps are transparent to the Veep viewers.

Figure 55A:
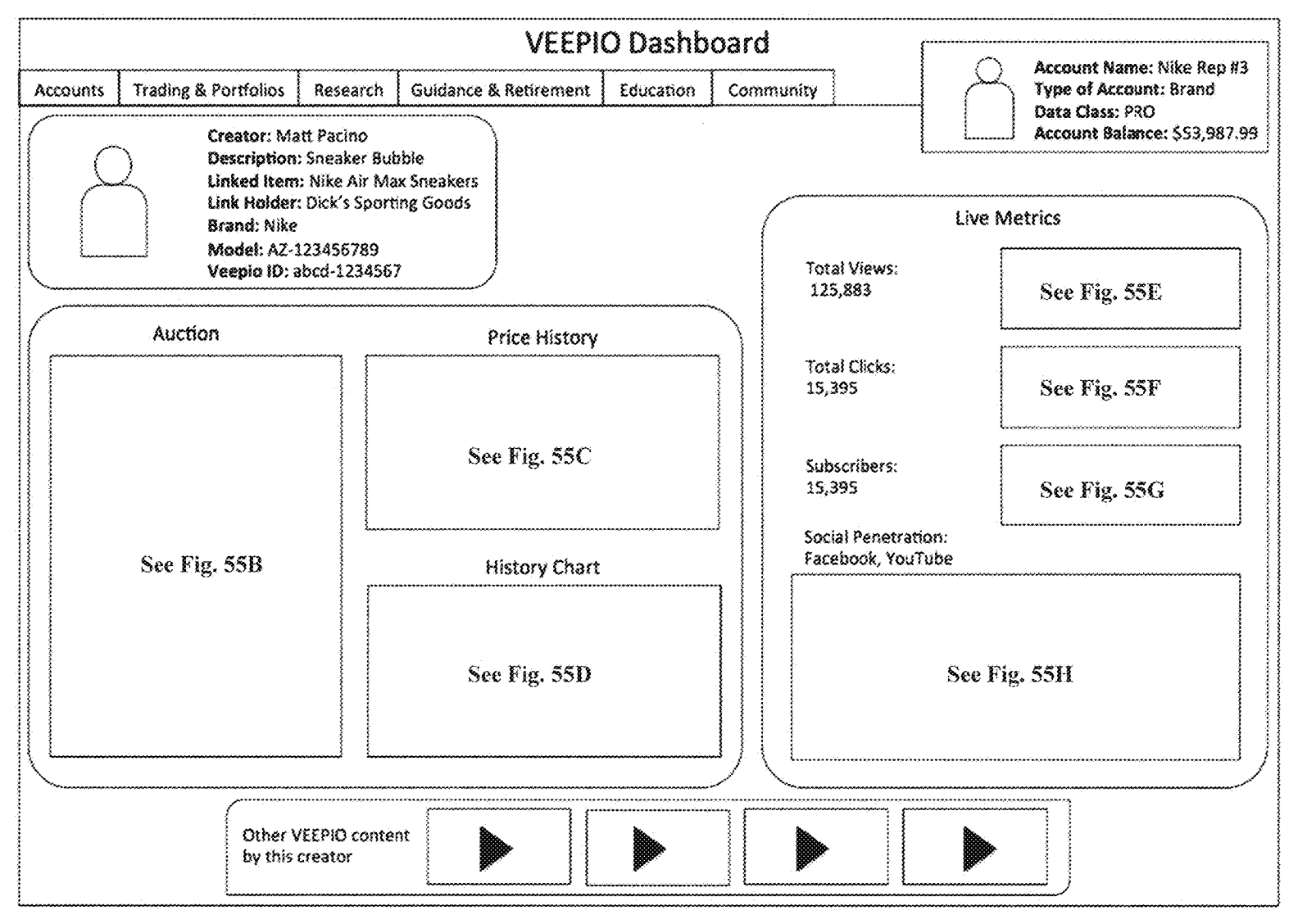
Figure 55B:
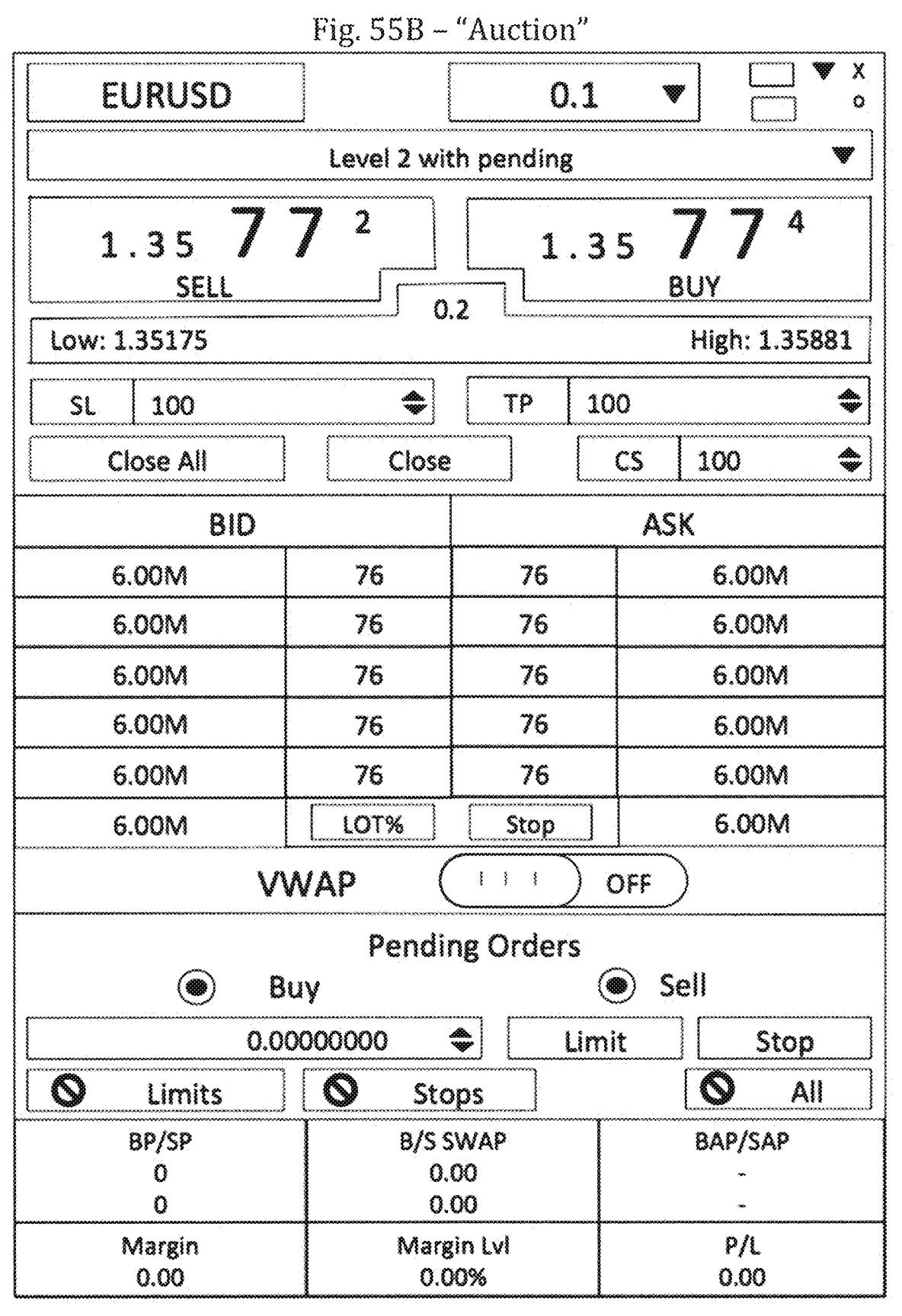

FIG. 55A-55H, taken together, show a dashboard display screen for use by auction participants in the Exchange/Real-Time Auction process. Enlarged views of selected constituents of the dashboard are shown in FIGS. 55B-55H. The social media metrics of the content creators are maintained on the VEEPIO platform. The VEEPIO Dashboard of FIG. 55A is made available to auction participants in evaluating linked objects for purposes of entering bids. In the sample dashboard of FIG. 55A, the auction participant is a Nike sales representative who is viewing data regarding a linked item (object) that is of particular interest to Nike, namely, Nike Air Max Sneakers.

In the example of FIGS. 55A-55H, the Nike sales representative may enter information analogous to a securities-type "limit order." For example, the limit order will indicate the lowest price that Nike is willing to fulfill an order for the linked item. This limit price of the limit order is then used for the real-time auction when a viewer indicates an interest in buying a linked item.

As further explanation of the Veepio Marketplace, the Veepio Marketplace is an electronic exchange that maintains a fair and competitive market for ownership of links to purchase interactive objects within Veep'd content.

When a viewer of Veep'd content clicks or touches an interactive object, a "shop" button appears, in addition to the information embedded by the creator. The Marketplace allows retailers and brands to bid against each other for the right to have their link behind the shop button. Brands also have the ability to purchase the rights to the content itself.

The Veepio Marketplace is a price, time priority exchange, which means that if one retailer or brand is bidding higher then another, the higher price has priority. If the bid price is the same, the retailer or brand that entered the bid first has priority.

The Exchange maintains a conventional "Book" for every single interactive object, as well as every unique video or picture. A book is simply an electronic way of record keeping in real time to maintain an orderly market. A book is composed of bids on the left and offers on the right. Bids show the demand for something. In this case, retailers and brands send messages to the Exchange that they want to buy the link or the actual content for a specific price.

Offers show the supply of something, which in this case, are messages from either the creators during the VPO or retailers and brands in every transaction thereafter with a price at which they would sell the right to the link or the content. The book is arranged by price—the highest bids are on top on the left and the lowest offers are on top on the right. In order for a transaction to take place on the Exchange, a buyer and a seller must agree to a price.

Since the Exchange is an electronic exchange, a matching engine monitors all of the books and "matching" buyers and sellers result in actual transactions. A transaction is when ownership of a link or content changes. This can happen when a creator/retailer/brand agrees to a buyer's bid, or when a buyer agrees to a seller's offer. More specifically, a buyer would need to send a message to the exchange with a price equal to or greater then the lowest offer, or a seller would need to send a message to the exchange with a price equal to or less then the highest bid. In addition to maintaining a live market, the Exchange also stores and displays market data. Every single bid, offer, cancelled bid, cancelled offer, and transaction is stored in the Exchange history database. This data is available for display in the Veepio App and the Veepio Ledger. Historical data is also available.

4. Additional Considerations

The content creator's digital media that is made interactive via the Veepio platform preferably is hosted by an existing (third-party) media source, such as Instagram or YOUTUBE. In this manner, the Veepio platform only needs to maintain data to allow for an overlay that highlights the interactive objects when the existing media source is displayed within the Veepio app. However, in an alternative embodiment where the digital media does not exist elsewhere, the digital media may be hosted on the Veepio platform. This alternative embodiment likely limits the potential views of the media source since it is not widely circulated on the web.

Veep'ing still images displayed within the Veep app is preferably a simple two-step process, namely (1) point to (e.g., touch) an object, and (2) invoke a search engine to locate a link for the object, as shown in FIGS. 38-42. If desired, a title and description may be added, as shown in FIGS. 43-44. Veep'ing video images requires one additional step, which is to track the object, either forward, backward or both, as discussed in detail above. In this manner, all of the frames that contain the object become interactive for a subsequent viewer.

In the example of FIG. 37, the digital media is obtained from the content creator's iPhone library, and not from an existing media source. However, FIG. 37 is simply provided for illustration, and the digital media of FIG. 37 may have been retrieved from an existing media source instead. The remaining steps shown in FIGS. 38-44 are identical regardless of the original source of the digital media.

The various methods or processes performed by the system components may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

The databases discussed above may be centralized or distributed.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A computer program product for allowing a user to create an interactive object in a digital media file using an application that executes on an electronic device to create the interactive object, the application being part of an application platform, wherein the interactive object is personalized to a content owner of the digital media file, and wherein the digital media file is a video file that includes a plurality of frames, the computer program product comprising a non-transitory computer readable medium tangibly embodying computer-executable program instruction thereon, that, when executed, cause one or more computing devices to:
   (a) display the digital media file in a display screen of the electronic device that executes the application used to create the interactive object;
   (b) allow a user to select an object in the displayed digital media file by having the user point to a location of the object on the display screen, wherein the object in the displayed digital media file is selected by pointing to the location of the object on the display screen within one frame of the digital media file;
   (c) upon selection of the object in step (b), invoke a search window on a first user interface screen on the display screen for the user to manually enter search terms to locate the object at a website, the user selecting a desired site from search result hits in order to link and associate a Uniform Resource Locator (URL) of the desired site with the object;
   (d) provide a second user interface screen on the display screen for inputting information regarding the object into a portion of the display screen via the second user interface screen while continuing to display the digital media file on a remaining portion of the display screen which is visible to a viewer of the display screen;
   (e) upload to a database record of the application platform:
      (i) a Uniform Resource Identifier (URI) of the digital media file,
      (ii) the location of the object in the digital media file, and
      (iii) the information regarding the object in the digital media file, including the URL that is linked and associated with the object; and
   (f) automatically track the object selected in step (b) for additional frames of the digital media file where the object appears, and wherein the location of the object in step (e)(ii) further comprises the frame and object location of the object and the frame and object location in each of the additional frames tracked of the digital media file,
      wherein the object tracked in the additional frames in step (f) is linked and associated with the URL of the desired site selected by the user in step (c),
      wherein the URI of the digital media file is a different URI than the URL associated with the object,
      wherein the URL which is linked and associated with the object is stored in a file that is separate and independent from the digital media file and its corresponding URI, and
      wherein the object becomes interactive for subsequent viewers who display the digital media file using the application, the interactivity allowing the viewer to navigate to the URL associated with the object after pointing to the location of the object within the digital media file.

2. The computer program product of claim 1 wherein step (b) occurs by touching or clicking on the object.

3. The computer program product of claim 1 wherein prior to step (a), the computer-executable program instructions, when executed, further cause the one or more computing devices to:
   (g) electronically retrieve the digital media file from an existing URI associated with the content owner, wherein the URI of the digital media file is the existing URI.

4. The computer program product of claim 1 wherein the URL is a link to an e-commerce site where the tracked object is available for purchase.

5. The computer program product of claim 1 wherein the information further includes a title and a description of the object, and the database record further includes the title and description.

6. The computer program product of claim 1 wherein after an object is selected in step (b), the computer-executable program instructions, when executed, further cause the one or more commuting devices to:
   (g) display an outline around the object, wherein a corresponding outline appears when a subsequent viewer displays the digital media file using the application.

* * * * *